(12) United States Patent
Garner et al.

(10) Patent No.: US 11,612,099 B2
(45) Date of Patent: *Mar. 28, 2023

(54) SEEDING MACHINE WITH SEED DELIVERY SYSTEM

(71) Applicant: Deere & Company, Moline, IL (US)

(72) Inventors: Elijah B. Garner, Bettendorf, IA (US); Daniel B. Thiemke, Holly Springs, NC (US); David J. Rylander, Victoria, IL (US); Nathan A. Mariman, Davenport, IA (US); Michael E. Friestad, Roseville, IL (US)

(73) Assignee: Deere & Company, Moline, IL (US)

( * ) Notice: Subject to any disclaimer, the term of this patent is extended or adjusted under 35 U.S.C. 154(b) by 364 days.

This patent is subject to a terminal disclaimer.

(21) Appl. No.: 17/095,315

(22) Filed: Nov. 11, 2020

(65) Prior Publication Data

US 2021/0059104 A1 Mar. 4, 2021

Related U.S. Application Data

(63) Continuation of application No. 17/033,224, filed on Sep. 25, 2020, now abandoned, which is a (Continued)

(51) Int. Cl.
*A01C 7/04* (2006.01)
*A01C 7/06* (2006.01)
(Continued)

(52) U.S. Cl.
CPC ............... *A01C 7/046* (2013.01); *A01C 7/04* (2013.01); *A01C 7/125* (2013.01); *A01C 7/127* (2013.01);
(Continued)

(58) Field of Classification Search
CPC .......... A01C 7/046; A01C 7/04; A01C 7/125; A01C 7/127; A01C 7/16; A01C 7/166;
(Continued)

(56) References Cited

U.S. PATENT DOCUMENTS 9,439 A 12/1852 Colver
13,986 A 12/1855 Hurd
(Continued)

FOREIGN PATENT DOCUMENTS

AU 6198680 A 3/1981
BE 335843 A 9/1926
(Continued)

OTHER PUBLICATIONS

Ahmadi, Mojtaba. Developing a New Powered Seed Delivery System with Constant Seed Release Speed Using Two Confronting Belts. Diss. North Dakota State University, 2018, in 76 pages.
(Continued)

*Primary Examiner* — Christopher J. Novosad

(57) ABSTRACT

A seed delivery system for use in a seeding or planting machine that removes the seed from a seed meter by capturing the seed therefrom. The delivery system then moves the seed down to a lower discharge point and accelerates the seed horizontally rearward to a speed approximately equal to the forward travel speed of the seeding machine such that the seed, when discharged has a low or zero horizontal velocity relative to the ground. Rolling of the seed in the trench is thus reduced. Furthermore, as the seed only has a short drop from the outlet to the bottom of the seed trench, the seed has little vertical speed to induce bounce. The delivery system uses a brush belt to capture, move and accelerate the seed. By capturing the seed and moving it from the meter to the discharge, the seed is held in place relative to other seeds and the planter row unit.
(Continued)

As a result, the seeds are isolated from row unit dynamics thereby maintaining seed spacing.

51 Claims, 10 Drawing Sheets

Related U.S. Application Data continuation of application No. 15/799,279, filed on Oct. 31, 2017, now Pat. No. 10,806,070, which is a continuation of application No. 14/616,877, filed on Feb. 9, 2015, now Pat. No. 9,861,031, which is a continuation of application No. 14/504,801, filed on Oct. 2, 2014, now Pat. No. 9,686,905, which is a continuation of application No. 12/364,010, filed on Feb. 2, 2009, now Pat. No. 8,850,995.

(51) Int. Cl.
  *A01C 7/12* (2006.01)
  *A01C 7/20* (2006.01)
  *A01C 21/00* (2006.01)
  *A01C 7/16* (2006.01)

(52) U.S. Cl.
  CPC ............... *A01C 7/16* (2013.01); *A01C 7/166* (2013.01); *A01C 7/20* (2013.01); *A01C 21/00* (2013.01)

(58) Field of Classification Search
  CPC ........... A01C 7/20; A01C 21/00; A01C 7/044; A01C 7/042; A01C 7/00; A01C 7/123; A01C 7/12; A01C 7/08
  See application file for complete search history.

(56) References Cited

U.S. PATENT DOCUMENTS

| | | |
|---|---|---|
| 55,373 A | 6/1866 | Sherwood |
| 140,493 A | 7/1873 | Fulghum et al. |
| 196,291 A | 10/1877 | Ewart |
| 262,439 A | 8/1882 | Lindsay et al. |
| 327,011 A | 9/1885 | Norton, Sr. |
| 342,490 A | 5/1886 | Zimmerman et al. |
| 353,959 A | 12/1886 | Newhall |
| 467,683 A | 1/1892 | Essex |
| 503,274 A | 8/1893 | Williams |
| 540,157 A | 5/1895 | Eisenhart |
| 540,458 A | 6/1895 | Robbins |
| 546,535 A | 9/1895 | Horscroft |
| 658,348 A | 9/1900 | Crowley |
| 688,912 A | 12/1901 | Watts |
| 697,874 A | 4/1902 | Oldham |
| 736,981 A | 8/1903 | Kohser |
| 773,205 A | 10/1904 | Green |
| 781,310 A | 1/1905 | Steitz |
| 782,459 A | 2/1905 | Morris |
| 792,958 A | 6/1905 | Bagger |
| 858,201 A | 6/1907 | McCoy |
| 886,253 A | 4/1908 | Roseland |
| 925,826 A | 6/1909 | McWhorter |
| 955,193 A | 4/1910 | Paulitsch |
| 1,035,191 A | 8/1912 | Hist |
| 1,046,199 A | 12/1912 | Knopp |
| 1,220,684 A | 3/1917 | Ray |
| 1,264,454 A | 4/1918 | Terrell et al. |
| 1,274,556 A | 8/1918 | Jons, Jr. |
| 1,331,235 A | 2/1920 | Bristow |
| 1,331,341 A | 2/1920 | Harnsberger |
| 1,376,933 A | 5/1921 | Gould, Jr. |
| 1,397,689 A | 11/1921 | Krotz |
| 1,422,534 A | 7/1922 | Brown |
| 1,453,923 A | 5/1923 | De Young, Jr. |
| 1,480,963 A | 1/1924 | Sproull |
| 1,501,335 A | 7/1924 | Artenstein |
| 1,506,294 A | 8/1924 | Faber |
| 1,566,187 A | 12/1925 | Fifer |
| 1,637,834 A | 8/1927 | Melfort |
| 1,750,855 A | 3/1930 | Neighbour |
| 1,751,486 A | 3/1930 | Lutz |
| 1,751,590 A | 3/1930 | Lutz |
| 1,912,248 A | 5/1933 | Bateman et al. |
| 1,976,315 A | 10/1934 | White |
| 1,997,791 A | 4/1935 | Hoberg et al. |
| 2,053,390 A | 9/1936 | Bateman et al. |
| 2,054,552 A | 9/1936 | Wakeham |
| 2,141,044 A | 12/1938 | Rassmann |
| 2,144,044 A | 1/1939 | Birdseye |
| 2,145,771 A | 1/1939 | McCartney |
| 2,183,606 A | 12/1939 | Day |
| 2,201,556 A | 5/1940 | Croce |
| 2,250,719 A | 7/1941 | McKahin |
| 2,302,499 A | 11/1942 | Lacson |
| 2,307,415 A | 1/1943 | Malhiot |
| 2,340,163 A | 1/1944 | White |
| 2,410,996 A | 11/1946 | Patterson |
| 2,440,846 A | 5/1948 | Cannon |
| 2,462,276 A | 2/1949 | Mueller |
| 2,510,658 A | 6/1950 | Rassmann |
| 2,525,167 A | 10/1950 | Delivuk |
| 2,566,406 A | 9/1951 | Russell |
| 2,589,762 A | 3/1952 | Barnett et al. |
| 2,605,023 A | 7/1952 | Ward |
| 2,636,459 A | 4/1953 | Graves |
| 2,646,157 A | 7/1953 | Belt |
| 2,673,536 A | 3/1954 | Skinner |
| 2,682,947 A | 7/1954 | Belt |
| 2,684,781 A | 7/1954 | Allen et al. |
| 2,732,975 A | 1/1956 | Balzer |
| 2,760,622 A | 8/1956 | Magee |
| 2,854,933 A | 10/1958 | Kuester et al. |
| 2,871,805 A | 2/1959 | Behnen |
| 2,882,977 A | 4/1959 | Alexander et al. |
| 2,926,819 A | 3/1960 | Burch |
| 2,934,118 A | 4/1960 | Staffa |
| 2,935,957 A | 5/1960 | Denton |
| 2,950,845 A | 8/1960 | Immesoete |
| 2,960,258 A | 11/1960 | Dodwell |
| 2,975,936 A | 3/1961 | Rousek |
| 2,980,043 A | 4/1961 | Beck |
| 3,066,622 A | 12/1962 | Schurmann |
| 3,077,290 A | 2/1963 | Rehder |
| 3,100,462 A | 8/1963 | Steele et al. |
| 3,122,283 A | 2/1964 | Walters |
| 3,133,515 A | 5/1964 | Beebe |
| 3,142,275 A | 7/1964 | Buhr |
| 3,148,644 A | 9/1964 | Keeton |
| 3,154,032 A | 10/1964 | Kappelmann |
| 3,156,201 A | 11/1964 | Tweedale |
| 3,176,636 A | 4/1965 | Wilcox et al. |
| 3,185,118 A | 5/1965 | Green |
| 3,208,413 A | 9/1965 | Dinges |
| 3,253,739 A | 5/1966 | Martin |
| 3,272,159 A | 9/1966 | Sanderson |
| 3,308,774 A | 3/1967 | Keeton |
| 3,325,060 A | 6/1967 | Rehder |
| 3,329,310 A | 7/1967 | Ramsay |
| 3,343,507 A | 9/1967 | Smith |
| 3,347,426 A | 10/1967 | Morrison, Jr. et al. |
| 3,348,504 A | 10/1967 | Fischer |
| 3,413,941 A | 12/1968 | Roberson |
| 3,434,437 A | 3/1969 | Mark et al. |
| 3,468,441 A | 9/1969 | Longman |
| 3,498,241 A | 3/1970 | Fischer |
| 3,526,344 A | 9/1970 | Koning |
| 3,552,601 A | 1/1971 | Hansen et al. |
| 3,561,380 A | 2/1971 | Adams, Jr. |
| 3,569,615 A | 3/1971 | Oberbeck et al. |
| 3,570,424 A | 3/1971 | Wigham |
| 3,627,050 A | 12/1971 | Hansen et al. |
| 3,636,897 A | 1/1972 | Brink |
| 3,637,108 A | 1/1972 | Loesch et al. |
| 3,648,631 A | 3/1972 | Fiedler et al. |

(56) References Cited

U.S. PATENT DOCUMENTS

| | | |
|---|---|---|
| 3,680,737 A | 8/1972 | Zagotta et al. |
| 3,687,272 A | 8/1972 | Eisenegger |
| 3,690,511 A | 9/1972 | Wigham |
| 3,693,833 A | 9/1972 | Weitz |
| 3,698,332 A | 10/1972 | McCallum |
| RE27,578 E | 2/1973 | Keeton |
| 3,731,842 A | 5/1973 | Schlegel |
| 3,741,437 A | 6/1973 | Ward |
| 3,757,995 A | 9/1973 | Armstrong |
| 3,770,164 A | 11/1973 | Hembree |
| 3,773,224 A | 11/1973 | Winslow |
| 3,788,518 A | 1/1974 | Beebe |
| 3,796,346 A | 3/1974 | Ribouleau |
| 3,841,522 A | 10/1974 | Hatcher |
| 3,843,018 A | 10/1974 | Rohrbach |
| 3,860,146 A | 1/1975 | Bauman et al. |
| 3,880,100 A | 4/1975 | Gillies et al. |
| 3,888,387 A | 6/1975 | Deckler |
| 3,889,883 A | 6/1975 | Anderson |
| 3,903,815 A | 9/1975 | Winkler |
| 3,913,503 A | 10/1975 | Becker |
| 3,921,852 A | 11/1975 | Johnson |
| 3,923,206 A | 12/1975 | Gillies et al. |
| 3,971,446 A | 7/1976 | Nienberg |
| 3,976,214 A | 8/1976 | Etwell |
| 3,982,661 A | 9/1976 | Feltrop |
| 3,990,606 A | 11/1976 | Gugenhan |
| 3,999,690 A | 12/1976 | Deckler |
| 4,002,266 A | 1/1977 | Beebe |
| 4,008,826 A | 2/1977 | Carree |
| 4,009,668 A | 3/1977 | Brass et al. |
| 4,010,778 A | 3/1977 | Aggen |
| 4,023,509 A | 5/1977 | Hanson |
| 4,026,437 A | 5/1977 | Biddle |
| 4,029,235 A | 6/1977 | Grataloup |
| 4,037,755 A | 7/1977 | Reuter |
| 4,047,638 A | 9/1977 | Harrer et al. |
| 4,074,830 A | 2/1978 | Adams et al. |
| 4,137,854 A | 2/1979 | Lattin |
| 4,156,395 A | 5/1979 | Edwards et al. |
| 4,162,744 A | 7/1979 | Barker et al. |
| 4,193,523 A | 3/1980 | Koning |
| 4,221,305 A | 9/1980 | Freeman et al. |
| 4,239,126 A | 12/1980 | Dobson et al. |
| 4,282,985 A | 8/1981 | Yamamoto |
| 4,285,444 A | 8/1981 | Tye |
| 4,306,509 A | 12/1981 | Hassan et al. |
| 4,314,514 A | 2/1982 | Binder |
| 4,324,347 A | 4/1982 | Thomas |
| 4,333,561 A | 6/1982 | Schlegel |
| 4,356,934 A | 11/1982 | Knake |
| 4,392,595 A | 7/1983 | Staniforth |
| 4,399,757 A | 8/1983 | Maury |
| 4,411,205 A | 10/1983 | Rogers |
| 4,449,642 A | 5/1984 | Dooley |
| 4,450,979 A | 5/1984 | Deckler |
| 4,469,244 A | 9/1984 | Maury |
| 4,519,494 A | 5/1985 | McEvoy et al. |
| 4,533,066 A | 8/1985 | Holmes et al. |
| 4,555,624 A | 11/1985 | Steffen |
| 4,561,939 A | 12/1985 | Justus |
| 4,593,632 A | 6/1986 | Mikawa et al. |
| 4,600,122 A | 7/1986 | Lundie et al. |
| 4,613,056 A | 9/1986 | Olson |
| 4,628,841 A | 12/1986 | Powilleit |
| 4,635,215 A | 1/1987 | Friend |
| 4,646,941 A | 3/1987 | Grosse-Scharmann et al. |
| 4,650,093 A | 3/1987 | Meyer-Bosse |
| 4,653,410 A | 3/1987 | Typpi |
| 4,664,043 A | 5/1987 | Feller |
| 4,664,290 A | 5/1987 | Martin et al. |
| 4,793,511 A | 12/1988 | Ankum et al. |
| 4,896,615 A | 1/1990 | Hood, Jr. et al. |
| 4,896,616 A | 1/1990 | Wintersteiger et al. |
| 4,898,108 A | 2/1990 | McDermott |
| 4,899,672 A | 2/1990 | Paul |
| 4,915,258 A | 4/1990 | Olson |
| 4,928,607 A | 5/1990 | Luigi |
| 4,949,869 A | 8/1990 | Ribouleau |
| 5,025,736 A | 6/1991 | Anderson |
| 5,027,725 A | 7/1991 | Keeton |
| 5,058,766 A | 10/1991 | Deckler |
| 5,167,317 A | 12/1992 | Van Der Schoot et al. |
| 5,170,730 A | 12/1992 | Swallow |
| 5,170,909 A | 12/1992 | Lundie et al. |
| 5,377,867 A | 1/1995 | Schick et al. |
| 5,383,371 A | 1/1995 | Laitinen |
| 5,392,707 A | 2/1995 | Romans |
| 5,402,741 A | 4/1995 | Truax et al. |
| 5,431,117 A | 7/1995 | Steffens et al. |
| 5,501,366 A | 3/1996 | Fiorido |
| 5,533,458 A | 7/1996 | Bergland et al. |
| 5,601,209 A | 2/1997 | Barsi et al. |
| 5,650,609 A | 7/1997 | Mertins et al. |
| 5,720,233 A | 2/1998 | Lodico et al. |
| 5,784,871 A | 7/1998 | Glancey et al. |
| 5,784,985 A | 7/1998 | Lodico et al. |
| 5,802,994 A | 9/1998 | Kinkead et al. |
| 5,810,974 A | 9/1998 | Laapotti |
| 5,842,428 A | 12/1998 | Stufflebeam et al. |
| 5,855,303 A | 1/1999 | Gregor |
| 5,915,313 A | 6/1999 | Bender et al. |
| 5,918,726 A | 7/1999 | Temmink |
| 5,936,234 A | 8/1999 | Thomas et al. |
| 5,938,071 A | 8/1999 | Sauder |
| 5,975,283 A | 11/1999 | Riffe |
| 5,983,812 A | 11/1999 | Shokaku et al. |
| 5,992,338 A | 11/1999 | Romans |
| 6,000,528 A | 12/1999 | van Maanen |
| 6,024,033 A | 2/2000 | Kinkead et al. |
| 6,047,652 A | 4/2000 | Prairie et al. |
| 6,070,539 A | 6/2000 | Flamme et al. |
| 6,142,086 A | 11/2000 | Richard |
| 6,173,664 B1 | 1/2001 | Heimbuch |
| 6,202,944 B1 | 3/2001 | McCrory |
| 6,237,514 B1 | 5/2001 | Romans |
| 6,244,201 B1 | 6/2001 | Mauch et al. |
| 6,269,758 B1 | 8/2001 | Sauder |
| 6,293,438 B1 | 9/2001 | Woodruff |
| 6,305,303 B1 | 10/2001 | Wright et al. |
| 6,332,413 B1 | 12/2001 | Stufflebeanm et al. |
| 6,352,042 B1 | 3/2002 | Martin et al. |
| 6,477,967 B2 | 11/2002 | Rosenboom |
| 6,499,414 B2 | 12/2002 | Dunham |
| 6,516,733 B1 | 2/2003 | Sauder et al. |
| 6,564,730 B2 | 5/2003 | Crabb et al. |
| 6,567,764 B2 | 5/2003 | Kaji et al. |
| 6,581,532 B1 | 6/2003 | Hagen et al. |
| 6,581,535 B2 | 6/2003 | Barry et al. |
| 6,615,754 B2 | 9/2003 | Unruh et al. |
| 6,626,120 B2 | 9/2003 | Bogner et al. |
| 6,640,732 B2 | 11/2003 | Prairie et al. |
| 6,651,570 B1 | 11/2003 | Thiemke |
| 6,681,706 B2 | 1/2004 | Sauder et al. |
| 6,718,892 B1 | 4/2004 | Rosenboom |
| 6,729,249 B2 | 5/2004 | Sauder et al. |
| 6,748,885 B2 | 6/2004 | Sauder et al. |
| 6,752,095 B1 | 6/2004 | Rylander et al. |
| 6,845,724 B2 | 1/2005 | Mayerle et al. |
| 6,913,541 B2 | 7/2005 | Chen |
| 6,932,236 B2 | 8/2005 | Ven Huizen |
| 6,960,703 B2 | 11/2005 | Nagle et al. |
| 6,994,038 B2 | 2/2006 | Mariman et al. |
| 7,086,269 B2 | 8/2006 | Sauder et al. |
| 7,093,548 B2 | 8/2006 | Eben et al. |
| 7,111,567 B2 | 9/2006 | Carr et al. |
| 7,152,540 B2 | 12/2006 | Sauder et al. |
| 7,152,542 B2 | 12/2006 | Eben et al. |
| 7,162,963 B2 | 1/2007 | Sauder et al. |
| 7,185,596 B2 | 3/2007 | Theimke et al. |
| 7,334,532 B2 | 2/2008 | Sauder et al. |
| 7,343,868 B2 | 3/2008 | Stephens et al. |
| 7,377,221 B1 | 5/2008 | Brockmeier |
| 7,404,366 B2 | 7/2008 | Mariman |

(56) References Cited

U.S. PATENT DOCUMENTS

| | | |
|---|---|---|
| 7,448,334 B2 | 11/2008 | Mariman et al. |
| 7,451,713 B2 | 11/2008 | Mariman et al. |
| 7,472,660 B2 | 1/2009 | Mariman et al. |
| 7,478,603 B2 | 1/2009 | Riewerts et al. |
| 7,490,565 B2 | 2/2009 | Holly |
| 7,513,200 B2 | 4/2009 | Friestad |
| 7,617,785 B2 | 11/2009 | Wendte |
| 7,631,606 B2 | 12/2009 | Sauder et al. |
| 7,661,377 B2 | 2/2010 | Keaton et al. |
| 7,669,539 B2 | 3/2010 | Wendte |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts |
| 7,775,167 B2 | 8/2010 | Stehling et al. |
| 7,854,205 B2 | 12/2010 | Beaujot |
| 7,854,206 B2 | 12/2010 | Horsch |
| 7,918,168 B2 | 4/2011 | Garner et al. |
| 7,918,968 B1 | 4/2011 | Baker et al. |
| 7,938,073 B2 | 5/2011 | Dunham et al. |
| 7,975,631 B2 | 7/2011 | Heiss, Jr. |
| 7,994,377 B2 | 8/2011 | Coupard et al. |
| 8,001,913 B2 | 8/2011 | Snipes et al. |
| 8,074,586 B2 | 12/2011 | Garner et al. |
| 8,078,367 B2 | 12/2011 | Sauder et al. |
| 8,186,288 B2 | 5/2012 | Chinkiwsky |
| 8,221,047 B2 | 7/2012 | Petersen et al. |
| 8,276,529 B2 | 10/2012 | Garner et al. |
| 8,336,471 B2 | 12/2012 | Gilstring |
| 8,375,874 B2 | 2/2013 | Peterson et al. |
| 8,413,371 B2 | 4/2013 | Davidson et al. |
| 8,468,960 B2 | 6/2013 | Garner et al. |
| 8,522,699 B2 | 9/2013 | Garner et al. |
| 8,543,238 B2 | 9/2013 | Straeter |
| 8,618,465 B2 | 12/2013 | Tevs et al. |
| 8,671,856 B2 | 3/2014 | Garner et al. |
| 8,746,159 B2 | 6/2014 | Garner et al. |
| 8,752,490 B2 | 6/2014 | Beaujot |
| 8,789,482 B2 | 7/2014 | Garner et al. |
| 8,800,457 B2 | 8/2014 | Garner et al. |
| 8,813,663 B2 | 8/2014 | Garner et al. |
| 8,843,281 B2 | 9/2014 | Wilhelmi et al. |
| 8,850,995 B2 | 10/2014 | Garner et al. |
| 8,850,997 B2 | 10/2014 | Silbernagel et al. |
| 8,850,998 B2 | 10/2014 | Garner et al. |
| 8,869,719 B2 | 10/2014 | Garner et al. |
| 8,985,037 B2 | 3/2015 | Radtke et al. |
| 9,144,190 B2 | 9/2015 | Henry et al. |
| 9,216,860 B2 | 12/2015 | Friestad et al. |
| 9,237,687 B2 | 1/2016 | Sauder et al. |
| 9,258,939 B2 | 2/2016 | Borgmann et al. |
| 9,258,940 B2 | 2/2016 | McCloskey |
| 9,265,191 B2 | 2/2016 | Sauder et al. |
| 9,301,441 B2 | 4/2016 | Friestad et al. |
| 9,313,941 B2 | 4/2016 | Garner et al. |
| 9,313,943 B2 | 4/2016 | Zumdome et al. |
| 9,332,689 B2 | 5/2016 | Baurer et al. |
| 9,345,188 B2 | 5/2016 | Garner et al. |
| 9,345,189 B2 | 5/2016 | Harmelink et al. |
| 9,433,141 B2 | 9/2016 | Friestad et al. |
| 9,445,539 B2 | 9/2016 | Rans |
| 9,468,142 B2 | 10/2016 | Bastin et al. |
| 9,480,199 B2 | 11/2016 | Garner et al. |
| 9,510,502 B2 | 12/2016 | Garner et al. |
| 9,578,802 B2 | 2/2017 | Radtke et al. |
| 9,596,802 B2 | 3/2017 | Funck |
| 9,622,402 B2 | 4/2017 | Kinzenbaw et al. |
| 9,633,491 B2 | 4/2017 | Wonderlich |
| 9,635,802 B2 | 5/2017 | Rains et al. |
| 9,635,804 B2 | 5/2017 | Carr et al. |
| 9,661,799 B2 | 5/2017 | Garner et al. |
| 9,686,905 B2 | 6/2017 | Garner et al. |
| 9,686,906 B2 | 6/2017 | Garner et al. |
| 9,693,498 B2 | 7/2017 | Zumdome et al. |
| 9,699,955 B2 | 7/2017 | Garner et al. |
| 9,713,298 B2 | 7/2017 | Garner |
| 9,730,377 B2 | 8/2017 | Kowalchuk |
| 9,733,634 B2 | 8/2017 | Prickel |
| 9,750,178 B2 | 9/2017 | Kinzenbaw et al. |
| 9,756,779 B2 | 9/2017 | Wilhelmi et al. |
| 9,769,978 B2 | 9/2017 | Radtke |
| 9,775,279 B2 | 10/2017 | Garner et al. |
| 9,795,078 B2 | 10/2017 | Garner et al. |
| 9,801,328 B2 | 10/2017 | Garner et al. |
| 9,807,922 B2 | 11/2017 | Garner et al. |
| 9,807,924 B2 | 11/2017 | Garner et al. |
| 9,814,176 B2 | 11/2017 | Kowalchuk |
| 9,820,429 B2 | 11/2017 | Garner et al. |
| 9,839,178 B2 | 12/2017 | Garner et al. |
| 9,861,025 B2 | 1/2018 | Schaefer et al. |
| 9,861,031 B2 | 1/2018 | Garner et al. |
| 9,872,424 B2 | 1/2018 | Baurer et al. |
| 9,883,625 B2 | 2/2018 | Koch et al. |
| 9,888,622 B2 | 2/2018 | Henry |
| 9,897,922 B2 | 2/2018 | Enomoto et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,949,426 B2 | 4/2018 | Radtke et al. |
| 9,974,230 B2 | 5/2018 | Sauder et al. |
| 9,999,175 B2 | 6/2018 | Baurer et al. |
| 10,004,173 B2 | 6/2018 | Garner et al. |
| 10,051,782 B2 | 8/2018 | Wilhelmi et al. |
| 10,058,023 B2 | 8/2018 | Conrad et al. |
| 10,143,127 B2 | 12/2018 | Wilhelmi et al. |
| 10,165,724 B2 | 1/2019 | Nilson et al. |
| 10,206,325 B2 | 2/2019 | Schoeny et al. |
| 10,206,326 B2 | 2/2019 | Garner et al. |
| 10,257,973 B2 | 4/2019 | Hubner et al. |
| 10,296,017 B2 | 5/2019 | Schoeny et al. |
| 10,398,077 B2 | 9/2019 | Radtke |
| 10,433,476 B2 | 10/2019 | Jagow et al. |
| 10,448,561 B2 | 10/2019 | Schoeny et al. |
| 10,455,757 B2 | 10/2019 | Sauder et al. |
| 10,470,358 B2 | 11/2019 | Sauder et al. |
| 10,485,159 B2 | 11/2019 | Wilhelmi et al. |
| 10,524,410 B2 | 1/2020 | Schoeny et al. |
| 10,537,055 B2 | 1/2020 | Gresch et al. |
| 10,582,655 B2 | 3/2020 | Kowalchuk |
| 10,602,656 B2 | 3/2020 | Bartleson et al. |
| 10,729,063 B2 | 8/2020 | Garner et al. |
| 10,743,460 B2 | 8/2020 | Gilbert et al. |
| 10,765,057 B2 | 9/2020 | Radtke et al. |
| 10,772,256 B2 | 9/2020 | Stuber |
| 10,806,070 B2 | 10/2020 | Garner et al. |
| 10,820,489 B2 | 11/2020 | Garner et al. |
| 10,823,748 B2 | 11/2020 | Allgaier |
| 10,842,072 B2 | 11/2020 | Wilhelmi et al. |
| 11,013,166 B2 | 5/2021 | Boetsch |
| RE48,572 E | 6/2021 | Garner et al. |
| 11,051,445 B2 | 7/2021 | Hubner et al. |
| 11,058,047 B2 | 7/2021 | Hubner et al. |
| 11,064,649 B2 | 7/2021 | Hubner et al. |
| 11,083,127 B2 | 8/2021 | Werner et al. |
| 11,129,325 B2 | 9/2021 | Marler et al. |
| 11,277,961 B2 | 3/2022 | Campbell et al. |
| 11,297,762 B2 | 4/2022 | Garner et al. |
| 11,324,162 B2 | 5/2022 | Koch et al. |
| 11,337,362 B2 | 5/2022 | Koch et al. |
| 2002/0043201 A1 | 4/2002 | Dunham |
| 2002/0050238 A1 | 5/2002 | Crabb et al. |
| 2003/0159631 A1 | 8/2003 | Sauder et al. |
| 2003/0167986 A1 | 9/2003 | Sauder et al. |
| 2003/0167987 A1 | 9/2003 | Nagle et al. |
| 2003/0183647 A1 | 10/2003 | Ven Huizen |
| 2005/0204971 A1 | 9/2005 | VenHuizen |
| 2005/0235890 A1 | 10/2005 | Mariman et al. |
| 2006/0266269 A1 | 11/2006 | Eben et al. |
| 2006/0278726 A1 | 12/2006 | Holly |
| 2006/0283363 A1 | 12/2006 | Wollman et al. |
| 2007/0039528 A1 | 2/2007 | Sauder et al. |
| 2007/0039529 A1 | 2/2007 | Sauder et al. |
| 2007/0107645 A1 | 5/2007 | Mariman et al. |
| 2007/0125284 A1 | 6/2007 | Mariman et al. |

(56) References Cited

U.S. PATENT DOCUMENTS

| | | |
|---|---|---|
| 2008/0053352 A1 | 3/2008 | Friestad |
| 2008/0236462 A1 | 10/2008 | Sauder et al. |
| 2009/0000533 A1 | 1/2009 | Wendte |
| 2010/0010667 A1 | 1/2010 | Sauder |
| 2010/0107944 A1 | 5/2010 | Snipes et al. |
| 2010/0192818 A1 | 8/2010 | Garner et al. |
| 2010/0192819 A1 | 8/2010 | Garner et al. |
| 2010/0192821 A1 | 8/2010 | Garner et al. |
| 2010/0224110 A1 | 9/2010 | Mariman |
| 2010/0300341 A1 | 12/2010 | Peterson et al. |
| 2011/0185956 A1 | 8/2011 | Garner et al. |
| 2012/0067260 A1 | 3/2012 | Garner et al. |
| 2012/0067261 A1 | 3/2012 | Garner et al. |
| 2012/0240837 A1 | 9/2012 | Garner et al. |
| 2013/0192504 A1 | 8/2013 | Sauder et al. |
| 2013/0298810 A1 | 11/2013 | Garner et al. |
| 2014/0196642 A1 | 7/2014 | Garner et al. |
| 2015/0013581 A1 | 1/2015 | Garner et al. |
| 2015/0216111 A1 | 8/2015 | Garner et al. |
| 2015/0230397 A1 | 8/2015 | Garner et al. |
| 2015/0238003 A1 | 8/2015 | Swane |
| 2015/0305231 A1 | 10/2015 | Garner et al. |
| 2016/0128273 A1 | 5/2016 | Garner et al. |
| 2016/0135363 A1 | 5/2016 | Sauder et al. |
| 2016/0174458 A1 | 6/2016 | Thacker |
| 2016/0234996 A1 | 8/2016 | Sauder et al. |
| 2017/0049040 A1 | 2/2017 | Kinzenbaw |
| 2017/0127604 A1 | 5/2017 | Wilhelmi et al. |
| 2017/0332546 A1 | 11/2017 | Garner et al. |
| 2017/0359949 A1 | 12/2017 | Garner et al. |
| 2018/0007824 A1 | 1/2018 | Radtke |
| 2018/0049367 A1 | 2/2018 | Garner et al. |
| 2018/0153094 A1 | 2/2018 | Radtke et al. |
| 2018/0184578 A1 | 7/2018 | Stuber |
| 2018/0192577 A1 | 7/2018 | Smith et al. |
| 2019/0098827 A1 | 4/2019 | Gilbert et al. |
| 2019/0098828 A1 | 4/2019 | Wilhelmi et al. |
| 2019/0219606 A1 | 7/2019 | Radtke et al. |
| 2019/0223372 A1 | 7/2019 | Koch et al. |
| 2019/0230846 A1 | 8/2019 | Koch et al. |
| 2019/0239425 A1 | 8/2019 | Garner et al. |
| 2019/0239426 A1 | 8/2019 | Garner et al. |
| 2019/0246551 A1 | 8/2019 | Campbell et al. |
| 2019/0254224 A1 | 8/2019 | Garner et al. |
| 2019/0289774 A1 | 9/2019 | Prystupa et al. |
| 2019/0289778 A1 | 9/2019 | Koch et al. |
| 2019/0307057 A1 | 10/2019 | Sauder et al. |
| 2019/0343037 A1 | 11/2019 | Werner et al. |
| 2019/0364724 A1 | 12/2019 | Radtke et al. |
| 2020/0000011 A1 | 1/2020 | Hubner et al. |
| 2020/0000012 A1 | 1/2020 | Hubner et al. |
| 2020/0000016 A1 | 1/2020 | Hubner et al. |
| 2020/0000017 A1 | 1/2020 | Marler, III et al. |
| 2020/0000018 A1 | 1/2020 | Boetsch |
| 2020/0344941 A1 | 11/2020 | Garner et al. |
| 2021/0059105 A1 | 3/2021 | Garner et al. |
| 2021/0059106 A1 | 3/2021 | Garner et al. |
| 2021/0068337 A1 | 3/2021 | Garner et al. |
| 2021/0076558 A1 | 3/2021 | Garner et al. |
| 2021/0136997 A1 | 5/2021 | Garner et al. |

FOREIGN PATENT DOCUMENTS

| | | |
|---|---|---|
| BR | PI 8501300 A | 11/1985 |
| BR | PI 9404976-9 A | 8/1995 |
| BR | PI 9701145-2 A | 12/1998 |
| BR | PI 0104497-4 A | 5/2002 |
| BR | PI 0305993-6 A | 5/2005 |
| BR | PI 0605292-4 A | 9/2007 |
| BR | PI 0604798-0 A | 11/2007 |
| BR | PI 0703545-4 A | 4/2008 |
| CA | 2154022 A1 | 7/1996 |
| CA | 2485250 C | 2/2014 |
| CA | 2806410 C | 8/2017 |
| CA | 3032575 A1 | 8/2019 |
| CN | 1063011 A | 7/1992 |
| CN | 2180028 Y | 10/1994 |
| CN | 1069157 C | 8/2001 |
| CN | 1081885 C | 4/2002 |
| CN | 2613980 Y | 5/2004 |
| DE | 78644 C | 1/1895 |
| DE | 140749 C | 4/1903 |
| DE | 143205 C | 8/1903 |
| DE | 176669 C | 10/1906 |
| DE | 179254 C | 11/1906 |
| DE | 206192 C | 1/1909 |
| DE | 273291 C | 4/1914 |
| DE | 331981 C | 1/1921 |
| DE | 389840 | 2/1924 |
| DE | 403144 C | 9/1924 |
| DE | 429529 C | 6/1926 |
| DE | 538037 C | 11/1931 |
| DE | 814343 C | 9/1951 |
| DE | 824873 C | 12/1951 |
| DE | 826525 C | 1/1952 |
| DE | 902561 C | 1/1954 |
| DE | 921598 C | 12/1954 |
| DE | 945923 C | 7/1956 |
| DE | 1090458 B | 10/1960 |
| DE | 1205329 B | 11/1965 |
| DE | 1211014 B | 2/1966 |
| DE | 1457832 A1 | 7/1969 |
| DE | 1962150 A1 | 9/1971 |
| DE | 2011462 A1 | 9/1971 |
| DE | 2030761 A1 | 12/1971 |
| DE | 2443671 A1 | 3/1976 |
| DE | 2517758 A1 | 11/1976 |
| DE | 2548359 B1 | 12/1976 |
| DE | 2604752 A1 | 8/1977 |
| DE | 2705479 B1 | 8/1978 |
| DE | 2735105 A1 | 2/1979 |
| DE | 2826658 A1 | 1/1980 |
| DE | 2900985 B1 | 4/1980 |
| DE | 2945923 A1 | 5/1981 |
| DE | 8400142 U1 | 5/1984 |
| DE | 3405031 C1 | 4/1985 |
| DE | 3441704 A1 | 5/1986 |
| DE | 3826397 A1 | 1/1989 |
| DE | 9401110 U1 | 5/1994 |
| DE | 19541553 A1 | 5/1997 |
| DE | 19710063 A1 | 9/1998 |
| DE | 102005051527 A1 | 5/2007 |
| DE | 102006012539 A1 | 9/2007 |
| DE | 102007031576 A1 | 1/2009 |
| EP | 0014622 A1 | 8/1980 |
| EP | 0047577 A2 | 3/1982 |
| EP | 0152048 A2 | 8/1985 |
| EP | 0100723 B1 | 9/1985 |
| EP | 0158985 B1 | 10/1985 |
| EP | 0049330 B1 | 1/1986 |
| EP | 0181358 B1 | 6/1988 |
| EP | 0182220 B1 | 4/1990 |
| EP | 0457679 B1 | 1/1995 |
| EP | 0606541 B1 | 1/1997 |
| EP | 0953280 B1 | 11/1999 |
| EP | 0981270 A1 | 3/2000 |
| EP | 0801523 B1 | 12/2000 |
| EP | 1219155 A1 | 7/2002 |
| EP | 1236387 A1 | 9/2002 |
| EP | 1560157 A2 | 8/2005 |
| EP | 2047736 A1 | 4/2009 |
| EP | 2215903 B1 | 9/2011 |
| EP | 2213152 B1 | 12/2011 |
| EP | 2213153 B1 | 1/2012 |
| EP | 2747541 B1 | 4/2016 |
| EP | 2688385 B1 | 7/2016 |
| EP | 3056073 A1 | 8/2016 |
| EP | 2974582 B1 | 9/2017 |
| EP | 2449871 B1 | 12/2018 |
| EP | 3409092 B1 | 12/2018 |
| EP | 3586583 A1 | 1/2020 |
| FR | 453651 A | 6/1913 |
| FR | 858062 A | 11/1940 |
| FR | 988160 A | 8/1951 |

(56) References Cited

FOREIGN PATENT DOCUMENTS

| | | |
|---|---|---|
| FR | 1026090 A | 4/1953 |
| FR | 1273128 A | 10/1961 |
| FR | 1291511 A | 4/1962 |
| FR | 1369492 A | 8/1964 |
| FR | 1408127 A | 6/1965 |
| FR | 1410390 A | 9/1965 |
| FR | 1503687 A | 12/1967 |
| FR | 2135702 A5 | 12/1972 |
| FR | 2174341 A6 | 10/1973 |
| FR | 2210084 A6 | 7/1974 |
| FR | 2210887 A5 | 7/1974 |
| FR | 2220123 A5 | 9/1974 |
| FR | 2323308 A1 | 4/1977 |
| FR | 2365285 A1 | 4/1978 |
| FR | 2376608 A1 | 8/1978 |
| FR | 2414288 A1 | 8/1979 |
| FR | 2424288 A1 | 11/1979 |
| FR | 2464017 B3 | 6/1982 |
| FR | 2543789 A1 | 10/1984 |
| FR | 2574243 A1 | 6/1986 |
| FR | 2591061 A1 | 6/1987 |
| FR | 2635432 A1 | 2/1990 |
| FR | 2638054 A1 | 4/1990 |
| FR | 2643212 A1 | 8/1990 |
| FR | 2729271 A1 | 7/1996 |
| FR | 2873535 A1 | 2/2006 |
| GB | 189805308 A | 1/1899 |
| GB | 190418381 A | 10/1904 |
| GB | 191117977 A | 8/1912 |
| GB | 191220961 A | 5/1913 |
| GB | 191228290 A | 12/1913 |
| GB | 191305165 A | 2/1914 |
| GB | 191416282 A | 6/1915 |
| GB | 103504 A | 1/1917 |
| GB | 237073 A | 7/1925 |
| GB | 296466 A | 9/1928 |
| GB | 482789 A | 4/1938 |
| GB | 599501 A | 3/1948 |
| GB | 601779 A | 5/1948 |
| GB | 609569 A | 10/1948 |
| GB | 653614 A | 5/1951 |
| GB | 655835 A | 8/1951 |
| GB | 677842 A | 8/1952 |
| GB | 679344 A | 9/1952 |
| GB | 789435 A | 1/1958 |
| GB | 802899 A | 10/1958 |
| GB | 900275 A | 7/1962 |
| GB | 926217 A | 5/1963 |
| GB | 937519 A | 9/1963 |
| GB | 964156 A | 7/1964 |
| GB | 989145 A | 4/1965 |
| GB | 1117223 A | 6/1968 |
| GB | 1359031 A | 7/1974 |
| GB | 1407219 A | 9/1975 |
| GB | 1445174 A | 8/1976 |
| GB | 2012534 A | 8/1979 |
| GB | 2057835 A | 4/1981 |
| GB | 2066032 A | 7/1981 |
| GB | 2068203 A | 8/1981 |
| GB | 2103463 A | 2/1983 |
| JP | S52-59383 U | 4/1977 |
| JP | S55-105523 U | 7/1980 |
| JP | S55-151114 U | 10/1980 |
| JP | S56-24815 A | 3/1981 |
| JP | S56-024815 U | 3/1981 |
| JP | S64-3306 Y2 | 7/1986 |
| JP | S61-33858 Y2 | 10/1986 |
| JP | H0530815 A | 2/1993 |
| JP | H05192013 A | 8/1993 |
| JP | H0591214 U | 12/1993 |
| JP | H06165612 A | 6/1994 |
| JP | 2540454 B2 | 10/1996 |
| JP | H1159886 A | 3/1999 |
| JP | 2000041420 A | 2/2000 |
| JP | 2007117941 A | 5/2007 |
| NL | 1000674 C2 | 12/1996 |
| NL | 1005451 | 9/1998 |
| NL | 1011957 C2 | 11/2000 |
| NL | 1019071 C2 | 4/2003 |
| NL | 1025174 C2 | 7/2005 |
| RU | 2044436 C1 | 9/1995 |
| RU | 2105452 C1 | 2/1998 |
| RU | 2137337 C1 | 9/1999 |
| RU | 2227385 C1 | 4/2004 |
| RU | 2343675 C1 | 1/2009 |
| RU | 2529317 C2 | 9/2014 |
| RU | 2535261 C2 | 12/2014 |
| RU | 2013145876 A | 4/2015 |
| RU | 2578471 C2 | 3/2016 |
| RU | 2605356 C2 | 12/2016 |
| SU | 130264 A1 | 11/1959 |
| SU | 264033 A1 | 11/1970 |
| SU | 281928 A1 | 11/1971 |
| SU | 445391 A1 | 10/1974 |
| SU | 948316 A1 | 8/1982 |
| SU | 990606 A1 | 1/1983 |
| SU | 1253450 A1 | 8/1986 |
| SU | 1613023 A1 | 12/1990 |
| SU | 1683531 A1 | 10/1991 |
| SU | 1782400 A1 | 12/1992 |
| WO | WO 85/04547 A1 | 10/1985 |
| WO | WO 98/049884 A1 | 11/1998 |
| WO | WO 02/005623 A1 | 1/2002 |
| WO | WO 2005/011358 A1 | 2/2005 |
| WO | WO 2005/065441 A1 | 7/2005 |
| WO | WO 2008/108732 A1 | 9/2008 |
| WO | WO 2008/125197 A1 | 10/2008 |
| WO | WO 2010/059101 A1 | 5/2010 |
| WO | WO 2010/124360 A1 | 11/2010 |
| WO | WO 2012/135015 A2 | 10/2012 |
| WO | WO 2013/049198 A1 | 4/2013 |
| WO | WO 2013/186175 A1 | 12/2013 |
| WO | WO 2016/054715 A1 | 4/2016 |
| WO | WO 2017/117638 A1 | 7/2017 |
| WO | WO 2019/050944 A1 | 3/2019 |
| WO | WO 2019/068582 A1 | 4/2019 |
| WO | WO 2019/091871 A1 | 5/2019 |
| WO | WO 2019/202194 A1 | 10/2019 |
| WO | WO 2019/241856 A1 | 12/2019 |
| WO | WO 2020/014752 A1 | 1/2020 |

OTHER PUBLICATIONS

Amended Final joint Claim Construction Chart, filed Dec. 2, 2019, in 18 pages.

Breece, H. Edward, Harold V. Hansen, and Thomas A. Hoerner. Fundamentals of machine operation: planting. J. Deere, 1975, in 184 pages.

Bufton, L. P. "The influence of seed-drill design on the spatial arrangement of seedlings and on seedling emergence." Symposium on the Timing of Field vegetable Production 72. 1977, in 23 pages.

Continental Bucket Elevator & Seed Belts Product Information (accessed first on May 19, 2020), in 2 pages. URL: https://www.continental-industry.com/en/Solutions/Conveyor-Belt-Systems/Processing-special-belts/Seeding-Harvesting/Products/Product-Range/Bucket-Elevator-Seed-Belts.

Exhibit 01 to Precision Planting LLC and AGCO Corporation's initial invalidity contentions relating to Australian Patent No. AU-A1-61 986/80 to Hedderwick ("Hedderwick '80 App."), served Jul. 12, 2019, in 98 pages.

Exhibit 02 to Precision Planting LLC and AGCO Corporation's initial invalidity contentions relating to Belgian Patent No. 335843 to Wodke ("Wodke"), served Jul. 12, 2019, in 74 pages.

Exhibit 03 to Precision Planting LLC and AGCO Corporation's initial invalidity contentions relating to German Published Patent No. DE1090458B to Witte ("Witte"), served Jul. 12, 2019, in 103 pages.

Exhibit 04 to Precision Planting LLC and AGCO Corporation's initial invalidity contentions relating to German Published Patent Application No. 28,26,658 to Holdt ("Holdt"), served Jul. 12, 2019, in 76 pages.

(56) References Cited

OTHER PUBLICATIONS

Exhibit 05 to Precision Planting LLC and AGCO Corporation's initial invalidity contentions relating to German Patent No. 389840 to Hempel ("Hempel"), served Jul. 12, 2019, in 69 pages.

Exhibit 06 to Precision Planting LLC and AGCO Corporation's initial invalidity contentions relating to French Patent No. 1,408,127 to Plinke ("Plinke"), served Jul. 12, 2019, in 65 pages.

Exhibit 07 to Precision Planting LLC and AGCO Corporation's initial invalidity contentions relating to French Published Patent Application No. 2,414,288 A1 to Benac ("Benac"), served Jul. 12, 2019, in 123 pages.

Exhibit 08 to Precision Planting LLC and AGCO Corporation's initial invalidity contentions relating to French Published Patent Application No. 2638054A1 to Damonneville ("Damonneville"), served Jul. 12, 2019, in 109 pages.

Exhibit 09 to Precision Planting LLC and AGCO Corporation's initial invalidity contentions relating to UK Patent Application No. GB2,012,534A to Curtis ("Curtis"), served Jul. 12, 2019, in 86 pages.

Exhibit 10 to Precision Planting LLC and AGCO Corporation's initial invalidity contentions relating to UK Published Patent Application No. 2,057,835 A to Hedderwick ("Hedderwick '835"), served Jul. 12, 2019, in 100 pages.

Exhibit 11 to Precision Planting LLC and AGCO Corporation's initial invalidity contentions relating to Japanese Utility Model Application JP 56-024815 ("Yamahata"), served Jul. 12, 2019, in 94 pages.

Exhibit 1002 to Petition for Inter Partes Review of U.S. Pat. No. 8,813,663 filed on behalf of Precision Planting, LLC and AGCO Corp.: Declaration of Douglas S. Prairie, filed on May 29, 2019, in 131 pages.

Exhibit 1002 to Petition for Inter Partes Review of U.S. Pat. No. 9,480,199 filed on behalf of Precision Planting, LLC and AGCO Corp.: Declaration of Douglas S. Prairie, filed on May 31, 2019, in 106 pages.

Exhibit 1002 to Petition for Inter Partes Review of U.S. Pat. No. 9,686,906 filed on behalf of Precision Planting, LLC and AGCO Corp.: Declaration of Randal K. Taylor, filed on May 30, 2019, in 156 pages.

Exhibit 1002 to Petition for Inter Partes Review of U.S. Pat. No. 9,699,955 filed on behalf of Precision Planting, LLC and AGCO Corp.: Declaration of Douglas S. Prairie, filed on May 31, 2019, in 138 pages.

Exhibit 1002 to Petition for Inter Partes Review of U.S. Pat. No. 9,807,924 filed on behalf of Precision Planting, LLC and AGCO Corp.: Declaration of Randal K. Taylor, filed on May 29, 2019, in 141 pages.

Exhibit 1002 to Petition for Inter Partes Review of U.S. Pat. No. 9,820,429 filed on behalf of Precision Planting, LLC and AGCO Corp.: Declaration of Douglas S. Prairie, filed on May 31, 2019, in 156 pages.

Exhibit 1002 to Petition for Inter Partes Review of U.S. Pat. No. 9,861,031 filed on behalf of Precision Planting, LLC and AGCO Corp.: Declaration of Douglas S. Prairie, filed on May 29, 2019, in 140 pages.

Exhibit 1002 to Petition for Inter Partes Review of U.S. Pat. No. 10,004,173 filed on behalf of Precision Planting, LLC and AGCO Corp.: Declaration of Douglas S. Prairie, filed on Jun. 3, 2019, in 163 pages.

Exhibit 12 to Precision Planting LLC and AGCO Corporation's initial invalidity contentions relating to Japanese Utility Model Registration Publication No. JP61-33858 Y2 to Yamatake ("Yamatake"), served Jul. 12, 2019, in 71 pages.

Exhibit 13 to Precision Planting LLC and AGCO Corporation's initial invalidity contentions relating to Japanese Published Patent JP64003306Y2 to Koyama ("Koyama"), served Jul. 12, 2019, in 77 pages.

Exhibit 14 to Precision Planting LLC and AGCO Corporation's initial invalidity contentions relating to Netherlands Patent Application No. 1,005,451C2 to Pronk ("Pronk"), served Jul. 12, 2019, in 63 pages.

Exhibit 15 to Precision Planting LLC and AGCO Corporation's initial invalidity contentions relating to U.S. Patent Application Publication No. 2003/0159631 to Sauder et al. ("Sauder '631 App."), served Jul. 12, 2019, in 179 pages.

Exhibit 16 to Precision Planting LLC and AGCO Corporation's initial invalidity contentions relating to U.S. Patent Application Publication No. 2003/0167986A1 to Sauder et al. ("Sauder '986 App."), served Jul. 12, 2019, in 72 pages.

Exhibit 17 to Precision Planting LLC and AGCO Corporation's initial invalidity contentions relating to U.S. Patent Application Publication No. US 2003/0183647 A1 to Ven Huizen ("Ven Huizen '647 App."), served Jul. 12, 2019, in 115 pages.

Exhibit 18 to Precision Planting LLC and AGCO Corporation's initial invalidity contentions relating to U.S. Patent Application Publication No. 2006/0278726 A1 to Holly ("Holly '726 App."), served Jul. 12, 2019, in 83 pages.

Exhibit 19 to Precision Planting LLC and AGCO Corporation's initial invalidity contentions relating to U.S. Patent Application Publication No. US 2006/0283363 A1 to Wollman ("Wollman"), served Jul. 12, 2019, in 128 pages.

Exhibit 20 to Precision Planting LLC and AGCO Corporation's initial invalidity contentions relating to U.S. Patent Application Publication No. 2007/039528 A1 to Sauder et al. ("Sauder '528 App."), served Jul. 12, 2019, in 89 pages.

Exhibit 21 to Precision Planting LLC and AGCO Corporation's initial invalidity contentions relating to U.S. Patent Application Publication No. 2010/0107944 to Snipes et al. ("Snipes"), served Jul. 12, 2019, in 97 pages.

Exhibit 22 to Precision Planting LLC and AGCO Corporation's initial invalidity contentions relating to U.S. Patent Application Publication No. 2010/0192819 ("Garner"), served Jul. 12, 2019, in 45 pages.

Exhibit 23 to Precision Planting LLC and AGCO Corporation's initial invalidity contentions relating to U.S. Pat. No. 1,376,933 to Gould ("Gould"), served Jul. 12, 2019, in 74 pages.

Exhibit 24 to Precision Planting LLC and AGCO Corporation's initial invalidity contentions relating to U.S. Pat. No. 2,566,406 to Dougherty ("Dougherty"), served Jul. 12, 2019, in 72 pages.

Exhibit 25 to Precision Planting LLC and AGCO Corporation's initial invalidity contentions relating to U.S. Pat. No. 2,684,781 to Allen et al. ("Allen"), served Jul. 12, 2019, in 70 pages.

Exhibit 26 to Precision Planting LLC and AGCO Corporation's initial invalidity contentions relating to U.S. Pat. No. 3,077,290 to Rehder ("Rehder '290"), served Jul. 12, 2019, in 98 pages.

Exhibit 27 to Precision Planting LLC and AGCO Corporation's initial invalidity contentions relating to U.S. Pat. No. 3,253,739 to Martin ("Martin '739"), served Jul. 12, 2019, in 124 pages.

Exhibit 28 to Precision Planting LLC and AGCO Corporation's initial invalidity contentions relating to U.S. Pat. No. 3,272,159 to Sanderson ("Sanderson"), served Jul. 12, 2019, in 69 pages.

Exhibit 29 to Precision Planting LLC and AGCO Corporation's initial invalidity contentions relating to U.S. Pat. No. 3,325,060 to Rehder ("Rehder '060"), served Jul. 12, 2019, in 67 pages.

Exhibit 30 to Precision Planting LLC and AGCO Corporation's initial invalidity contentions relating to U.S. Pat. No. 3,329,310 ("Ramsay"), served Jul. 12, 2019, in 125 pages.

Exhibit 31 to Precision Planting LLC and AGCO Corporation's initial invalidity contentions relating to U.S. Pat. No. 3,413,941 ("Roberson"), served Jul. 12, 2019, in 81 pages.

Exhibit 32 to Precision Planting LLC and AGCO Corporation's initial invalidity contentions relating to U.S. Pat. No. 3,468,441 to Longman ("Longman"), served Jul. 12, 2019, in 140 pages.

Exhibit 33 to Precision Planting LLC and AGCO Corporation's initial invalidity contentions relating to U.S. Pat. No. 3,561,380 to Adams ("Adams"), served Jul. 12, 2019, in 75 pages.

Exhibit 34 to Precision Planting LLC and AGCO Corporation's initial invalidity contentions relating to U.S. Pat. No. 3,570,424 to Wigham ("Wigham '424"), served Jul. 12, 2019, in 66 pages.

(56) References Cited

OTHER PUBLICATIONS

Exhibit 35 to Precision Planting LLC and AGCO Corporation's initial invalidity contentions relating to U.S. Pat. No. 3,690,511 to Wigham ("Wigham '511"), served Jul. 12, 2019, in 91 pages.
Exhibit 36 to Precision Planting LLC and AGCO Corporation's initial invalidity contentions relating to U.S. Pat. No. 3,841,522 to Hatcher ("Hatcher"), served Jul. 12, 2019, in 101 pages.
Exhibit 37 to Precision Planting LLC and AGCO Corporation's initial invalidity contentions relating to U.S. Pat. No. 3,913,503 to Becker ("Becker"), served Jul. 12, 2019, in 64 pages.
Exhibit 38 to Precision Planting LLC and AGCO Corporation's initial invalidity contentions relating to U.S. Pat. No. 3,982,661 to Feltrop ("Feltrop"), served Jul. 12, 2019, in 73 pages.
Exhibit 39 to Precision Planting LLC and AGCO Corporation's initial invalidity contentions relating to U.S. Pat. No. 4,023,509 to Hanson ("Hanson"), served Jul. 12, 2019, in 100 pages.
Exhibit 40 to Precision Planting LLC and AGCO Corporation's initial invalidity contentions relating to U.S. Pat. No. 4,026,437 to Biddle ("Biddle"), served Jul. 12, 2019, in 71 pages.
Exhibit 41 to Precision Planting LLC and AGCO Corporation's initial invalidity contentions relating to U.S. Pat. No. 4,029,235 ("Grataloup"), served Jul. 12, 2019, in 94 pages.
Exhibit 42 to Precision Planting LLC and AGCO Corporation's initial invalidity contentions relating to U.S. Pat. No. 4,193,523 to Koning ("Koning"), served Jul. 12, 2019, in 106 pages.
Exhibit 43 to Precision Planting LLC and AGCO Corporation's initial invalidity contentions relating to U.S. Pat. No. 4,239,126 to Dobson et al. ("Dobson"), served Jul. 12, 2019, in 72 pages.
Exhibit 44 to Precision Planting LLC and AGCO Corporation's initial invalidity contentions relating to U.S. Pat. No. 4,306,509 ("Hassan"), served Jul. 12, 2019, in 71 pages.
Exhibit 45 to Precision Planting LLC and AGCO Corporation's initial invalidity contentions relating to U.S. Pat. No. 4,324,347 to Thomas ("Thomas"), served Jul. 12, 2019, in 68 pages.
Exhibit 46 to Precision Planting LLC and AGCO Corporation's initial invalidity contentions relating to U.S. Pat. No. 4,449,642 ("Dooley"), served Jul. 12, 2019, in 130 pages.
Exhibit 47 to Precision Planting LLC and AGCO Corporation's initial invalidity contentions relating to U.S. Pat. No. 4,450,979 to Deckler ("Deckler '979"), served Jul. 12, 2019, in 79 pages.
Exhibit 48 to Precision Planting LLC and AGCO Corporation's initial invalidity contentions relating to U.S. Pat. No. 4,519,494 to McEvoy ("McEvoy"), served Jul. 12, 2019, in 55 pages.
Exhibit 49 to Precision Planting LLC and AGCO Corporation's initial invalidity contentions relating to U.S. Pat. No. 4,628,841 to Powilleit ("Powilleit"), served Jul. 12, 2019, in 79 pages.
Exhibit 50 to Precision Planting LLC and AGCO Corporation's initial invalidity contentions relating to U.S. Pat. No. 4,896,615 to Hood et al. ("Hood"), served Jul. 12, 2019, in 81 pages.
Exhibit 51 to Precision Planting LLC and AGCO Corporation's initial invalidity contentions relating to U.S. Pat. No. 4,915,258 to Olson ("Olson"), served Jul. 12, 2019, in 74 pages.
Exhibit 52 to Precision Planting LLC and AGCO Corporation's initial invalidity contentions relating to U.S. Pat. No. 5,058,766 to Deckler ("Deckler '766"), served Jul. 12, 2019, in 69 pages.
Exhibit 53 to Precision Planting LLC and AGCO Corporation's initial invalidity contentions relating to U.S. Pat. No. 5,167,317 to Van der Schoot ("Van der Schoot"), served Jul. 12, 2019, in 56 pages.
Exhibit 54 to Precision Planting LLC and AGCO Corporation's initial invalidity contentions relating to U.S. Pat. No. 5,402,741 to Traux et al. ("Traux"), served Jul. 12, 2019, in 74 pages.
Exhibit 55 to Precision Planting LLC and AGCO Corporation's initial invalidity contentions relating to U.S. Pat. No. 5,431,117 to Steffens et al. ("Steffens"), served Jul. 12, 2019, in 66 pages.
Exhibit 56 to Precision Planting LLC and AGCO Corporation's initial invalidity contentions relating to U.S. Pat. No. 5,784,985 to Lodico et al. ("Lodico"), served Jul. 12, 2019, in 68 pages.
Exhibit 57 to Precision Planting LLC and AGCO Corporation's initial invalidity contentions relating to U.S. Pat. No. 5,802,994 to Kinkead ("Kinkead"), served Jul. 12, 2019, in 67 pages.
Exhibit 58 to Precision Planting LLC and AGCO Corporation's initial invalidity contentions relating to U.S. Pat. No. 5,918,726 ("Temmink"), served Jul. 12, 2019, in 106 pages.
Exhibit 59 to Precision Planting LLC and AGCO Corporation's initial invalidity contentions relating to U.S. Pat. No. 5,992,338 ("Romans"), served Jul. 12, 2019, in 159 pages.
Exhibit 60 to Precision Planting LLC and AGCO Corporation's initial invalidity contentions relating to U.S. Pat. No. 6,000,528(A) to Van Maanen ("Van Maanen"), served Jul. 12, 2019, in 64 pages.
Exhibit 61 to Precision Planting LLC and AGCO Corporation's initial invalidity contentions relating to U.S. Pat. No. 6,173,664 to Heimbuch ("Heimbuch"), served Jul. 12, 2019, in 71 pages.
Exhibit 62 to Precision Planting LLC and AGCO Corporation's initial invalidity contentions relating to U.S. Pat. No. 6,244,201 to Mauch et al. ("Mauch"), served Jul. 12, 2019, in 85 pages.
Exhibit 63 to Precision Planting LLC and AGCO Corporation's initial invalidity contentions relating to U.S. Pat. No. 6,269,758 to Sauder ("Sauder '758"), served Jul. 12, 2019, in 72 pages.
Exhibit 64 to Precision Planting LLC and AGCO Corporation's initial invalidity contentions relating to U.S. Pat. No. 6,352,042 to Martin et al. ("Martin'042"), served Jul. 12, 2019, in 67 pages.
Exhibit 65 to Precision Planting LLC and AGCO Corporation's initial invalidity contentions relating to U.S. Pat. No. 6,516,733 to Sauder et al. ("Sauder '733"), served Jul. 12, 2019, in 108 pages.
Exhibit 66 to Precision Planting LLC and AGCO Corporation's initial invalidity contentions relating to U.S. Pat. No. 6,581,535 ("Barry"), served Jul. 12, 2019, in 62 pages.
Exhibit 67 to Precision Planting LLC and AGCO Corporation's initial invalidity contentions relating to U.S. Pat. No. 6,651,570 to Thiemke ("Thiemke"), served Jul. 12, 2019, in 90 pages.
Exhibit 68 to Precision Planting LLC and AGCO Corporation's initial invalidity contentions relating to U.S. Pat. No. 6,681,706 to Sauder et al. ("Sauder '706"), served Jul. 12, 2019, in 157 pages.
Exhibit 69 to Precision Planting LLC and AGCO Corporation's initial invalidity contentions relating to U.S. Pat. No. 6,748,885 ("Sauder '885"), served Jul. 12, 2019, in 210 pages.
Exhibit 70 to Precision Planting LLC and AGCO Corporation's initial invalidity contentions relating to U.S. Pat. No. 6,932,236 to Ven Huizen ("Ven Huizen '236"), served Jul. 12, 2019, in 78 pages.
Exhibit 71 to Precision Planting LLC and AGCO Corporation's initial invalidity contentions relating to U.S. Pat. No. 7,086,269 ("Sauder '269"), served Jul. 12, 2019, in 125 pages.
Exhibit 72 to Precision Planting LLC and AGCO Corporation's initial invalidity contentions relating to U.S. Pat. No. 7,162,963 to Sauder ("Sauder '963"), served Jul. 12, 2019, in 116 pages.
Exhibit 73 to Precision Planting LLC and AGCO Corporation's initial invalidity contentions relating to U.S. Pat. No. 7,490,565 B2 to Holly ("Holly '565"), served Jul. 12, 2019, in 86 pages.
Exhibit 74 to Precision Planting LLC and AGCO Corporation's initial invalidity contentions relating to U.S. Pat. No. 7,617,785 to Wendte ("Wendte"), served Jul. 12, 2019, in 76 pages.
Exhibit 75 to Precision Planting LLC and AGCO Corporation's initial invalidity contentions relating to U.S. Pat. No. 7,631,606 B2 to Sauder et al. ("Sauder '606"), served Jul. 12, 2019, in 81 pages.
Exhibit 76 to Precision Planting LLC and AGCO Corporation's initial invalidity contentions relating to U.S. Pat. No. 7,938,073 to Dunham et al. ("Dunham"), served Jul. 12, 2019, in 87 pages.
Exhibit 77 to Precision Planting LLC and AGCO Corporation's initial invalidity contentions relating to William Rowlan Ritchie, Aspects of Seed Transfer Within a Direct Drilling Coulter (Opener) (1982) (M.S. thesis, Massey University) (on file with author) ("Ritchie"), served Jul. 12, 2019, in 72 pages.
Exhibit 78 to Precision Planting LLC and AGCO Corporation's initial invalidity contentions relating to Breece, et al., Fundamentals of Machine Operation (1981) ("Breece"), served Jul. 12, 2019, in 226 pages.
Exhibit 79 to Precision Planting LLC and AGCO Corporation's initial invalidity contentions relating to L.P. Button, The Influence of Seed-Drill Design on the Spatial Arrangement of Seedlings and

(56) References Cited

OTHER PUBLICATIONS on Seedling Emergence, 72 Acta Horticulturae 135 (1978) ("Button"), served Jul. 12, 2019, in 57 pages.
Exhibit A to the Final Joint Claim Construction Chart, relating to U.S. Pat. No. 8,813,663 to Garner et al., filed Oct. 25, 2019 (Dkt. No. 158-1), in 17 pages.
Exhibit AA to the Final Joint Claim Construction Chart, relating to selections from U.S. Appl. No. 14/505,829 to Garner et al., filed Oct. 25, 2019 (Dkt. No. 158-27), in 8 pages.
Exhibit B to the Final Joint Claim Construction Chart, relating to U.S. Pat. No. 9,480,199 to Garner et al., filed Oct. 25, 2019 (Dkt. No. 158-2), in 17 pages.
Exhibit C to the Final Joint Claim Construction Chart, relating to U.S. Pat. No. 9,820,429 to Garner et al., filed Oct. 25, 2019 (Dkt. No. 158-3), in 18 pages.
Exhibit D to the Final Joint Claim Construction Chart, relating to U.S. Pat. No. 9,699,955 to Garner et al., filed Oct. 25, 2019 (Dkt. No. 158-4), in 18 pages.
Exhibit E to the Final Joint Claim Construction Chart, relating to U.S. Pat. No. 9,807,924 to Garner et al., filed Oct. 25, 2019 (Dkt. No. 158-5), in 18 pages.
Exhibit F to the Final Joint Claim Construction Chart, relating to U.S. Pat. No. 9,686,906 to Garner et al., filed Oct. 25, 2019 (Dkt. No. 158-6), in 18 pages.
Exhibit G to the Final Joint Claim Construction Chart, relating to U.S. Pat. No. 9,861,031 to Garner et al., filed Oct. 25, 2019 (Dkt. No. 158-7), in 17 pages.
Exhibit H to the Final Joint Claim Construction Chart, relating to U.S. Pat. No. 10,004,173 to Garner et al., filed Oct. 25, 2019 (Dkt. No. 158-8), in 18 pages.
Exhibit I to the Final Joint Claim Construction Chart, relating to U.S. Pat. No. 8,850,998 to Garner et al., filed Oct. 25, 2019 (Dkt. No. 158-9), in 23 pages.
Exhibit J to the Final Joint Claim Construction Chart, relating to U.S. Pat. No. 9,661,799 to Garner et al., filed Oct. 25, 2019 (Dkt. No. 158-10), in 24 pages.
Exhibit K to the Final Joint Claim Construction Chart, relating to U.S. Pat. No. 9,510,502 to Garner et al., filed Oct. 25, 2019 (Dkt. No. 158-11), in 33 pages.
Exhibit L to the Final Joint Claim Construction Chart, relating to U.S. Pat. No. 8,850,995 to Garner et al., filed Oct. 25, 2019 (Dkt. No. 158-12), in 17 pages.
Exhibit M to the Final Joint Claim Construction Chart, relating to selections from U.S. Appl. No. 13/943,561 to Garner et al., filed Oct. 25, 2019 (Dkt. No. 158-13), in 10 pages.
Exhibit N to the Final Joint Claim Construction Chart, relating to selections from U.S. Appl. No. 14/254,463 to Garner et al., filed Oct. 25, 2019 (Dkt. No. 158-14), in 6 pages.
Exhibit 0 to the Final Joint Claim Construction Chart, relating to selections from U.S. Appl. No. 14/254,463 to Garner et al., filed Oct. 25, 2019 (Dkt. No. 158-15), in 8 pages.
Exhibit P to the Final Joint Claim Construction Chart, relating to selections from U.S. Appl. No. 14/617,497 to Garner et al., filed Oct. 25, 2019 (Dkt. No. 158-16), in 10 pages.
Exhibit Q to the Final Joint Claim Construction Chart, relating to selections from U.S. Appl. No. 14/617,497 to Garner et al., filed Oct. 25, 2019 (Dkt. No. 158-17), in 11 pages.
Exhibit R to the Final Joint Claim Construction Chart, relating to selections from U.S. Appl. No. 14/704,513 to Garner et al., filed Oct. 25, 2019 (Dkt. No. 158-18), in 10 pages.
Exhibit S to the Final Joint Claim Construction Chart, relating to selections from U.S. Appl. No. 14/704,568 to Garner et al., filed Oct. 25, 2019 (Dkt. No. 158-19), in 10 pages.
Exhibit T to the Final Joint Claim Construction Chart, relating to selections from U.S. Appl. No. 14/704,568 to Garner et al., filed Oct. 25, 2019 (Dkt. No. 158-20), in 10 pages.
Exhibit U to the Final Joint Claim Construction Chart, relating to selections from U.S. Appl. No. 14/705,004 to Garner et al., filed Oct. 25, 2019 (Dkt. No. 158-21), in 10 pages.
Exhibit V to the Final Joint Claim Construction Chart, relating to selections from U.S. Appl. No. 14/616,877 to Garner et al., filed Oct. 25, 2019 (Dkt. No. 158-22), in 11 pages.
Exhibit W to the Final Joint Claim Construction Chart, relating to selections from U.S. Appl. No. 14/616,877 to Garner et al., filed Oct. 25, 2019 (Dkt. No. 158-23), in 9 pages.
Exhibit X to the Final Joint Claim Construction Chart, relating to selections from U.S. Appl. No. 15/674,122 to Garner et al., filed Oct. 25, 2019 (Dkt. No. 158-24), in 12 pages.
Exhibit Y to the Final Joint Claim Construction Chart, relating to selections from U.S. Appl. No. 13/072,051 to Garner et al., filed Oct. 25, 2019 (Dkt. No. 158-25), in 11 pages.
Exhibit Z to the Final Joint Claim Construction Chart, relating to selections from U.S. Appl. No. 14/215,182 to Garner et al., filed Oct. 25, 2019 (Dkt. No. 158-26), in 10 pages.
Exhibits 1-15 to Joint Claim Construction Brief, filed Oct. 25, 2019 (Dkt. No. 160-1), in 142 pages.
Exhibits 16-28 to Joint Claim Construction Brief, filed Oct. 25, 2019 (Dkt. No. 160-2), in 300 pages.
Exhibits 29-31 to Joint Claim Construction Brief, filed Oct. 25, 2019 (Dkt. No. 160-3), in 29 pages.
Exhibits 32-33 to Joint Claim Construction Brief, filed Oct. 25, 2019 (Dkt. No. 160-4), in 102 pages.
Extended European Search Report and Written Opinion issued in European Patent Application No. 10152013.8, dated May 27, 2010, in 7 pages.
Final Joint Claim Construction Chart, filed Oct. 25, 2019 (Dkt. No. 158), in 18 pages.
Joint Appendix B To Joint Claim Construction Brief, filed Oct. 25, 2019 (Dkt. No. 160), in 4 pages.
Joint Claim Construction Brief, filed Oct. 25, 2019 (Dkt. No. 159), in 143 pages.
Petition for Inter Partes Review of U.S. Pat. No. 10,004,173 filed on behalf of Precision Planting, LLC and AGCO Corp., filed on Jun. 3, 2019, in 108 pages.
Petition for Inter Partes Review of U.S. Pat. No. 8,813,663 filed on behalf of Precision Planting, LLC and AGCO Corp., filed on May 29, 2019, in 92 pages.
Petition for Inter Partes Review of U.S. Pat. No. 9,480,199 filed on behalf of Precision Planting, LLC and AGCO Corp., filed on May 31, 2019, in 90 pages.
Petition for Inter Partes Review of U.S. Pat. No. 9,686,906 filed on behalf of Precision Planting, LLC and AGCO Corp., filed on May 30, 2019, in 99 pages.
Petition for Inter Partes Review of U.S. Pat. No. 9,699,955 filed on behalf of Precision Planting, LLC and AGCO Corp., filed on May 31, 2019, in 90 pages.
Petition for Inter Partes Review of U.S. Pat. No. 9,807,924 filed on behalf of Precision Planting, LLC and AGCO Corp., filed on May 29, 2019, in 96 pages.
Petition for Inter Partes Review of U.S. Pat. No. 9,820,429 filed on behalf of Precision Planting, LLC and AGCO Corp., filed on May 31, 2019, in 102 pages.
Petition for Inter Partes Review of U.S. Pat. No. 9,861,031 filed on behalf of Precision Planting, LLC and AGCO Corp., filed on May 29, 2019, in 95 pages.
Precision Planting LLC and AGCO Corporation's initial invalidity contentions pursuant to Paragraph 4.d. of the District of Delaware Default Standard for Discovery, served Jul. 12, 2019, in 657 pages.
Ritchie, William Rowlan. Aspects of seed transfer within a direct drilling coulter (opener): a thesis presented in partial fulfilment of the requirements for the degree of Master of Agricultural Science in Agricultural Mechanisation at Massriey University. Diss. Massey University, 1982, in 162 pages.
International Search Report and Written Opinion, re PCT Application No. PCT/US2012/030306, dated Jun. 20, 2012, in 12 pages.
Schmidt Ag Services | Seed (accessed on May 28, 2020), in 1 page. URL: https://schmidtag.com/seed/ (filed as Exhibit 1063 to the Inter Partes Review of U.S. Pat. No. 9,861,031 filed on behalf of Precision Planting, LLC and AGCO Corp.).
Chen, Jiafa, et al. "The genetic basis of natural variation in kernel size and related traits using a four-way cross population in maize." PLoS One 11.4 (2016): e0153428, in 12 pages (filed as Exhibit 1138

(56) References Cited

OTHER PUBLICATIONS to the Inter Partes Review of U.S. Pat. No. 9,861,031 filed on behalf of Precision Planting, LLC and AGCO Corp.).
Deere Abandons Proposed Acquisition of Precision Planting from Monsanto | Decision to Terminate Deal Preserves Competition in High-Speed Precision Planting Systems Market (published on May 1, 2017) (accessed on May 27, 2020), in 2 pages. URL: https://www.justice.gov/opa/pr/deere-abandons-proposed-acquisition-precision-planting-monsanto (filed as Exhibit 1077 to the Inter Partes Review of U.S. Pat. No. 9,861,031 filed on behalf of Precision Planting, LLC and AGCO Corp.).
Excerpt(s) from Berube, Margery S., and David A. Jost, eds. The American heritage college dictionary. Houghton Mifflin, 2010 (definition of accelerate), in 3 pages (filed as Exhibit 1071 to the Inter Partes Review of U.S. Pat. No. 9,861,031 filed on behalf of Precision Planting, LLC and AGCO Corp.).
Excerpt(s) from Cald, I. "Cambridge Advanced Learner's Dictionary, ed. by Patrick Gillard, Kate Woodford & Guy Jackson." (2003), in 3 pages (filed as Exhibit 1033 to the Inter Partes Review of U.S. Pat. No. 9,807,922 filed on behalf of Precision Planting, LLC and AGCO Corp.).
Excerpt(s) from Dictionary, Concise Oxford English. "Edited by Catherine Soanes and Angus Stevenson." (2008) (definition of capture), in 3 pages (filed as Exhibit 1116 to the Inter Partes Review of U.S. Pat. No. 9,861,031 filed on behalf of Precision Planting, LLC and AGCO Corp.).
Excerpt(s) from Dictionary, Concise Oxford English. "Edited by Catherine Soanes and Angus Stevenson." (2008) (definition of adjacent), in 3 pages (filed as Exhibit 1144 to the Inter Partes Review of U.S. Pat. No. 9,820,429 filed on behalf of Precision Planting, LLC and AGCO Corp.).
Excerpt(s) from Grove, Phillip. Webster's third new international dictionary. Merriam-Webster Incorporated, 2002 (definition of sweep), in 3 pages (filed as Exhibit 1032 to the Inter Partes Review of U.S. Pat. No. 9,820,429 filed on behalf of Precision Planting, LLC and AGCO Corp.).
Excerpt(s) from Grove, Phillip. Webster's third new international dictionary. Merriam-Webster Incorporated, 2002 (definition of nip), in 4 pages (filed as Exhibit 1025 to the Inter Partes Review of U.S. Pat. No. 9,699,955 filed on behalf of Precision Planting, LLC and AGCO Corp.).
Excerpt(s) from Guralnik, David Bernard, and Michael Agnes. Webster's new world college dictionary. Wiley Pub., 2009 (definition of adjacent), in 3 pages (filed as Exhibit 1145 to the Inter Partes Review of U.S. Pat. No. 9,820,429 filed on behalf of Precision Planting, LLC and AGCO Corp.).
Excerpt(s) from Hunt, Donnell. Farm power and machinery management. Waveland Press, 2008, in 6 pages (filed as Exhibit 1128 to the Inter Partes Review of U.S. Pat. No. 9,861,031 filed on behalf of Precision Planting, LLC and AGCO Corp.).
Excerpt(s) from Kramer, Samuel Noah. "History Begins at Sumer: Twenty-seven" Firsts. Man's Recorded History (1959), in 13 pages (filed as Exhibit 1019 to the Inter Partes Review of U.S. Pat. No. 8,813,663 filed on behalf of Precision Planting, LLC and AGCO Corp.).
Excerpt(s) from Staff, Merriam-Webster. Merriam-Webster's collegiate dictionary. vol. 2. Merriam-Webster, 2004 (definition of nip), in 3 pages (filed as Exhibit 1026 to the Inter Partes Review of U.S. Pat. No. 9,699,955 filed on behalf of Precision Planting, LLC and AGCO Corp.).
Excerpts from Kepner, R. A., R. Bainer, and E. L. Barger. "Principles of farm machinery third edition." (1978), in 12 pages (filed as Exhibit 1106 to the Inter Partes Review of U.S. Pat. No. 9,861,031 filed on behalf of Precision Planting, LLC and AGCO Corp.).
Excerpts from Waite, Maurice. Oxford American desk dictionary and thesaurus. Oxford University Press (definition of loop), in 3 pages (filed as Exhibit 1110 to the Inter Partes Review of U.S. Pat. No. 9,861,031 filed on behalf of Precision Planting, LLC and AGCO Corp.).

Exhibit 1002 to Petition for Inter Partes Review of U.S. Pat. No. 9,510,502 filed on behalf of Precision Planting, LLC and AGCO Corp.: Declaration of Randal K. Taylor, filed on May 24, 2019, in 130 pages.
Exhibit 1094 to the Inter Partes Review of U.S. Pat. No. 9,861,031 filed on behalf of Precision Planting, LLC and AGCO Corp., Comparison of Petitioner's Proposed Combination and SpeedTube, filed Jun. 26, 2020, in 1 page.
Exhibit 1135 to Reply to Patent Owner Response for the Inter Partes Review of U.S. Pat. No. 9,861,031 filed on behalf of Precision Planting, LLC and AGCO Corp.: Reply Declaration of Douglas S. Prairie in Support of Petitioners' Reply to Patent Owner Response, filed Jun. 26, 2020, in 125 pages.
Exhibit 1135 to Reply to Patent Owner Response for the Inter Partes Review of U.S. Pat. No. 9,820,429 filed on behalf of Precision Planting, LLC and AGCO Corp.: Reply Declaration of Douglas S. Prairie in Support of Petitioners' Reply to Patent Owner Response, filed Jul. 31, 2020 in 128 pages.
Exhibit 1135 to Reply to Patent Owner Response for the Inter Partes Review of U.S. Pat. No. 10,004,173 filed on behalf of Precision Planting, LLC and AGCO Corp.: Reply Declaration of Douglas S. Prairie in Support of Petitioners' Reply to Patent Owner Response, filed Jul. 31, 2020, in 129 pages.
Exhibit 1135 to Reply to Patent Owner Response for the Inter Partes Review of U.S. Pat. No. 9,807,924 filed on behalf of Precision Planting, LLC and AGCO Corp.: Reply Declaration of Randal Taylor in Support of Petitioners' Reply to Patent Owner Response, filed Jun. 26, 2020, in 97 pages.
Exhibit 1135 to Reply to Patent Owner Response for the Inter Partes Review of U.S. Pat. No. 8,813,663 filed on behalf of Precision Planting, LLC and AGCO Corp.: Reply Declaration of Douglas S. Prairie in Support of Petitioners' Reply to Patent Owner Response, filed Jun. 26, 2020, in 124 pages.
Exhibit 1135 to Reply to Patent Owner Response for the Inter Partes Review of U.S. Pat. No. 9,807,922 filed on behalf of Precision Planting, LLC and AGCO Corp.: Reply Declaration of Douglas S. Prairie in Support of Petitioners' Reply to Patent Owner Response, filed Aug. 3, 2020, in 83 pages.
Exhibit 1135 to Reply to Patent Owner Response for the Inter Partes Review of U.S. Pat. No. 9,480,199 filed on behalf of Precision Planting, LLC and AGCO Corp.: Reply Declaration of Douglas S. Prairie in Support of Petitioners' Reply to Patent Owner Response, filed Jun. 29, 2020, in 128 pages.
Exhibit 1135 to Reply to Patent Owner Response for the Inter Partes Review of U.S. Pat. No. 9,686,906 filed on behalf of Precision Planting, LLC and AGCO Corp.: Reply Declaration of Randal Taylor in Support of Petitioners' Reply to Patent Owner Response, filed Jun. 26, 2020, in 99 pages.
Exhibit 1135 to Reply to Patent Owner Response for the Inter Partes Review of U.S. Pat. No. 9,699,955 filed on behalf of Precision Planting, LLC and AGCO Corp.: Reply Declaration of Douglas S. Prairie in Support of Petitioners' Reply to Patent Owner Response, filed Jun. 29, 2020, in 119 pages.
Exhibit 1141 to the Inter Partes Review of U.S. Pat. No. 10,004,173 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 8,813,663 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,480,199 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,686,906 filed on behalf of Precision Planting, LLC and AGCO Corp.: Declaration of Myles McDonagh, filed Aug. 17, 2020, in 5 pages.
Exhibit 1141 to the Inter Partes Review of U.S. Pat. No. 9,699,955 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,807,922 filed on behalf of Precision Planting, LLC and AGCO Corp.: Declaration of Myles McDonagh, filed Aug. 3, 2020, in 6 pages.

(56) References Cited

OTHER PUBLICATIONS

Exhibit 1141 to the Inter Partes Review of U.S. Pat. No. 9,807,924 filed on behalf of Precision Planting, LLC and AGCO Corp.: Declaration of Myles McDonagh, filed Aug. 17, 2020, in 5 pages.
Exhibit 1141 to the Inter Partes Review of U.S. Pat. No. 9,820,429 filed on behalf of Precision Planting, LLC and AGCO Corp.: Declaration of Myles McDonagh, filed Jul. 30, 2020, in 6 pages.
Exhibit 1141 to the Inter Partes Review of U.S. Pat. No. 9,861,031 filed on behalf of Precision Planting, LLC and AGCO Corp.: Declaration of Myles McDonagh, filed Aug. 17, 2020, in 6 pages.
Exhibit 1146-1 to the Inter Partes Review of U.S. Pat. No. 10,004,173 filed on behalf of Precision Planting, LLC and AGCO Corp.: Petitioners' Trial Hearing Presentation—Part 1 of 3, filed Oct. 1, 2020, in 93 pages.
Exhibit 1146-1 to the Inter Partes Review of U.S. Pat. No. 9,807,922 filed on behalf of Precision Planting, LLC and AGCO Corp.: Petitioners' Trial Hearing Presentation—Part 1 of 3, filed Oct. 1, 2020, in 93 pages.
Exhibit 1146-1 to the Inter Partes Review of U.S. Pat. No. 9,820,429 filed on behalf of Precision Planting, LLC and AGCO Corp.: Petitioners' Trial Hearing Presentation—Part 1 of 3, filed Oct. 1, 2020, in 93 pages.
Exhibit 1146-2 to the Inter Partes Review of U.S. Pat. No. 10,004,173 filed on behalf of Precision Planting, LLC and AGCO Corp.: Petitioners' Trial Hearing Presentation—Part 2 of 3, filed Oct. 1, 2020, in 84 pages.
Exhibit 1146-2 to the Inter Partes Review of U.S. Pat. No. 9,807,922 filed on behalf of Precision Planting, LLC and AGCO Corp.: Petitioners' Trial Hearing Presentation—Part 2 of 3, filed Oct. 1, 2020, in 84 pages.
Exhibit 1146-2 to the Inter Partes Review of U.S. Pat. No. 9,820,429 filed on behalf of Precision Planting, LLC and AGCO Corp.: Petitioners' Trial Hearing Presentation—Part 2 of 3, filed Oct. 1, 2020, in 84 pages.
Exhibit 1146-3 to the Inter Partes Review of U.S. Pat. No. 10,004,173 filed on behalf of Precision Planting, LLC and AGCO Corp.: Petitioners' Trial Hearing Presentation—Part 3 of 3, filed Oct. 1, 2020, in 106 pages.
Exhibit 1146-3 to the Inter Partes Review of U.S. Pat. No. 9,807,922 filed on behalf of Precision Planting, LLC and AGCO Corp.: Petitioners' Trial Hearing Presentation—Part 3 of 3, filed Oct. 1, 2020, in 106 pages.
Exhibit 1146-3 to the Inter Partes Review of U.S. Pat. No. 9,820,429 filed on behalf of Precision Planting, LLC and AGCO Corp.: Petitioners' Trial Hearing Presentation—Part 3 of 3, filed Oct. 1, 2020, in 106 pages.
Exhibit 1147-1 to the Inter Partes Review of U.S. Pat. No. 8,813,663 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,480,199 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,686,906 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,699,955 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,807,924 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,861,031 filed on behalf of Precision Planting, LLC and AGCO Corp.: Petitioners' Trial Hearing Presentation—Part 1 of 2, filed Aug. 21, 2020, in 150 pages.
Exhibit 1147-2 to the Inter Partes Review of U.S. Pat. No. 8,813,663 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,480,199 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,686,906 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,699,955 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,807,924 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,861,031 filed on behalf of Precision Planting, LLC and AGCO Corp.: Petitioners' Trial Hearing Presentation—Part 2 of 2, filed Aug. 21, 2020, in 143 pages.
Exhibit 2018 to the Inter Partes Review of U.S. Pat. No. 10,004,173 filed on behalf of Precision Planting, LLC and AGCO Corp.: Declaration of Randal K. Taylor, filed Nov. 14, 2019, in 156 pages.
Exhibit 2018 to the Inter Partes Review of U.S. Pat. No. 9,699,955 filed on behalf of Precision Planting, LLC and AGCO Corp.: Declaration of Randal K. Taylor, filed Nov. 14, 2019, in 156 pages.
Exhibit 2018 to the Inter Partes Review of U.S. Pat. No. 9,807,922 filed on behalf of Precision Planting, LLC and AGCO Corp.: Declaration of Randal K. Taylor, filed Nov. 14, 2019, in 156 pages.
Exhibit 2025 to the Inter Partes Review of U.S. Pat. No. 10,004,173 filed on behalf of Precision Planting, LLC and AGCO Corp.: Declaration of Daniel B. Thiemke, filed Apr. 22, 2020, in 15 pages.
Exhibit 2025 to the Inter Partes Review of U.S. Pat. No. 8,813,663 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,480,199 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,686,906 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,699,955 filed on behalf of Precision Planting, LLC and AGCO Corp.: Declaration of Daniel B. Thiemke, filed Mar. 24, 2020, in 15 pages.
Exhibit 2025 to the Inter Partes Review of U.S. Pat. No. 9,807,922 filed on behalf of Precision Planting, LLC and AGCO Corp.: Declaration of Daniel B. Thiemke, filed Apr. 27, 2020, in 15 pages.
Exhibit 2025 to the Inter Partes Review of U.S. Pat. No. 9,807,924 filed on behalf of Precision Planting, LLC and AGCO Corp.: Declaration of Daniel B. Thiemke, filed Mar. 24, 2020, in 15 pages.
Exhibit 2025 to the Inter Partes Review of U.S. Pat. No. 9,820,429 filed on behalf of Precision Planting, LLC and AGCO Corp.: Declaration of Daniel B. Thiemke, filed Apr. 23, 2020, in 15 pages.
Exhibit 2025 to the Inter Partes Review of U.S. Pat. No. 9,861,031 filed on behalf of Precision Planting, LLC and AGCO Corp.: Declaration of Daniel B. Thiemke, filed Mar. 24, 2020, in 15 pages.
Exhibit 2031 to the Inter Partes Review of U.S. Pat. No. 10,004,173 filed on behalf of Precision Planting, LLC and AGCO Corp.: Declaration of Rodney L. Schmidt, filed Apr. 22, 2020, in 9 pages.
Exhibit 2031 to the Inter Partes Review of U.S. Pat. No. 8,813,663 filed on behalf of Precision Planting, LLC and AGCO Corp.: Declaration of Rodney L. Schmidt, filed Mar. 20, 2020, in 9 pages.
Exhibit 2031 to the Inter Partes Review of U.S. Pat. No. 9,480,199 filed on behalf of Precision Planting, LLC and AGCO Corp.: Declaration of Rodney L. Schmidt, filed Mar. 20, 2020, in 9 pages.
Exhibit 2031 to the Inter Partes Review of U.S. Pat. No. 9,686,906 filed on behalf of Precision Planting, LLC and AGCO Corp.: Declaration of Rodney L. Schmidt, filed Mar. 20, 2020, in 9 pages.

(56) References Cited

OTHER PUBLICATIONS

Exhibit 2031 to the Inter Partes Review of U.S. Pat. No. 9,699,955 filed on behalf of Precision Planting, LLC and AGCO Corp.: Declaration of Rodney L. Schmidt, filed Mar. 24, 2020, in 9 pages.
Exhibit 2031 to the Inter Partes Review of U.S. Pat. No. 9,807,922 filed on behalf of Precision Planting, LLC and AGCO Corp.: Declaration of Rodney L. Schmidt, filed Apr. 27, 2020, in 9 pages.
Exhibit 2031 to the Inter Partes Review of U.S. Pat. No. 9,807,924 filed on behalf of Precision Planting, LLC and AGCO Corp.: Declaration of Rodney L. Schmidt, filed Mar. 24, 2020, in 9 pages.
Exhibit 2031 to the Inter Partes Review of U.S. Pat. No. 9,820,429 filed on behalf of Precision Planting, LLC and AGCO Corp.: Declaration of Rodney L. Schmidt, filed Apr. 23, 2020, in 9 pages.
Exhibit 2031 to the Inter Partes Review of U.S. Pat. No. 9,861,031 filed on behalf of Precision Planting, LLC and AGCO Corp.: Declaration of Rodney L. Schmidt, filed Mar. 24, 2020, in 9 pages.
Exhibit 2032 to the Inter Partes Review of U.S. Pat. No. 10,004,173 filed on behalf of Precision Planting, LLC and AGCO Corp.: Declaration of Lucas Veale, filed Apr. 22, 2020, in 11 pages.
Exhibit 2032 to the Inter Partes Review of U.S. Pat. No. 8,813,663 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,480,199 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,686,906 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,699,955 filed on behalf of Precision Planting, LLC and AGCO Corp.: Declaration of Lucas Veale, filed Mar. 24, 2020, in 11 pages.
Exhibit 2032 to the Inter Partes Review of U.S. Pat. No. 9,807,922 filed on behalf of Precision Planting, LLC and AGCO Corp.: Declaration of Lucas Veale, filed Apr. 27, 2020, in 11 pages.
Exhibit 2032 to the Inter Partes Review of U.S. Pat. No. 9,807,924 filed on behalf of Precision Planting, LLC and AGCO Corp.: Declaration of Lucas Veale, filed Mar. 24, 2020, in 11 pages.
Exhibit 2032 to the Inter Partes Review of U.S. Pat. No. 9,861,031 filed on behalf of Precision Planting, LLC and AGCO Corp.: Declaration of Lucas Veale, filed Mar. 24, 2020, in 11 pages.
Exhibit 2033 to the Inter Partes Review of U.S. Pat. No. 10,004,173 filed on behalf of Precision Planting, LLC and AGCO Corp.: REDACTED Declaration of William R. Hough, filed Apr. 22, 2020, in 24 pages.
Exhibit 2033 to the Inter Partes Review of U.S. Pat. No. 8,813,663 filed on behalf of Precision Planting, LLC and AGCO Corp.: REDACTED Declaration of William R. Hough, filed Mar. 20, 2020, in 24 pages.
Exhibit 2033 to the Inter Partes Review of U.S. Pat. No. 9,480,199 filed on behalf of Precision Planting, LLC and AGCO Corp.: REDACTED Declaration of William R. Hough, filed Mar. 20, 2020, in 24 pages.
Exhibit 2033 to the Inter Partes Review of U.S. Pat. No. 9,686,906 filed on behalf of Precision Planting, LLC and AGCO Corp.: REDACTED Declaration of William R. Hough, filed Mar. 20, 2020, in 24 pages.
Exhibit 2033 to the Inter Partes Review of U.S. Pat. No. 9,699,955 filed on behalf of Precision Planting, LLC and AGCO Corp.: REDACTED Declaration of William R. Hough, filed Mar. 24, 2020, in 24 pages.
Exhibit 2033 to the Inter Partes Review of U.S. Pat. No. 9,807,922 filed on behalf of Precision Planting, LLC and AGCO Corp.: REDACTED Declaration of William R. Hough, filed Apr. 27, 2020, in 24 pages.
Exhibit 2033 to the Inter Partes Review of U.S. Pat. No. 9,807,924 filed on behalf of Precision Planting, LLC and AGCO Corp.: REDACTED Declaration of William R. Hough, filed Mar. 24, 2020, in 24 pages.
Exhibit 2033 to the Inter Partes Review of U.S. Pat. No. 9,820,429 filed on behalf of Precision Planting, LLC and AGCO Corp.: REDACTED Declaration of William R. Hough, filed Apr. 23, 2020, in 24 pages.
Exhibit 2033 to the Inter Partes Review of U.S. Pat. No. 9,861,031 filed on behalf of Precision Planting, LLC and AGCO Corp.: REDACTED Declaration of William R. Hough, filed Mar. 24, 2020, in 24 pages.
Exhibit 2200 to Patent Owner Response for the Inter Partes Review of U.S. Pat. No. 8,813,663 filed on behalf of Precision Planting, LLC and AGCO Corp.: Declaration of Dr. James L. Glancey, Ph.D., P.E., filed Mar. 20, 2020, in 303 pages.
Exhibit 2201 to Patent Owner Response for the Inter Partes Review of U.S. Pat. No. 9,861,031 filed on behalf of Precision Planting, LLC and AGCO Corp.: Declaration of Dr. James L. Glancey, Ph.D., P.E., filed Mar. 24, 2020, in 304 pages.
Exhibit 2202 to Patent Owner Response for the Inter Partes Review of U.S. Pat. No. 9,699,955 filed on behalf of Precision Planting, LLC and AGCO Corp.: Declaration of Dr. James L. Glancey, Ph.D., P.E., filed Mar. 24, 2020, in 307 pages.
Exhibit 2203 to Patent Owner Response for the Inter Partes Review of U.S. Pat. No. 10,004,173 filed on behalf of Precision Planting, LLC and AGCO Corp.: Declaration of Dr. James L. Glancey, Ph.D., P.E., filed Apr. 22, 2020, in 315 pages.
Exhibit 2204 to Patent Owner Response for the Inter Partes Review of U.S. Pat. No. 9,820,429 filed on behalf of Precision Planting, LLC and AGCO Corp.: Declaration of Dr. James L. Glancey, Ph.D., P.E., filed Apr. 23, 2020, in 334 pages.
Exhibit 2205 to Patent Owner Response for the Inter Partes Review of U.S. Pat. No. 9,480,199 filed on behalf of Precision Planting, LLC and AGCO Corp.: Declaration of Dr. James L. Glancey, Ph.D., P.E., filed Mar. 20, 2020, in 297 pages.
Exhibit 2206 to Patent Owner Response for the Inter Partes Review of U.S. Pat. No. 9,686,906 filed on behalf of Precision Planting, LLC and AGCO Corp.: Declaration of Dr. James L. Glancey, Ph.D., P.E., filed Mar. 20, 2020, in 266 pages.
Exhibit 2207 to Patent Owner Response for the Inter Partes Review of U.S. Pat. No. 9,807,924 filed on behalf of Precision Planting, LLC and AGCO Corp.: Declaration of Dr. James L. Glancey, Ph.D., P.E., filed Mar. 24, 2020, in 269 pages.
Exhibit 2208 to Patent Owner Response for the Inter Partes Review of U.S. Pat. No. 9,807,922 filed on behalf of Precision Planting, LLC and AGCO Corp.: Declaration of Dr. James L. Glancey, Ph.D., P.E., filed April Tl, 2020, in 174 pages.
Exhibit 2230 to the Inter Partes Review of U.S. Pat. No. 8,813,663 filed on behalf of Precision Planting, LLC and AGCO Corp.: Declaration of Raj Paul, filed Mar. 20, 2020, in 29 pages.
Exhibit 2231 to the Inter Partes Review of U.S. Pat. No. 9,861,031 filed on behalf of Precision Planting, LLC and AGCO Corp.: Declaration of Raj Paul, filed Mar. 24, 2020, in 29 pages.
Exhibit 2232 to the Inter Partes Review of U.S. Pat. No. 9,699,955 filed on behalf of Precision Planting, LLC and AGCO Corp.: Declaration of Raj Paul, filed Mar. 24, 2020, in 29 pages.
Exhibit 2233 to the Inter Partes Review of U.S. Pat. No. 10,004,173 filed on behalf of Precision Planting, LLC and AGCO Corp.: Declaration of Raj Paul, filed Apr. 22, 2020, in 29 pages.
Exhibit 2234 to the Inter Partes Review of U.S. Pat. No. 9,820,429 filed on behalf of Precision Planting, LLC and AGCO Corp.: Declaration of Raj Paul, filed Apr. 23, 2020, in 30 pages.
Exhibit 2235 to the Inter Partes Review of U.S. Pat. No. 9,480,199 filed on behalf of Precision Planting, LLC and AGCO Corp.: Declaration of Raj Paul, filed Mar. 20, 2020, in 29 pages.
Exhibit 2236 to the Inter Partes Review of U.S. Pat. No. 9,686,906 filed on behalf of Precision Planting, LLC and AGCO Corp.: Declaration of Raj Paul, filed Mar. 20, 2020, in 29 pages.
Exhibit 2237 to the Inter Partes Review of U.S. Pat. No. 9,807,924 filed on behalf of Precision Planting, LLC and AGCO Corp.: Declaration of Raj Paul, filed Mar. 24, 2020, in 29 pages.
Exhibit 2238 to the Inter Partes Review of U.S. Pat. No. 9,807,922 filed on behalf of Precision Planting, LLC and AGCO Corp.: Declaration of Raj Paul, filed Apr. 27, 2020, in 29 pages.
Exhibit 2271 to the Inter Partes Review of U.S. Pat. No. 9,686,906 filed on behalf of Precision Planting, LLC and AGCO Corp.:

(56) References Cited

OTHER PUBLICATIONS

Excerpt(s) from the Declaration of Dr. James L. Glancey, Ph.D., P.E., filed Aug. 5, 2020, in 6 pages.
Exhibit 2271 to the Inter Partes Review of U.S. Pat. No. 9,807,924 filed on behalf of Precision Planting, LLC and AGCO Corp.: Excerpt(s) from the Declaration of Dr. James L. Glancey, Ph.D., P.E., filed Aug. 7, 2020, in 6 pages.
Exhibit 2272 to the Inter Partes Review of U.S. Pat. No. 8,813,663 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,480,199 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,686,906 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,699,955 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,807,924 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,861,031 filed on behalf of Precision Planting, LLC and AGCO Corp.: Deere's Trial Demonstratives, filed Aug. 20, 2020, in 223 pages.
Exhibit 2275 to the Inter Partes Review of U.S. Pat. No. 10,004,173 filed on behalf of Precision Planting, LLC and AGCO Corp.: Deere's Trial Demonstratives, filed Oct. 2, 2020, in 250 pages.
Exhibit 2275 to the Inter Partes Review of U.S. Pat. No. 9,807,922 filed on behalf of Precision Planting, LLC and AGCO Corp.: Deere's Trial Demonstratives, filed Oct. 2, 2020, in 250 pages.
Exhibit 2275 to the Inter Partes Review of U.S. Pat. No. 9,820,429 filed on behalf of Precision Planting, LLC and AGCO Corp.: Deere's Trial Demonstratives, filed Oct. 2, 2020, in 250 pages.
Extended European Search Report and Written Opinion issued in European Patent Application No. 15152645.6, dated Jun. 18, 2015, in 6 pages.
Extended European Search Report and Written Opinion issued in European Patent Application No. 15152614.2, dated Jun. 18, 2015, 7 pages.
Extended European Search Report and Written Opinion issued in European Patent Application No. 15152071.5, dated Jun. 18, 2015, in 7 pages.
Extended European Search Report and Written Opinion issued in European Patent Application No. 15152076.4, dated Jun. 18, 2015, in 7 pages.
Extended European Search Report and Written Opinion issued in European Patent Application No. 12764844.2, dated Jun. 10, 2015, in 6 pages.
Extended European Search Report and Written Opinion issued in European Patent Application No. 12763381.6, dated Jun. 12, 2015, in 6 pages.
Extended European Search Report and Written Opinion issued in European Patent Application No. 12765056.2, dated Jun. 11, 2015, in 7 pages.
Extended European Search Report and Written Opinion issued in European Patent Application No. 10736588.4, dated Jul. 16, 2013, in 9 pages.
Extended European Search Report and Written Opinion issued in European Patent Application No. 11862395.8, dated Jun. 9, 2015, in 6 pages.
Extended European Search Report and Written Opinion issued in European Patent Application No. 11862750.4, dated Aug. 28, 2014, in 7 pages.
Extended European Search Report and Written Opinion issued in European Patent Application No. 10152014.6, dated May 27, 2010, in 6 pages.
Field demo shows planter hits mark at high speed | The Western Producer (published on Sep. 5, 2015) (accessed on May 4, 2020), in 1 page. URL: https://www.producer.com/2014/09/field-demo-shows-planter-hits-mark-at-high-speed/(filed as Exhibit 1104 to the Inter Partes Review of U.S. Pat. No. 9,861,031 filed on behalf of Precision Planting, LLC and AGCO Corp.).
Final Written Decision for the Inter Partes Review of U.S. Pat. No. 8,813,663 filed on behalf of Precision Planting, LLC and AGCO Corp., issued Nov. 30, 2020, in 49 pages.
Final Written Decision for the Inter Partes Review of U.S. Pat. No. 9,480,199 filed on behalf of Precision Planting, LLC and AGCO Corp., issued Nov. 30, 2020, in 39 pages.
Final Written Decision for the Inter Partes Review of U.S. Pat. No. 9,861,031 filed on behalf of Precision Planting, LLC and AGCO Corp., issued Dec. 4, 2020, in 49 pages.
Final Written Decision for the Inter Partes Review of U.S. Pat. No. 9,699,955 filed on behalf of Precision Planting, LLC and AGCO Corp., issued Dec. 15, 2020, in 48 pages.
Final Written Decision for the Inter Partes Review of U.S. Pat. No. 9,807,924 filed on behalf of Precision Planting, LLC and AGCO Corp., issued Dec. 15, 2020, in 42 pages.
Final Written Decision for the Inter Partes Review of U.S. Pat. No. 9,686,906 filed on behalf of Precision Planting, LLC and AGCO Corp., issued Dec. 2, 2020, in 37 pages.
Final Written Decision for the Inter Partes Review of U.S. Pat. No. 9,807,922 filed on behalf of Precision Planting, LLC and AGCO Corp., issued Dec. 28, 2020, in 45 pages.
Final Written Decision for the Inter Partes Review of U.S. Pat. No. 9,820,429 filed on behalf of Precision Planting, LLC and AGCO Corp., issued Dec. 31, 2020, in 47 pages.
Final Written Decision for the Inter Partes Review of U.S. Pat. No. 10,004,173 filed on behalf of Precision Planting, LLC and AGCO Corp., issued Jan. 11, 2021, in 46 pages.
History of IA Crops—Living History Farms | leaning-fields (accessed on May 28, 2020), in 2 pages. URL: https://www.lhf.org/learning-fields (filed as Exhibit 1064 to the Inter Partes Review of U.S. Pat. No. 9,861,031 filed on behalf of Precision Planting, LLC and AGCO Corp.).
International Search Report and Written Opinion, re PCT Application No. PCT/US2012/030281, dated Jun. 20, 2012, in 6 pages.
International Search Report and Written Opinion, re PCT Application No. PCT/US2012/030326, dated Mar. 18, 2013, in 8 pages.
Maestro delivers accurate corn seed placement at 10 m.p.h. | The Western Producer (published May 31, 2013) (accessed May 4, 2020), in 2 pages. URL: https://www.producer.com/2013/05/maestro-delivers-accurate-corn-seed-placement-at-10-m-p-h/ (filed as Exhibit 1103 to the Inter Partes Review of U.S. Pat. No. 9,861,031 filed on behalf of Precision Planting, LLC and AGCO Corp.).
Merriam-Webster.com Dictionary, (definition of just) (accessed on Jun. 7, 2020), in 13 pages). URL: https://www.merriam-webster.com/dictionary/just (filed as Exhibit 1095 to the Inter Partes Review of U.S. Pat. No. 9,861,031 filed on behalf of Precision Planting, LLC and AGCO Corp.).
Patent Owner Response for the Inter Partes Review of U.S. Pat. No. 9,861,031 filed on behalf of Precision Planting, LLC and AGCO Corp., filed Mar. 24, 2020, in 100 pages.
Patent Owner Response for the Inter Partes Review of U.S. Pat. No. 9,820,429 filed on behalf of Precision Planting, LLC and AGCO Corp., filed Apr. 23, 2020, in 114 pages.
Patent Owner Response for the Inter Partes Review of U.S. Pat. No. 10,004,173 filed on behalf of Precision Planting, LLC and AGCO Corp., filed Apr. 22, 2020, in 104 pages.
Patent Owner Response for the Inter Partes Review of U.S. Pat. No. 9,807,924 filed on behalf of Precision Planting, LLC and AGCO Corp., filed Mar. 24, 2020, in 91 pages.
Patent Owner Response for the Inter Partes Review of U.S. Pat. No. 8,813,663 filed on behalf of Precision Planting, LLC and AGCO Corp., filed Mar. 20, 2020, in 104 pages.
Patent Owner Response for the Inter Partes Review of U.S. Pat. No. 9,807,922 filed on behalf of Precision Planting, LLC and AGCO Corp., filed Apr. 27, 2020, in 64 pages.
Patent Owner Response for the Inter Partes Review of U.S. Pat. No. 9,480,199 filed on behalf of Precision Planting, LLC and AGCO Corp., filed Mar. 20, 2020, in 106 pages.

(56) References Cited

OTHER PUBLICATIONS

Patent Owner Response for the Inter Partes Review of U.S. Pat. No. 9,686,906 filed on behalf of Precision Planting, LLC and AGCO Corp., filed Mar. 20, 2020, in 90 pages.
Patent Owner Response for the Inter Partes Review of U.S. Pat. No. 9,699,955 filed on behalf of Precision Planting, LLC and AGCO Corp., filed Mar. 24, 2020, in 107 pages.
Patent Owner Sur-Reply for the Inter Partes Review of U.S. Pat. No. 10,004,173 filed on behalf of Precision Planting, LLC and AGCO Corp., filed Sep. 11, 2020, in 42 pages.
Patent Owner Sur-Reply for the Inter Partes Review of U.S. Pat. No. 9,807,922 filed on behalf of Precision Planting, LLC and AGCO Corp., filed Sep. 11, 2020, in 31 pages.
Patent Owner Sur-Reply for the Inter Partes Review of U.S. Pat. No. 9,861,031 filed on behalf of Precision Planting, LLC and AGCO Corp., filed Aug. 7, 2020, in 43 pages.
Patent Owner Sur-Reply for the Inter Partes Review of U.S. Pat. No. 9,820,429 filed on behalf of Precision Planting, LLC and AGCO Corp., filed Sep. 11, 2020, in 45 pages.
Patent Owner Sur-Reply for the Inter Partes Review of U.S. Pat. No. 9,807,924 filed on behalf of Precision Planting, LLC and AGCO Corp., filed Aug. 7, 2020, in 42 pages.
Patent Owner Sur-Reply for the Inter Partes Review of U.S. Pat. No. 8,813,663 filed on behalf of Precision Planting, LLC and AGCO Corp., filed Aug. 5, 2020, in 41 pages.
Patent Owner Sur-Reply for the Inter Partes Review of U.S. Pat. No. 9,480,199 filed on behalf of Precision Planting, LLC and AGCO Corp., filed Aug. 5, 2020, in 40 pages.
Patent Owner Sur-Reply for the Inter Partes Review of U.S. Pat. No. 9,686,906 filed on behalf of Precision Planting, LLC and AGCO Corp., filed Aug. 5, 2020, in 42 pages.
Patent Owner Sur-Reply for the Inter Partes Review of U.S. Pat. No. 9,699,955 filed on behalf of Precision Planting, LLC and AGCO Corp., filed Aug. 7, 2020, in 42 pages.
Petition for Inter Partes Review of U.S. Pat. No. 9,510,502 filed on behalf of Precision Planting, LLC and AGCO Corp., filed on May 24, 2019, in 77 pages.
Petition for Inter Partes Review of U.S. Pat. No. 9,807,922 filed on behalf of Precision Planting, LLC and AGCO Corp., filed on May 31, 2019, in 91 pages.
Exhibit 1002 to Petition for Inter Partes Review of U.S. Pat. No. 9,807,922 filed on behalf of Precision Planting, LLC and AGCO Corp.: Declaration of Douglas S. Prairie, filed on May 31, 2019, in 126 pages.
Reply to Patent Owner Response for the Inter Partes Review of U.S. Pat. No. 9,861,031 filed on behalf of Precision Planting, LLC and AGCO Corp., filed Jun. 26, 2020, in 40 pages.
Reply to Patent Owner Response for the Inter Partes Review of U.S. Pat. No. 9,820,429 filed on behalf of Precision Planting, LLC and AGCO Corp., filed Jul. 31, 2020, in 45 pages.
Reply to Patent Owner Response for the Inter Partes Review of U.S. Pat. No. 10,004,173 filed on behalf of Precision Planting, LLC and AGCO Corp., filed Jul. 31, 2020, in 40 pages.
Reply to Patent Owner Response for the Inter Partes Review of U.S. Pat. No. 9,807,924, filed on behalf of Precision Planting, LLC and AGCO Corp., filed Jun. 26, 2020, in 37 pages.
Reply to Patent Owner Response for the Inter Partes Review of U.S. Pat. No. 8,813,663 filed on behalf of Precision Planting, LLC and AGCO Corp., filed Jun. 26, 2020, in 41 pages.
Reply to Patent Owner Response for the Inter Partes Review of U.S. Pat. No. 9,807,922 filed on behalf of Precision Planting, LLC and AGCO Corp., filed Aug. 3, 2020, in 39 pages.
Reply to Patent Owner Response for the Inter Partes Review of U.S. Pat. No. 9,480,199 filed on behalf of Precision Planting, LLC and AGCO Corp., filed Jun. 29, 2020, in 42 pages.
Reply to Patent Owner Response for the Inter Partes Review of U.S. Pat. No. 9,686,906, filed on behalf of Precision Planting, LLC and AGCO Corp., filed Jun. 26, 2020, in 37 pages.
Reply to Patent Owner Response for the Inter Partes Review of U.S. Pat. No. 9,699,955, filed on behalf of Precision Planting, LLC and AGCO Corp., filed Jun. 29, 2020, in 40 pages.
Sloan Implement | ExactEmerge Retrofit Kit (accessed Apr. 29, 2020), in 4 pages. URL: https://www.sloans.com/feature-products/exact-emerge-retrofit-kit/ (filed as Exhibit 1122 to the Inter Partes Review of U.S. Pat. No. 9,861,031 filed on behalf of Precision Planting, LLC and AGCO Corp.).
Sloan Implement | Web Specials (published Apr. 2, 2020) (accessed Apr. 29, 2020), in 33 pages. URL: http://www.sloans.com/flyer/web-specials/ (filed as Exhibit 1123 to the Inter Partes Review of U.S. Pat. No. 9,861,031 filed on behalf of Precision Planting, LLC and AGCO Corp.).
Sloan Support | John Deere ExactEmerge: Buy New or Retrofit? (published Jun. 14, 2017) (accessed Apr. 29, 2020), in 7 pages. URL: https://sloansupport.com/2017/06/14/john-deere-exactemerge-buy-new-or-retrofit/ (filed as Exhibit 1121 to the Inter Partes Review of U.S. Pat. No. 9,861,031 filed on behalf of Precision Planting, LLC and AGCO Corp.).
Top 5 Farms with the Largest Acreage in the U.S. | Successful Farming (published Sep. 28, 2019) (accessed Jun. 16, 2020), in 8 pages. URL: https://222.agriculture.com/farm-management/farm-land/top-5-farms-with-the-largest-acreage-in-the-US (filed as Exhibit 1081 to the Inter Partes Review of U.S. Pat. No. 9,861,031 filed on behalf of Precision Planting, LLC and AGCO Corp.).
Monosem Pneumatic Planter Operator's Manual, NG Plus Mounted Planter, dated 1994, in 70 pages.
Monosem Pneumatic Planter Operator's Manual, NG Plus Mounted Planter, dated 2000, in 51 pages.
Deere & Company Operator's Manual, 494A 495A Corn Planters (OMB25384), dated 1967, in 68 pages.
Deere & Company Operator's Manual, 694A, 695A, 894A Corn Planters (OMB25348), dated 1966, in 68 pages.
Deere & Company Operator's Manual, 694A, 695A, 894A Corn Planters (OMB25391), dated 1967, in 64 pages.
Deere & Company Operator's Manual, 71 Flexi-Planter (OMH135752), dated 1988, in 140 pages.
Deere & Company Product Brochure, 494-A and 495-A Four-Row Corn Planters (A1477-62-12-Pltr.), dated 1962, in 24 pages.
Kinze Manufacturing, Inc. and Ag Leader Technology, Inc.'s Counterclaims, Answer, and Affirmative Defenses, filed Feb. 8, 2021 (Dkt. No. 23), in 193 pages.
Breece, H. Edward, Harold V. Hansen, and Thomas A. Hoerner. Fundamentals of machine operation: planting. J. Deere, 1981, in 179 pages.
Breece, H. Edward, Harold V. Hansen, and Thomas A. Hoerner. Fundamentals of Machine Operation: Planting. J. Deere (first edition), 1975, in 176 pages.
Breece, H. Edward, Harold V. Hansen, and Thomas A. Hoerner. Fundamentos de Funcionamiento de Maquinaria: Siembra. J. Deere, 1975, in 179 pages. Concise Explanation of Relevance: The instant non-patent literature document, Cite No. 2, is a Spanish-language translation or version of Breece et al., Fundamentals of Machine Operation: Planting (1975), cited herein as non-patent literature document, Cite No. 1.
Breece, H. Edward, Harold V. Hansen, and Thomas A. Hoerner. Fundamentals of Machine Operation: Planting. J. Deere, 1981 (second edition), in 191 pages.
Breece, H. Edward, Harold V. Hansen, Thomas A. Hoerner, and Robert H. Gunter. Fundamentals of Machine Operation: Planting. J. Deere, 1992 (third edition), in 222 pages.
Keith R. Carlson. Fundamentals of Machine Operation: Planting, Instructor's Kit. J. Deere, 1981, in 149 pages.
Keith R. Carlson. Fundamentals of Machine Operation: Planting, Instructor Guide. J. Deere, 1981, in 85 pages.
Keith R. Carlson and Mary Kellum. Fundamentals of Machine Operation: Planting, Instructor Guide. J. Deere, 1992, in 96 pages.
Keith R. Carlson. Fundamentals of Machine Operation: Planting, Student Guide. J. Deere, 1981, in 59 pages.
Kinze Manufacturing, Inc. and Ag Leader Technology, Inc.'s Counterclaims, Answer, and Affirmative Defenses to Deere's First Amended Complaint, filed Mar. 15, 2021 (Dkt. No. 38), in 217 pages.

(56) References Cited

OTHER PUBLICATIONS

Plaintiff Deere & Company and Defendants AGCO Corporation and Precision Planting LLC's Final Joint Claim Construction Chart, filed Aug. 13, 2019 (Dkt. No. 121), in 17 pages.
Plaintiff Deere & Company and Defendants AGCO Corporation and Precision Planting LLC's Joint Claim Construction Chart Exhibits, filed Aug. 13, 2019 (Dkt. No. 121-1), in 386 pages.
Transcript of Markman Hearing in *Deere & Company* v. *AGCO Corporation, et al.*, held on Dec. 3, 2019, in 250 pages.
Plaintiff Deere & Company and Defendants AGCO Corporation and Precision Planting LLC's Proposed Claim Construction Order, filed Dec. 16, 2019 (Dkt. No. 188), in 5 pages.
Cover letter to Plaintiff Deere & Company and Defendants AGCO Corporation and Precision Planting LLC's Proposed Claim Construction Order, filed Dec. 16, 2019 (Dkt. No. 188-1), in 1 page.
Claim Construction Order in *Deere & Company* v. *AGCO Corporation, et al.*, filed Dec. 17, 2019 (Dkt. No. 191), in 5 pages.
Plaintiff Deere & Company's Supplemental Claim Construction Brief, filed Dec. 12, 2019 (Dkt. No. 192), in 11 pages.
Defendants AGCO Corporation et al.'s Supplemental Claim Construction Brief, filed Dec. 18, 2019 (Dkt. No. 194—Redacted Version of Dkt. No. 193), in 19 pages.
Defendants AGCO Corporation et al.'s Motion for Further Claim Construction in Light of Deere's Positions Asserted in IPR Proceedings, filed Jun. 30, 2021 (Dkt. No. 212—Redacted Version of Dkt. No. 211), in 21 pages.
Exhibits 1-13 to Defendants AGCO Corporation et al.'s Motion for Further Claim Construction in Light of Deere's Positions Asserted in IPR Proceedings, filed Jun. 30, 2021 (Dkt. No. 212-1), in 73 pages.
Proposed Order re Defendants AGCO Corporation et al.'s Motion for Further Claim Construction in Light of Deere's Positions Asserted in IPR Proceedings, filed Jun. 30, 2021 (Dkt. No. 212-2), in 1 page.
Plaintiff Deere & Company's Opposition to Defendants AGCO Corporation et al.'s Motion for Further Claim Construction, filed Jul. 9, 2021 (Dkt. No. 214—Redacted Version of Dkt. No. 213), in 21 pages.
Exhibits A-F to Plaintiff Deere & Company's Opposition to Defendants AGCO Corporation et al.'s Motion for Further Claim Construction, filed Jul. 9, 2021 (Dkt. No. 214-1), in 237 pages.
Exhibits G-R to Plaintiff Deere & Company's Opposition to Defendants AGCO Corporation et al.'s Motion for Further Claim Construction, filed Jul. 9, 2021 (Dkt. No. 214-2), in 157 pages.
Memorandum Order Denying Defendants AGCO Corporation et al.'s Motion for Further Claim Construction, Dkt. No. 211, filed Jul. 27, 2021 (Dkt. No. 215), in 2 pages.
AGCO Corporation and Precision Planting LLC's Amended Invalidity Contentions, served Oct. 25, 2021, in 115 pages.
Exhibit 7-B to AGCO Corporation and Precision Planting LLC's Amended Invalidity Contentions: French Published Patent Application No. 2,414,288 A1 to Benac ("Benac"), served Oct. 25, 2021, in 47 pages.
Exhibit 10-B to AGCO Corporation and Precision Planting LLC's Amended Invalidity Contentions: UK Published Patent Application No. 2,057,835 A to Hedderwick ("Hedderwick '835"), served Oct. 25, 2021, in 34 pages.
Exhibit 41-B to AGCO Corporation and Precision Planting LLC's Amended Invalidity Contentions: U.S. Pat. No. 4,029,235 ("Grataloup"), served Oct. 25, 2021, in 40 pages.
Exhibit 80-B to AGCO Corporation and Precision Planting LLC's Amended Invalidity Contentions: John Deere 495 Planter ("495 Planter"), served Oct. 25, 2021, in 95 pages.
Exhibit C-81 to AGCO Corporation and Precision Planting LLC's Amended Invalidity Contentions: 495 Planter and Benac, served Oct. 25, 2021, in 8 pages.
Exhibit C-82 to AGCO Corporation and Precision Planting LLC's Amended Invalidity Contentions: 495 Planter and Grataloup, served Oct. 25, 2021, in 8 pages.
Exhibit C-83 to AGCO Corporation and Precision Planting LLC's Amended Invalidity Contentions: Hedderwick and Grataloup, served Oct. 25, 2021, in 8 pages.
Prosecution Materials Related to Russian Patent Application RU 2013145876 A, dated Apr. 11, 2016, in 29 pages.
Kinze Manufacturing, Inc. and Ag Leader Technology, Inc.'s Counterclaims, Answer, and Affirmative Defenses to Deere's Second Amended and Supplemental Complaint, filed Jul. 16, 2021 (Dkt. No. 111), in 228 pages.
Kinze Manufacturing, Inc. and Ag Leader Technology, Inc.'s Preliminary Invalidity Contentions, served Oct. 18, 2021, in 26 pages.
Appendix A to Kinze Manufacturing, Inc. and Ag Leader Technology, Inc.'s Preliminary Invalidity Contentions, Prior Art Lists, served Oct. 18, 2021, in 46 pages.
Appendix B to Kinze Manufacturing, Inc. and Ag Leader Technology, Inc.'s Preliminary Invalidity Contentions, Exemplary Motivations to Combine, served Oct. 18, 2021, in 115 pages.
Appendix C to Kinze Manufacturing, Inc. and Ag Leader Technology, Inc.'s Preliminary Invalidity Contentions, Prior Art Grouped to Claimed Prior Art Concepts, served Oct. 18, 2021, in 300 pages.
Exhibit 01 to Kinze Manufacturing, Inc. and Ag Leader Technology, Inc.'s Preliminary Invalidity Contentions relating to a Claim Chart—U.S. Pat. No. 9,693,498 & European Patent Application Publication No. 0 606 541 ("Ballmer 541"), served Oct. 18, 2021, in 9 pages.
Exhibit 02 to Kinze Manufacturing, Inc. and Ag Leader Technology, Inc.'s Preliminary Invalidity Contentions relating to a Claim Chart—U.S. Pat. No. 9,693,498 & U.S. Pat. No. 5,601,209 ("Barsi 209"), served Oct. 18, 2021, in 7 pages.
Exhibit 03 to Kinze Manufacturing, Inc. and Ag Leader Technology, Inc.'s Preliminary Invalidity Contentions relating to a Claim Chart—U.S. Pat. No. 9,693,498 & U.S. Patent Application Publication No. 2010/0192818 ("Garner 818"), served Oct. 18, 2021, in 8 pages.
Exhibit 04 to Kinze Manufacturing, Inc. and Ag Leader Technology, Inc.'s Preliminary Invalidity Contentions relating to a Claim Chart—U.S. Pat. No. 9,693,498 & U.S. Patent Application Publication No. 2010/0192819 ("Garner 819"), served Oct. 18, 2021, in 9 pages.
Exhibit 05 to Kinze Manufacturing, Inc. and Ag Leader Technology, Inc.'s Preliminary Invalidity Contentions relating to a Claim Chart—U.S. Pat. No. 9,693,498 & U.S. Pat. No. 4,600,122 ("Lundie 122"), served Oct. 18, 2021, in 10 pages.
Exhibit 06 to Kinze Manufacturing, Inc. and Ag Leader Technology, Inc.'s Preliminary Invalidity Contentions relating to a Claim Chart—U.S. Pat. No. 9,693,498 & U.S. Pat. No. 7,404,366 ("Mariman 366"), served Oct. 18, 2021, in 9 pages.
Exhibit 07 to Kinze Manufacturing, Inc. and Ag Leader Technology, Inc.'s Preliminary Invalidity Contentions relating to a Claim Chart—U.S. Pat. No. 9,693,498 & German Published Patent Application DE 34 41 704 Al ("Romberg 704"), served Oct. 18, 2021, in 11 pages.
Exhibit 08 to Kinze Manufacturing, Inc. and Ag Leader Technology, Inc.'s Preliminary Invalidity Contentions relating to a Claim Chart—U.S. Pat. No. 8,850,998 & French Patent Application Publication No. 2 414 288 ("Benac 288"), served Oct. 18, 2021, in 8 pages.
Exhibit 09 to Kinze Manufacturing, Inc. and Ag Leader Technology, Inc.'s Preliminary Invalidity Contentions relating to a Claim Chart—U.S. Pat. No. 8,850,998 & John Deere Model 495/495A/695A Planter Products ("Deere 495A" or "Model 495A"), served Oct. 18, 2021, in 26 pages.
Exhibit 10 to Kinze Manufacturing, Inc. and Ag Leader Technology, Inc.'s Preliminary Invalidity Contentions relating to a Claim Chart—U.S. Pat. No. 8,850,998 & U.S. Pat. No. 2,566,406 ("Dougherty 406"), served Oct. 18, 2021, in 9 pages.
Exhibit 11 to Kinze Manufacturing, Inc. and Ag Leader Technology, Inc.'s Preliminary Invalidity Contentions relating to a Claim Chart—U.S. Pat. No. 8,850,998 & U.S. Patent Application Publication No. 2010/0192819 ("Garner 819"), served Oct. 18, 2021, in 14 pages.
Exhibit 12 to Kinze Manufacturing, Inc. and Ag Leader Technology, Inc.'s Preliminary Invalidity Contentions relating to a Claim Chart—U.S. Pat. No. 8,850,998 & U.S. Pat. No. 4,023,509 to Hanson ("Hanson 509"), served Oct. 18, 2021, in 8 pages.
Exhibit 13 to Kinze Manufacturing, Inc. and Ag Leader Technology, Inc.'s Preliminary Invalidity Contentions relating to a Claim Chart—

(56) References Cited

OTHER PUBLICATIONS

U.S. Pat. No. 8,850,998 & UK Patent Application Publication No. GB 2 057 835 ("Hedderwick 835"), served Oct. 18, 2021, in 10 pages.
Exhibit 14 to Kinze Manufacturing, Inc. and Ag Leader Technology, Inc.'s Preliminary Invalidity Contentions relating to a Claim Chart—U.S. Pat. No. 8,850,998 & German Patent No. 389840 ("Hempel 840"), served Oct. 18, 2021, in 8 pages.
Exhibit 15 to Kinze Manufacturing, Inc. and Ag Leader Technology, Inc.'s Preliminary Invalidity Contentions relating to a Claim Chart—U.S. Pat. No. 8,850,998 & German Patent Application Publication No. 28 26 658 ("Holdt 658"), served Oct. 18, 2021, in 8 pages.
Exhibit 16 to Kinze Manufacturing, Inc. and Ag Leader Technology, Inc.'s Preliminary Invalidity Contentions relating to a Claim Chart—U.S. Pat. No. 9,686,906 & Netherlands Patent Application Publication No. 1005451 of Berkhout ("Berkhout 451"), served Oct. 18, 2021, in 13 pages.
Exhibit 17 to Kinze Manufacturing, Inc. and Ag Leader Technology, Inc.'s Preliminary Invalidity Contentions relating to a Claim Chart—U.S. Pat. No. 9,686,906 & U.S. Pat. No. 1,422,534 to Brown ("Brown 534"), served Oct. 18, 2021, in 11 pages.
Exhibit 18 to Kinze Manufacturing, Inc. and Ag Leader Technology, Inc.'s Preliminary Invalidity Contentions relating to a Claim Chart—U.S. Pat. No. 9,686,906 & U.S. Pat. No. 658,348 to Crowley ("Crowley 348"), served Oct. 18, 2021, in 15 pages.
Exhibit 19 to Kinze Manufacturing, Inc. and Ag Leader Technology, Inc.'s Preliminary Invalidity Contentions relating to a Claim Chart—U.S. Pat. No. 9,686,906 & John Deere Model 495/495A/695A Planter Products ("Deere 495A" or "Model 495A"), served Oct. 18, 2021, in 40 pages.
Exhibit 20 to Kinze Manufacturing, Inc. and Ag Leader Technology, Inc.'s Preliminary Invalidity Contentions relating to a Claim Chart—U.S. Pat. No. 9,686,906 & U.S. Pat. No. 4,333,561 to Schlegel ("Schlegel 561"), served Oct. 18, 2021, in 19 pages.
Exhibit 21 to Kinze Manufacturing, Inc. and Ag Leader Technology, Inc.'s Preliminary Invalidity Contentions relating to a Claim Chart—U.S. Pat. No. 9,686,906 & U.S. Pat. No. 3,176,636 ("Wilcox 636"), served Oct. 18, 2021, in 26 pages.
Exhibit 22 to Kinze Manufacturing, Inc. and Ag Leader Technology, Inc.'s Preliminary Invalidity Contentions relating to a Claim Chart—U.S. Pat. No. 9,686,906 & German Patent Application Publication No. 1 090 458 of Witte (Witte 458), served Oct. 18, 2021, in 10 pages.
Exhibit 23 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,681,706 ("Sauder 706"), served Oct. 18, 2021, in 8 pages.
Exhibit 24 to Kinze Manufacturing, Inc. and Ag Leader Technology, Inc.'s Preliminary Invalidity Contentions relating to a Claim Chart—U.S. Pat. No. 9,807,924 & Netherlands Patent Application Publication No. 1005451 to Berkhout ("Berkhout 451"), served Oct. 18, 2021, in 6 pages.
Exhibit 25 to Kinze Manufacturing, Inc. and Ag Leader Technology, Inc.'s Preliminary Invalidity Contentions relating to a Claim Chart—U.S. Pat. No. 9,807,924 & U.S. Pat. No. 658,348 to Crowley ("Crowley 348"), served Oct. 18, 2021, in 7 pages.
Exhibit 26 to Kinze Manufacturing, Inc. and Ag Leader Technology, Inc.'s Preliminary Invalidity Contentions relating to a Claim Chart—U.S. Pat. No. 9,807,924 & John Deere Model 495/495A/695A Planter Products ("Deere 495A" or "Model 495A"), served Oct. 18, 2021, in 27 pages.
Exhibit 27 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,681,706 ("Sauder 706"), served Oct. 18, 2021, in 8 pages.
Exhibit 28 to Kinze Manufacturing, Inc. and Ag Leader Technology, Inc.'s Preliminary Invalidity Contentions relating to a Claim Chart—U.S. Pat. No. 9,807,924 & U.S. Pat. No. 1,264,454 to Terrell et al. ("Terrell 454"), served Oct. 18, 2021, in 8 pages.

Exhibit 29 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,651,570 to Thiemke ("Thiemke 570"), served Oct. 18, 2021, in 10 pages.
Exhibit 30 to Kinze Manufacturing, Inc. and Ag Leader Technology, Inc.'s Preliminary Invalidity Contentions relating to a Claim Chart—U.S. Pat. No. 9,807,924 & U.S. Pat. No. 3,176,636 ("Wilcox 636"), served Oct. 18, 2021, in 18 pages.
Exhibit 31 to Kinze Manufacturing, Inc. and Ag Leader Technology, Inc.'s Preliminary Invalidity Contentions relating to a Claim Chart—U.S. Pat. No. 9,807,924 & German Patent Application No. 1 090 458 of Witte ("Witte 458"), served Oct. 18, 2021, in 6 pages.
Exhibit 32 to Kinze Manufacturing, Inc. and Ag Leader Technology, Inc.'s Preliminary Invalidity Contentions relating to a Claim Chart—U.S. Pat. No. 9,861,031 & U.K. Patent Application No. GB 2,012,534A ("Curtis 534" or "Curtis GB" or "Curtis GB 534"), served Oct. 18, 2021, in 21 pages.
Exhibit 33 to Kinze Manufacturing, Inc. and Ag Leader Technology, Inc.'s Preliminary Invalidity Contentions relating to a Claim Chart—U.S. Pat. No. 9,861,031 & John Deere Model 495/495A/695A Planter Products ("Deere 495A" or "Model 495A"), served Oct. 18, 2021, in 55 pages.
Exhibit 34 to Kinze Manufacturing, Inc. and Ag Leader Technology, Inc.'s Preliminary Invalidity Contentions relating to a Claim Chart—U.S. Pat. No. 9,861,031 (Claims 1, 2, 4, 5, 8 & 9) & U.S. Patent Application Publication No. 2010/0192819 to Garner ("Garner 819"), served Oct. 18, 2021, in 22 pages.
Exhibit 35 to Kinze Manufacturing, Inc. and Ag Leader Technology, Inc.'s Preliminary Invalidity Contentions relating to a Claim Chart—U.S. Pat. No. 9,861,031 & French Patent Application Publication No. FR 2 591 061 to Gras ("Gras 061"), served Oct. 18, 2021, in 39 pages.
Exhibit 36 to Kinze Manufacturing, Inc. and Ag Leader Technology, Inc.'s Preliminary Invalidity Contentions relating to a Claim Chart—U.S. Pat. No. 9,861,031 & UK Patent Application GB 2057835A ("Hedderwick 835"), served Oct. 18, 2021, in 55 pages.
Exhibit 37 to Kinze Manufacturing, Inc. and Ag Leader Technology, Inc.'s Preliminary Invalidity Contentions relating to a Claim Chart—U.S. Pat. No. 9,861,031 & German Published Patent Application DE2826658A1 ("Holdt" or "Holdt 658"), served Oct. 18, 2021, in 38 pages.
Exhibit 38 to Kinze Manufacturing, Inc. and Ag Leader Technology, Inc.'s Preliminary Invalidity Contentions relating to a Claim Chart—U.S. Pat. No. 9,861,031 (Claims 1, 2, 4, 5, 8 & 9) & International Patent App. Pub. No. WO 2013/049198Al to Radtke et al. ("Radtke 198"), served Oct. 18, 2021, in 12 pages.
Exhibit 39 to Kinze Manufacturing, Inc. and Ag Leader Technology, Inc.'s Preliminary Invalidity Contentions relating to a Claim Chart—U.S. Pat. No. 9,861,031 & U.S. Pat. No. 6,681,706 ("Sauder 706"), served Oct. 18, 2021, in 74 pages.
Exhibit 40 to Kinze Manufacturing, Inc. and Ag Leader Technology, Inc.'s Preliminary Invalidity Contentions relating to a Claim Chart—U.S. Pat. No. 9,861,031 & U.S. Pat. No. 3,176,636 to Wilcox ("Wilcox"), served Oct. 18, 2021, in 67 pages.
Exhibit 41 to Kinze Manufacturing, Inc. and Ag Leader Technology, Inc.'s Preliminary Invalidity Contentions relating to a Claim Chart—U.S. Pat. No. 9,480,199 & U.K. Patent Application No. GB 2,012,534A ("Curtis 534" or "Curtis GB" or "Curtis GB 534"), served Oct. 18, 2021, in 30 pages.
Exhibit 42 to Kinze Manufacturing, Inc. and Ag Leader Technology, Inc.'s Preliminary Invalidity Contentions relating to a Claim Chart—U.S. Pat. No. 9,480,199 (Claims 1-6) & John Deere Model 495/495A/695A Planter Products ("Deere 495A" or "Model 495A"), served Oct. 18, 2021, in 54 pages.
Exhibit 43 to Kinze Manufacturing, Inc. and Ag Leader Technology, Inc.'s Preliminary Invalidity Contentions relating to a Claim Chart—U.S. Pat. No. 9,480,199 & Deere Prior Art Vacuum Planters ("Deere Prior Art vacuum Planters"), served Oct. 18, 2021, in 35 pages.
Exhibit 44 to Kinze Manufacturing, Inc. and Ag Leader Technology, Inc.'s Preliminary Invalidity Contentions relating to a Claim Chart—U.S. Pat. No. 9,480,199 (Claims 1-6) & U.S. Pat. No. 2,566,406 to Dougherty ("Dougherty" or "Dougherty 406"), served Oct. 18, 2021, in 34 pages.

(56) References Cited

OTHER PUBLICATIONS

Exhibit 45 to Kinze Manufacturing, Inc. and Ag Leader Technology, Inc.'s Preliminary Invalidity Contentions relating to a Claim Chart—U.S. Pat. No. 9,480,199 & German Utility Model Publication No. 4400142 ("DE8400142" or "Franz 142"), served Oct. 18, 2021, in 23 pages.
Exhibit 46 to Kinze Manufacturing, Inc. and Ag Leader Technology, Inc.'s Preliminary Invalidity Contentions relating to a Claim Chart—U.S. Pat. No. 9,480,199 & French Patent Application 2591061 ("Gras 061" or "Gras 2") (incorporating French Patent Application 2574243 ("Gras 243" or "Gras 1")), served Oct. 18, 2021, in 39 pages.
Exhibit 47 to Kinze Manufacturing, Inc. and Ag Leader Technology, Inc.'s Preliminary Invalidity Contentions relating to a Claim Chart—U.S. Pat. No. 9,480,199 & UK Patent Application GB 2057835A ("Hedderwick" or "Hedderwick 835"), served Oct. 18, 2021, in 27 pages.
Exhibit 48 to Kinze Manufacturing, Inc. and Ag Leader Technology, Inc.'s Preliminary Invalidity Contentions relating to a Claim Chart—U.S. Pat. No. 9,480,199 (Claims 1-6) & German Published Patent Application DE2826658A1 ("Holdt" or "Holdt 658"), served Oct. 18, 2021, in 34 pages.
Exhibit 49 to Kinze Manufacturing, Inc. and Ag Leader Technology, Inc.'s Preliminary Invalidity Contentions relating to a Claim Chart—U.S. Pat. No. 9,480,199 & Monosem (Deere) Prior Art Planters, served Oct. 18, 2021, in 28 pages.
Exhibit 50 to Kinze Manufacturing, Inc. and Ag Leader Technology, Inc.'s Preliminary Invalidity Contentions relating to a Claim Chart—U.S. Pat. No. 9,480,199 (Claims 1-6) & U.S. Pat. No. 6,681,706 ("Sauder 706"), served Oct. 18, 2021, in 68 pages.
Exhibit 51 to Kinze Manufacturing, Inc. and Ag Leader Technology, Inc.'s Preliminary Invalidity Contentions relating to a Claim Chart—U.S. Pat. No. 9,480,199 & European Patent Application Publication 0182220 (EP0182220) ("Syring" or "Syring 220"), served Oct. 18, 2021, in 18 pages.
Exhibit 52 to Kinze Manufacturing, Inc. and Ag Leader Technology, Inc.'s Preliminary Invalidity Contentions relating to a Claim Chart—U.S. Pat. No. 9,480,199 & U.S. Pat. No. 3,176,636 to Wilcox ("Wilcox" or "Wilcox 636"), served Oct. 18, 2021, in 53 pages.
Exhibit 53 to Kinze Manufacturing, Inc. and Ag Leader Technology, Inc.'s Preliminary Invalidity Contentions relating to a Claim Chart—U.S. Pat. No. 9,480,199 & Japanese Utility Model Application JP 56-024815 ("Yamahata" or "Yamahata 815" or "JP 815"), served Oct. 18, 2021, in 39 pages.
Exhibit 54 to Kinze Manufacturing, Inc. and Ag Leader Technology, Inc.'s Preliminary Invalidity Contentions relating to a Claim Chart—U.S. Pat. No. 9,699,955 & U.K. Patent Application No. GB 2,012,534A ("Curtis 534" or "Curtis GB" or "Curtis GB 534"), served Oct. 18, 2021, in 18 pages.
Exhibit 55 to Kinze Manufacturing, Inc. and Ag Leader Technology, Inc.'s Preliminary Invalidity Contentions relating to a Claim Chart—U.S. Pat. No. 9,699,955 & John Deere Model 495/495A/695A Planter Products ("Deere 495A" or "Model 495A"), served Oct. 18, 2021, in 34 pages.
Exhibit 56 to Kinze Manufacturing, Inc. and Ag Leader Technology, Inc.'s Preliminary Invalidity Contentions relating to a Claim Chart—U.S. Pat. No. 9,699,955 & Deere Prior Art Vacuum Planters ("Deere Prior Art vacuum Planters"), served Oct. 18, 2021, in 29 pages.
Exhibit 57 to Kinze Manufacturing, Inc. and Ag Leader Technology, Inc.'s Preliminary Invalidity Contentions relating to a Claim Chart—U.S. Pat. No. 9,699,955 & French Patent Application 2591061 ("Gras 061" or "Gras 2") (incorporating French Patent Application 2574243 ("Gras 243" or "Gras 1")), served Oct. 18, 2021, in 30 pages.
Exhibit 58 to Kinze Manufacturing, Inc. and Ag Leader Technology, Inc.'s Preliminary Invalidity Contentions relating to a Claim Chart—U.S. Pat. No. 9,699,955 & UK Patent Application GB 2057835A ("Hedderwick" or "Hedderwick 835"), served Oct. 18, 2021, in 14 pages.
Exhibit 59 to Kinze Manufacturing, Inc. and Ag Leader Technology, Inc.'s Preliminary Invalidity Contentions relating to a Claim Chart—U.S. Pat. No. 9,699,955 & German Published Patent Application DE2826658A1 ("Holdt" or "Holdt 658"), served Oct. 18, 2021, in 37 pages.
Exhibit 60 to Kinze Manufacturing, Inc. and Ag Leader Technology, Inc.'s Preliminary Invalidity Contentions relating to a Claim Chart—U.S. Pat. No. 9,699,955 (Claims 8-10 and 12-13) & U.S. Pat. No. 6,681,706 ("Sauder 706"), served Oct. 18, 2021, in 87 pages.
Exhibit 61 to Kinze Manufacturing, Inc. and Ag Leader Technology, Inc.'s Preliminary Invalidity Contentions relating to a Claim Chart—U.S. Pat. No. 9,699,955 & U.S. Pat. No. 3,176,636 to Wilcox ("Wilcox" or "Wilcox 636"), served Oct. 18, 2021, in 51 pages.
Exhibit 62 to Kinze Manufacturing, Inc. and Ag Leader Technology, Inc.'s Preliminary Invalidity Contentions relating to a Claim Chart—U.S. Pat. No. 10,004,173 & U.K. Patent Application No. GB 2,012,534A ("Curtis 534" or "Curtis GB" or "Curtis GB 534"), served Oct. 18, 2021, in 28 pages.
Exhibit 63 to Kinze Manufacturing, Inc. and Ag Leader Technology, Inc.'s Preliminary Invalidity Contentions relating to a Claim Chart—U.S. Pat. No. 10,004,173 & John Deere Model 495/495A/695A Planter Products ("Deere 495A" or "Model 495A"), served Oct. 18, 2021, in 73 pages.
Exhibit 64 to Kinze Manufacturing, Inc. and Ag Leader Technology, Inc.'s Preliminary Invalidity Contentions relating to a Claim Chart—U.S. Pat. No. 10,004,173 (Claims 1-4, 6, 11-16) & U.S. Patent Application Publication No. 2010/0192819 to Garner ("Garner 819"), served Oct. 18, 2021, in 18 pages.
Exhibit 65 to Kinze Manufacturing, Inc. and Ag Leader Technology, Inc.'s Preliminary Invalidity Contentions relating to a Claim Chart—U.S. Pat. No. 10,004,173 & French Patent Application Publication No. FR 2 591 061 to Gras ("Gras 061"), served Oct. 18, 2021, in 66 pages.
Exhibit 66 to Kinze Manufacturing, Inc. and Ag Leader Technology, Inc.'s Preliminary Invalidity Contentions relating to a Claim Chart—U.S. Pat. No. 10,004,173 & UK Patent Application GB 2057835A ("Hedderwick 835"), served Oct. 18, 2021, in 84 pages.
Exhibit 67 to Kinze Manufacturing, Inc. and Ag Leader Technology, Inc.'s Preliminary Invalidity Contentions relating to a Claim Chart—U.S. Pat. No. 10,004,173 & German Published Patent Application DE2826658A1 ("Holdt" or "Holdt 658"), served Oct. 18, 2021, in 54 pages.
Exhibit 68 to Kinze Manufacturing, Inc. and Ag Leader Technology, Inc.'s Preliminary Invalidity Contentions relating to a Claim Chart—U.S. Pat. No. 10,004,173 (Claims 1-4, 6, 11-16) & International Patent App. Pub. No. WO 2013/049198A1 to Radtke et al. ("Radtke 198"), served Oct. 18, 2021, in 17 pages.
Exhibit 69 to Kinze Manufacturing, Inc. and Ag Leader Technology, Inc.'s Preliminary Invalidity Contentions relating to a Claim Chart—U.S. Pat. No. 10,004,173 & U.S. Pat. No. 6,681,706 ("Sauder 706"), served Oct. 18, 2021, in 136 pages.
Exhibit 70 to Kinze Manufacturing, Inc. and Ag Leader Technology, Inc.'s Preliminary Invalidity Contentions relating to a Claim Chart—U.S. Pat. No. 10,004,173 & U.S. Pat. No. 3,176,636 to Wilcox ("Wilcox"), served Oct. 18, 2021, in 105 pages.
Exhibit 71 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 658,348 ("Crowley" or "Crowley 348"), served Oct. 18, 2021, in 30 pages.
Exhibit 72 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.K. Patent Application No. GB 2,012,534A ("Curtis 534" or "Curtis GB" or "Curtis GB 534"), served Oct. 18, 2021, in 33 pages.
Exhibit 73 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & John Deere Model 495/495A/695A Planter Products ("Deere 495A" or "Model 495A"), served Oct. 18, 2021, in 84 pages.
Exhibit 74 to Kinze Manufacturing, Inc. and Ag Leader Technology, Inc.'s Preliminary Invalidity Contentions relating to a Claim Chart—

(56) References Cited

OTHER PUBLICATIONS

U.S. Pat. No. 8,813,663 (Claims 1, 4 and 6) & Deere Prior Art Vacuum Planters ("Deere Prior Art vacuum Planters"), served Oct. 18, 2021, in 66 pages.
Exhibit 75 to Kinze Manufacturing, Inc. and Ag Leader Technology, Inc.'s Preliminary Invalidity Contentions relating to a Claim Chart—U.S. Pat. No. 8,813,663 (Claims 1, 4, 6) & French Patent Application 2591061 ("Gras 061" or "Gras 2") (incorporating French Patent Application 2574243 ("Gras 243" or "Gras 1")), served Oct. 18, 2021, in 63 pages.
Exhibit 76 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 4,023,509 ("Hanson 509"), served Oct. 18, 2021, in 55 pages.
Exhibit 77 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & UK Patent Application GB 2057835A ("Hedderwick" or "Hedderwick 835"), served Oct. 18, 2021, in 38 pages.
Exhibit 78 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & German Published Patent Application DE2826658A1 ("Holdt" or "Holdt 658"), served Oct. 18, 2021, in 75 pages.
Exhibit 79 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 6,681,706 ("Sauder 706"), served Oct. 18, 2021, in 174 pages.
Exhibit 80 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 3,176,636 to Wilcox ("Wilcox" or "Wilcox 636"), served Oct. 18, 2021, in 97 pages.
Exhibit 81 to Kinze Manufacturing, Inc. and Ag Leader Technology, Inc.'s Preliminary Invalidity Contentions relating to a Claim Chart—U.S. Pat. No. 10,729,063 (claims 1-8 and 10-19) & U.K. Patent Application No. GB 2,012,534A ("Curtis 534" or "Curtis GB" or "Curtis GB 534"), served Oct. 18, 2021, in 46 pages.
Exhibit 82 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & John Deere Model 495/495A/695A Planter Products ("Deere 495A" or "Model 495A"), served Oct. 18, 2021, in 97 pages.
Exhibit 83 to Kinze Manufacturing, Inc. and Ag Leader Technology, Inc.'s Preliminary Invalidity Contentions relating to a Claim Chart—U.S. Pat. No. 10,729,063 & Deere Prior Art Vacuum Planters ("Deere Prior Art vacuum Planters"), served Oct. 18, 2021, in 81 pages.
Exhibit 84 to Kinze Manufacturing, Inc. and Ag Leader Technology, Inc.'s Preliminary Invalidity Contentions relating to a Claim Chart—U.S. Pat. No. 10,729,063 (Claims 1-8,10-19) & U.S. Appl. No. 12/364,010 (Publication No. US 2010/0192819 "819 Publication" or "Garner 819"), served Oct. 18, 2021, in 16 pages.
Exhibit 85 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & French Patent Application Publication No. FR 2 591 061 ("Gras 061"), served Oct. 18, 2021, in 73 pages.
Exhibit 86 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & UK Patent Application GB 2057835A ("Hedderwick" or "Hedderwick 835"), served Oct. 18, 2021, in 41 pages.
Exhibit 87 to Kinze Manufacturing, Inc. and Ag Leader Technology, Inc.'s Preliminary Invalidity Contentions relating to a Claim Chart—U.S. Pat. No. 10,729,063 & German Published Patent Application DE2826658A1 ("Holdt" or "Holdt 658"), served Oct. 18, 2021, in 92 pages.
Exhibit 88 to Kinze Manufacturing, Inc. and Ag Leader Technology, Inc.'s Preliminary Invalidity Contentions relating to a Claim Chart—U.S. Pat. No. 10,729,063 (Claims 1-8,10-19) & International Patent Application PCT/US20 12/057327 (International Publication No. WO 2013/049198 Al), served Oct. 18, 2021, in 39 pages.
Exhibit 89 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & U.S. Pat. No. 6,681,706 ("Sauder 706"), served Oct. 18, 2021, in 161 pages.
Exhibit 90 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & U.S. Pat. No. 3,176,636 to Wilcox ("Wilcox" or "Wilcox 636"), served Oct. 18, 2021, in 103 pages.
Exhibit 91 to Kinze Manufacturing, Inc. and Ag Leader Technology, Inc.'s Preliminary Invalidity Contentions relating to a Claim Chart—U.S. Pat. No. Re. 48,572 & U.K. Patent Application No. GB 2,012,534A ("Curtis 534" or "Curtis GB" or "Curtis GB 534"), served Oct. 18, 2021, in 68 pages.
Exhibit 92 to Kinze Manufacturing, Inc. and Ag Leader Technology, Inc.'s Preliminary Invalidity Contentions relating to a Claim Chart—U.S. Pat. No. Re. 48,572 & John Deere Model 495/495A/695A Planter Products ("Deere 495A" or "Model 495A"), served Oct. 18, 2021, in 184 pages.
Exhibit 93 to Kinze Manufacturing, Inc. and Ag Leader Technology, Inc.'s Preliminary Invalidity Contentions relating to a Claim Chart—U.S. Pat. No. Re. 48,572 & U.S. Patent Application Publication No. 2010/0192819 to Garner ("Garner 819"), served Oct. 18, 2021, in 53 pages.
Exhibit 94 to Kinze Manufacturing, Inc. and Ag Leader Technology, Inc.'s Preliminary Invalidity Contentions relating to a Claim Chart—U.S. Pat. No. Re. 48,572 & U.S. Pat. No. 3,627,050 to Hansen and assigned to Deere ("Hansen" or "Hansen 050"), served Oct. 18, 2021, in 184 pages.
Exhibit 95 to Kinze Manufacturing, Inc. and Ag Leader Technology, Inc.'s Preliminary Invalidity Contentions relating to a Claim Chart—U.S. Pat. No. Re. 48,572 & UK Patent Application GB 2057835A ("Hedderwick 835"), served Oct. 18, 2021, in 236 pages.
Exhibit 96 to Kinze Manufacturing, Inc. and Ag Leader Technology, Inc.'s Preliminary Invalidity Contentions relating to a Claim Chart—U.S. Pat. No. Re. 48,572 & German Published Patent Application DE2826658A1 ("Holdt" or "Holdt 658"), served Oct. 18, 2021, in 136 pages.
Exhibit 97 to Kinze Manufacturing, Inc. and Ag Leader Technology, Inc.'s Preliminary Invalidity Contentions relating to a Claim Chart—U.S. Pat. No. Re. 48,572 & U.S. Pat. No. 6,681,706 ("Sauder 706"), served Oct. 18, 2021, in 215 pages.
Exhibit 98 to Kinze Manufacturing, Inc. and Ag Leader Technology, Inc.'s Preliminary Invalidity Contentions relating to a Claim Chart—U.S. Pat. No. Re. 48,572 & U.S. Pat. No. 3,176,636 to Wilcox ("Wilcox"), served Oct. 18, 2021, in 232 pages.
Ref. # 414 cited in Appendix A—Prior Art List to the Preliminary Invalidity Contentions filed on behalf of Kinze Manufacturing, Inc. and Ag Leader Technology, Inc.: Chapter 12—Mechanical Grain Conveying ("Bern 2006") (listing a publication or prior art date of Dec. 7, 2006 and a first named inventor / applicant / author of Bern), served Oct. 18, 2021, in 65 pages.
Ref. # 415 cited in Appendix A—Prior Art List to the Preliminary Invalidity Contentions filed on behalf of Kinze Manufacturing, Inc. and Ag Leader Technology, Inc.: Fundamentals of Machine Operation—Planting (1975) ("Breece 1975") (listing a publication or prior art date of 1975 and a first named inventor / applicant / author of Breece), served Oct. 18, 2021, in 176 pages.
Ref. # 416 cited in Appendix A—Prior Art List to the Preliminary Invalidity Contentions filed on behalf of Kinze Manufacturing, Inc. and Ag Leader Technology, Inc.: Fundamentals of Machine Operation—Planting (1981) ("Breece 1981") (listing a publication or prior art date of 1981 and a first named inventor / applicant / author of Breece), served Oct. 18, 2021, in 184 pages.
Ref. # 417 cited in Appendix A—Prior Art List to the Preliminary Invalidity Contentions filed on behalf of Kinze Manufacturing, Inc. and Ag Leader Technology, Inc.: The Influence of Seed-Drill Design on the Spatial Arrangement of Seedlings and on Seedling Emer-

(56) References Cited

OTHER PUBLICATIONS gence ("Button 1978") (listing a publication or prior art date of 1978 and a first named inventor /applicant / author of Button), served Oct. 18, 2021, in 26 pages.

Ref. # 418 cited in Appendix A—Prior Art List to the Preliminary Invalidity Contentions filed on behalf of Kinze Manufacturing, Inc. and Ag Leader Technology, Inc.: GQ_RB_Loader_Unloader_EN_14298_01_WEB (1) ("Buhler EN-1429-8-01") (listing a publication or prior art date of pre 2008 and a first named inventor / applicant / author of Buhler), served Oct. 18, 2021, in 13 pages.

Ref. # 419 cited in Appendix A—Prior Art List to the Preliminary Invalidity Contentions filed on behalf of Kinze Manufacturing, Inc. and Ag Leader Technology, Inc.: Allis Chalmers Advertisement: Plant to Prosper with new A-C Short Drop Planters ("Chalmers 1953") (listing a publication or prior art date of Feb. 1953 and a first named inventor /applicant / author of Chalmers), served Oct. 18, 2021, in 1 page.

Ref. # 420 cited in Appendix A—Prior Art List to the Preliminary Invalidity Contentions filed on behalf of Kinze Manufacturing, Inc. and Ag Leader Technology, Inc.: Cockshutt Farm Equipment Hi Speed Planters Brochure (Ad 25-2-57-22M-B) (listing a publication or prior art date of pre 2008 and a first named inventor / applicant / author of Cockshutt), served Oct. 18, 2021, in 8 pages.

Ref. # 421 cited in Appendix A—Prior Art List to the Preliminary Invalidity Contentions filed on behalf of Kinze Manufacturing, Inc. and Ag Leader Technology, Inc.: Spade-Punch Planter for Precision Planting ("Debicki 1996") (listing a publication or prior art date of 1996 and a first named inventor / applicant / author of Debicki), served Oct. 18, 2021, in 9 pages.

Ref. # 422 cited in Appendix A—Prior Art List to the Preliminary Invalidity Contentions filed on behalf of Kinze Manufacturing, Inc. and Ag Leader Technology, Inc.: John Deere_Drawn and Integral Planters Brochure (A-15-79-9) (listing a publication or prior art date of 1981 and a first named inventor / applicant / author of Deere), served Oct. 18, 2021, in 40 pages.

Ref. # 423 cited in Appendix A—Prior Art List to the Preliminary Invalidity Contentions filed on behalf of Kinze Manufacturing, Inc. and Ag Leader Technology, Inc.: John Deere Drawn and Integral Planters Brochure ("Deere DIP 1981") (listing a publication or prior art date of 1981 and a first named inventor / applicant / author of Deere), served Oct. 18, 2021, in 44 pages.

Ref. # 424 cited in Appendix A—Prior Art List to the Preliminary Invalidity Contentions filed on behalf of Kinze Manufacturing, Inc. and Ag Leader Technology, Inc.: John Deere Drawn, Integral and Unit Planters Brochure ("Deere DIP 1987") (listing a publication or prior art date of 1987 and a first named inventor / applicant / author of Deere), served Oct. 18, 2021, in 32 pages.

Ref. # 425 cited in Appendix A—Prior Art List to the Preliminary Invalidity Contentions filed on behalf of Kinze Manufacturing, Inc. and Ag Leader Technology, Inc.: John Deere, 494, 494A, 495, and 495A Corn Planters Parts Catalog (PC541) ("Deere PC541") (listing a publication or prior art date of 1996 and a first named inventor / applicant / author of Deere), served Oct. 18, 2021, in 320 pages.

Ref. # 426 cited in Appendix A—Prior Art List to the Preliminary Invalidity Contentions filed on behalf of Kinze Manufacturing, Inc. and Ag Leader Technology, Inc.: Deere MaxEmerge TM Registration file (listing a publication or prior art date of Nov. 3, 1981 and a first named inventor / applicant / author of Deere), served Oct. 18, 2021, in 153 pages.

Ref. # 427 cited in Appendix A—Prior Art List to the Preliminary Invalidity Contentions filed on behalf of Kinze Manufacturing, Inc. and Ag Leader Technology, Inc.: John Deere 71 Flexi-Planter Parts Catalog ("Deere PC1001") (listing a publication or prior art date of Oct. 30, 1995 and a first named inventor / applicant / author of Deere), served Oct. 18, 2021, in 220 pages.

Screenshots taken from Ref. # 428, a video, cited in Appendix A—Prior Art List to the Preliminary Invalidity Contentions filed on behalf of Kinze Manufacturing, Inc. and Ag Leader Technology, Inc.: John Deere Presents: 494 and 495 Corn Planters (JD-AV-27) (Deere JD-AV-27) (listing a publication or prior art date of Mar. 1961 and a first named inventor / applicant / author of Deere), served Oct. 18, 2021, in 61 pages.

Transcript of Ref. # 428, a video, cited in Appendix A—Prior Art List to the Preliminary Invalidity Contentions filed on behalf of Kinze Manufacturing, Inc. and Ag Leader Technology, Inc.: John Deere Presents: 494 and 495 Corn Planters (JD-AV-27) (Deere JD-AV-27) (listing a publication or prior art date of Mar. 1961 and a first named inventor /applicant / author of Deere), served Oct. 18, 2021, in 5 pages.

Ref. # 429 cited in Appendix A—Prior Art List to the Preliminary Invalidity Contentions filed on behalf of Kinze Manufacturing, Inc. and Ag Leader Technology, Inc.: Deere—2007—Rate Charts and Setting—OMA85407 ("Deere OMA85407") (listing a publication or prior art date of pre 2008 and a first named inventor / applicant / author of Deere), served Oct. 18, 2021, in 204 pages.

Ref. # 430 cited in Appendix A—Prior Art List to the Preliminary Invalidity Contentions filed on behalf of Kinze Manufacturing, Inc. and Ag Leader Technology, Inc.: John Deere 1300 Planter Operators Manual OMB25492 ("Deere OMB25492") (listing a publication or prior art date of pre 2008 and a first named inventor / applicant / author of Deere), served Oct. 18, 2021, in 76 pages.

Ref. # 431 cited in Appendix A—Prior Art List to the Preliminary Invalidity Contentions filed on behalf of Kinze Manufacturing, Inc. and Ag Leader Technology, Inc.: John Deere 246 and 446 Corn Planters and 247 and 447 Cotton Planters Operator's Manual (OM-B25366) (listing a publication or prior art date of pre 2008 and a first named inventor / applicant / author of Deere), served Oct. 18, 2021, in 72 pages.

Ref. # 432 cited in Appendix A—Prior Art List to the Preliminary Invalidity Contentions filed on behalf of Kinze Manufacturing, Inc. and Ag Leader Technology, Inc.: John Deere 494 and 495 Corn Planters Operators Manual (OMB25002B) ("Deere OMB25002B") (listing a publication or prior art date of pre 2008 and a first named inventor / applicant / author of Deere), served Oct. 18, 2021, in 76 pages.

Ref. # 433 cited in Appendix A—Prior Art List to the Preliminary Invalidity Contentions filed on behalf of Kinze Manufacturing, Inc. and Ag Leader Technology, Inc.: John Deere 494A and 495A Corn Planters Operators Manual (OMB25384) ("Deere OM-B25384") (listing a publication or prior art date of pre 2008 and a first named inventor / applicant / author of Deere), served Oct. 18, 2021, in 68 pages.

Ref. # 434 cited in Appendix A—Prior Art List to the Preliminary Invalidity Contentions filed on behalf of Kinze Manufacturing, Inc. and Ag Leader Technology, Inc.: John Deere 494A and 495A Four Row Corn Planter Brochure (A1477-62-12-Pltr.) ("Deere A1477-62-12-Pltr.") (listing a publication or prior art date of pre 2008 and a first named inventor / applicant /author of Deere), served Oct. 18, 2021, in 24 pages.

Ref. # 435 cited in Appendix A—Prior Art List to the Preliminary Invalidity Contentions filed on behalf of Kinze Manufacturing, Inc. and Ag Leader Technology, Inc.: John Deere 694A, 695A, 894A Corn Planters Operators Manual (OMB25384) [sic] ("Deere OMB25384") [sic] (truly, OMB25391) (listing a publication or prior art date of pre 2008 and a first named inventor / applicant / author of Deere), served Oct. 18, 2021, in 64 pages.

Ref. # 436 cited in Appendix A—Prior Art List to the Preliminary Invalidity Contentions filed on behalf of Kinze Manufacturing, Inc. and Ag Leader Technology, Inc.: John Deere 71 Flexi-Planter Operators Manual (OMH135752) ("Deere OMH135752") (listing a publication or prior art date of pre 2008 and a first named inventor / applicant / author of Deere), served Oct. 18, 2021, in 140 pages.

Ref. # 437 cited in Appendix A—Prior Art List to the Preliminary Invalidity Contentions filed on behalf of Kinze Manufacturing, Inc. and Ag Leader Technology, Inc.: John Deere 80 Unit Planter Operators Manual (OMA28630) ("Deere OMA28630") (listing a publication or prior art date of pre 2008 and a first named inventor / applicant / author of Deere), served Oct. 18, 2021, in 68 pages.

Ref. # 438 cited in Appendix A—Prior Art List to the Preliminary Invalidity Contentions filed on behalf of Kinze Manufacturing, Inc. and Ag Leader Technology, Inc.: John Deere 80 Unit Planter Operators Manual (OMB25537) ("Deere OMB25537") (listing a

(56) References Cited

OTHER PUBLICATIONS publication or prior art date of pre 2008 and a first named inventor / applicant / author of Deere), served Oct. 18, 2021, in 36 pages.
Ref. # 439 cited in Appendix A—Prior Art List to the Preliminary Invalidity Contentions filed on behalf of Kinze Manufacturing, Inc. and Ag Leader Technology, Inc.: John Deere MaxEmerge 2 Plateless Metering Units (OMH136460) ("Deere OMH136460") (listing a publication or prior art date of pre 2008 and a first named inventor / applicant / author of Deere), served Oct. 18, 2021, in 122 pages.
Ref. # 440 cited in Appendix A—Prior Art List to the Preliminary Invalidity Contentions filed on behalf of Kinze Manufacturing, Inc. and Ag Leader Technology, Inc.: John Deere Planter Parts Guide (DKD1661) ("Deere DKD1661") (listing a publication or prior art date of pre 2008 and a first named inventor / applicant / author of Deere), served Oct. 18, 2021, in 27 pages.
Ref. # 441 cited in Appendix A—Prior Art List to the Preliminary Invalidity Contentions filed on behalf of Kinze Manufacturing, Inc. and Ag Leader Technology, Inc.: Sembradora Flexible John Deere 71 Operators Manual (OMA29205) ("Deere OMA29205") (listing a publication or prior art date of pre 2008 and a first named inventor / applicant / author of Deere), served Oct. 18, 2021, in 104 pages. Concise Explanation of Relevance: The instant non-patent literature document, Cite No. 417, is a Spanish-language translation or version of John Deere 71 Flexi-Planter Operators Manual (OMH135752), cited herein as non-patent literature document, Cite No. 412 (entitled Ref. # 436 cited in Appendix A—Prior Art List to the Preliminary Invalidity Contentions filed on behalf of Kinze Manufacturing, Inc. and Ag Leader Technology, Inc.: John Deere 71 Flexi-Planter Operators Manual (OMH135752) ("Deere OMH135752") (listing a publication or prior art date of pre 2008 and a first named inventor / applicant / author of Deere), served Oct. 18, 2021, in 140 pages.).
Ref. # 442 cited in Appendix A—Prior Art List to the Preliminary Invalidity Contentions filed on behalf of Kinze Manufacturing, Inc. and Ag Leader Technology, Inc.: John Deere_494_495_694_695_Fourand-Six-Row Corn Planters Brochure (A-1410-60-9) ("Deere A-1410-60-9") (listing a publication or prior art date of pre 2008 and a first named inventor /applicant / author of Deere), served Oct. 18, 2021, in 28 pages.
Ref. # 443 cited in Appendix A—Prior Art List to the Preliminary Invalidity Contentions filed on behalf of Kinze Manufacturing, Inc. and Ag Leader Technology, Inc.: John Deere_Zone System for Corn (D-101-63-7) ("Deere D-101-63-7") (listing a publication or prior art date of pre 2008 and a first named inventor / applicant / author of Deere), served Oct. 18, 2021, in 28 pages.
Ref. # 444 cited in Appendix A—Prior Art List to the Preliminary Invalidity Contentions filed on behalf of Kinze Manufacturing, Inc. and Ag Leader Technology, Inc.: John Deere 694A, 695A, 894A Corn Planters Operators Manual (OMB25391) ("Deere OMB25391") (listing a publication or prior art date of pre 2008 and a first named inventor / applicant / author of Deere), served Oct. 18, 2021, in 64 pages.
Ref. # 445 cited in Appendix A—Prior Art List to the Preliminary Invalidity Contentions filed on behalf of Kinze Manufacturing, Inc. and Ag Leader Technology, Inc.: John Deere 7200 MaxEmerge 2 Drawn Conservation Planters 4-Row and 6-Row Narrow (OMA54938) ("Deere OMA54938") (listing a publication or prior art date of pre 2008 and a first named inventor /applicant / author of Deere), served Oct. 18, 2021, in 352 pages.
Ref. # 446 cited in Appendix A—Prior Art List to the Preliminary Invalidity Contentions filed on behalf of Kinze Manufacturing, Inc. and Ag Leader Technology, Inc.: John Deere 7200 MaxEmerge 2 Drawn Conservation Planters 6-Row Wide and 8-Row Narrow Planters (OMA54942) ("Deere OMA54942") (listing a publication or prior art date of pre 2008 and a first named inventor / applicant / author of Deere), served Oct. 18, 2021, in 346 pages.
Ref. # 447 cited in Appendix A—Prior Art List to the Preliminary Invalidity Contentions filed on behalf of Kinze Manufacturing, Inc. and Ag Leader Technology, Inc.: John Deere 7200 Front-Fold MaxEmerge 2 Drawn Conservation Planter, 12-Row Flex-Frame (OMA54948) ("Deere OMA54948") (listing a publication or prior art date of pre 2008 and a first named inventor / applicant / author of Deere), served Oct. 18, 2021, in 346 pages.
Ref. # 448 cited in Appendix A—Prior Art List to the Preliminary Invalidity Contentions filed on behalf of Kinze Manufacturing, Inc. and Ag Leader Technology, Inc.: John Deere 7300 MaxEmerge 2 Integral Planters Operators Manual (OMA54956) ("Deere OMA54956") (listing a publication or prior art date of pre 2008 and a first named inventor / applicant /author of Deere), served Oct. 18, 2021, in 294 pages.
Ref. # 449 cited in Appendix A—Prior Art List to the Preliminary Invalidity Contentions filed on behalf of Kinze Manufacturing, Inc. and Ag Leader Technology, Inc.: John Deere 7500 MaxEmerge Plus Drawn Conservation Planters 6-Row Wide and 8-Row Narrow Planter Operators Manual (OMA56574) ("Deere OMA56574") (listing a publication or prior art date of Pre 2008 and a first named inventor / applicant / author of Deere), served Oct. 18, 2021, in 350 pages.
Ref. # 450 cited in Appendix A—Prior Art List to the Preliminary Invalidity Contentions filed on behalf of Kinze Manufacturing, Inc. and Ag Leader Technology, Inc.: John Deere 1770NT CCS 16-Row Narrow Planter with Pro-Series XP Row Units Operators Manual (OMA83922) ("Deere OMA83922") (listing a publication or prior art date of pre 2008 and a first named inventor / applicant / author of Deere), served Oct. 18, 2021, in 340 pages.
Ref. # 451 cited in Appendix A—Prior Art List to the Preliminary Invalidity Contentions filed on behalf of Kinze Manufacturing, Inc. and Ag Leader Technology, Inc.: John Deere 1770NT CCS 12-Row Narrow Planter with MaxEmerge XP Row Units Operators Manual (OMA83926) ("Deere OMA83926") (listing a publication or prior art date of pre 2008 and a first named inventor / applicant / author of Deere), served Oct. 18, 2021, in 444 pages.
Ref. # 452 cited in Appendix A—Prior Art List to the Preliminary Invalidity Contentions filed on behalf of Kinze Manufacturing, Inc. and Ag Leader Technology, Inc.: John Deere 1770NT CCS 24-Row Narrow Planter with MaxEmerge XP Row Units Operators Manual (OMA83938) ("Deere OMA83938") (listing a publication or prior art date of pre 2008 and a first named inventor / applicant / author of Deere), served Oct. 18, 2021, in 432 pages.
Ref. # 453 cited in Appendix A—Prior Art List to the Preliminary Invalidity Contentions filed on behalf of Kinze Manufacturing, Inc. and Ag Leader Technology, Inc.: John Deere MaxEmerge 2 Vacuum Metering Units Operators Manual (OMH136461) ("Deere OMH136461") (listing a publication or prior art date of pre 2008 and a first named inventor/ applicant / author of Deere), served Oct. 18, 2021, in 94 pages.
Ref. # 454 cited in Appendix A—Prior Art List to the Preliminary Invalidity Contentions filed on behalf of Kinze Manufacturing, Inc. and Ag Leader Technology, Inc.: John Deere 1740 Planter Operators Manual (OMP73961) ("Deere OMP73961") (listing a publication or prior art date of pre 2008 and a first named inventor / applicant / author of Deere), served Oct. 18, 2021, in 216 pages.
Ref. # 455 cited in Appendix A—Prior Art List to the Preliminary Invalidity Contentions filed on behalf of Kinze Manufacturing, Inc. and Ag Leader Technology, Inc.: John Deere 7000 and 7100 MaxEmerge Planting Units Parts Catalog (PC2604) ("Deere PC2604") (listing a publication or prior art date of pre 2008 and a first named inventor / applicant / author of Deere), served Oct. 18, 2021, in 112 pages.
Ref. # 456 cited in Appendix A—Prior Art List to the Preliminary Invalidity Contentions filed on behalf of Kinze Manufacturing, Inc. and Ag Leader Technology, Inc.: John Deere Operators Manual—MaxEmerge 2 Vacuum Metering Units—OMH136461 ("Deere OMH136461") (listing a publication or prior art date of pre 2008 and a first named inventor/ applicant / author of Deere), served Oct. 18, 2021, in 94 pages.
Ref. # 457 cited in Appendix A—Prior Art List to the Preliminary Invalidity Contentions filed on behalf of Kinze Manufacturing, Inc. and Ag Leader Technology, Inc.: Operators Manual—Rate Charts and Settings, Imperial (U.S.) Units—OMA84620 Issue F6 ("Deere OMA84620") (listing a publication or prior art date of pre 2008 and a first named inventor /applicant / author of Deere), served Oct. 18, 2021, in 214 pages.

(56) References Cited

OTHER PUBLICATIONS

Ref. # 458 cited in Appendix A—Prior Art List to the Preliminary Invalidity Contentions filed on behalf of Kinze Manufacturing, Inc. and Ag Leader Technology, Inc.: Planter.MaxEmerge-Plus.EPN-1750-E.English (2001) ("Deere EPN-1750-E") (listing a publication or prior art date of pre 2008 and a first named inventor / applicant / author of Deere), served Oct. 18, 2021, in 20 pages.

Ref. # 459 cited in Appendix A—Prior Art List to the Preliminary Invalidity Contentions filed on behalf of Kinze Manufacturing, Inc. and Ag Leader Technology, Inc.: John Deere 7100 Folding Max-Emerge Planter OMA34000 ("Deere OMA34000") (listing a publication or prior art date of pre 2008 and a first named inventor / applicant / author of Deere), served Oct. 18, 2021, in 168 pages.

Ref. # 460 cited in Appendix A—Prior Art List to the Preliminary Invalidity Contentions filed on behalf of Kinze Manufacturing, Inc. and Ag Leader Technology, Inc.: John Deere 7000 Max-Emerge 6-Row Wide, 8-Row Narrow and Wide and 12-Row Narrow Drawn Planters OMA40642 ("Deere OMA40642") (listing a publication or prior art date of pre 2008 and a first named inventor / applicant / author of Deere), served Oct. 18, 2021, in 204 pages.

Ref. # 461 cited in Appendix A—Prior Art List to the Preliminary Invalidity Contentions filed on behalf of Kinze Manufacturing, Inc. and Ag Leader Technology, Inc.: John Deere MaxEmerge 2 Plate Metering Units OMH136459 ("Deere OMH136459") (listing a publication or prior art date of pre 2008 and a first named inventor / applicant / author of Deere), served Oct. 18, 2021, in 126 pages.

Ref. # 462 cited in Appendix A—Prior Art List to the Preliminary Invalidity Contentions filed on behalf of Kinze Manufacturing, Inc. and Ag Leader Technology, Inc.: FarmProgress—Deere unveils new MaxEmerge Units ("FarmProgress 2004") (listing a publication or prior art date of Nov. 18, 2004 and a first named inventor / applicant / author of FarmProgress), served Oct. 18, 2021, in 5 pages.

Ref. # 463 cited in Appendix A—Prior Art List to the Preliminary Invalidity Contentions filed on behalf of Kinze Manufacturing, Inc. and Ag Leader Technology, Inc.: Felton Brush 2005—DesignFlex ("Felton DesignFlex") (listing a publication or prior art date of 2005 and a first named inventor / applicant / author of Felton), served Oct. 18, 2021, in 2 pages.

Ref. # 464 cited in Appendix A—Prior Art List to the Preliminary Invalidity Contentions filed on behalf of Kinze Manufacturing, Inc. and Ag Leader Technology, Inc.: Felton Brush 2005—Polymer Brush offers chemical resistance ("Felton Polymer Brush") (listing a publication or prior art date of 2005 and a first named inventor / applicant / author of Felton), served Oct. 18, 2021, in 5 pages.

Ref. # 465 cited in Appendix A—Prior Art List to the Preliminary Invalidity Contentions filed on behalf of Kinze Manufacturing, Inc. and Ag Leader Technology, Inc.: Ferguson Drill Type Corn Planter Brochure (HF-4602) ("Ferguson HF-4602") (listing a publication or prior art date of 1948 and a first named inventor / applicant / author of Ferguson), served Oct. 18, 2021, in 4 pages.

Ref. # 466 cited in Appendix A—Prior Art List to the Preliminary Invalidity Contentions filed on behalf of Kinze Manufacturing, Inc. and Ag Leader Technology, Inc.: Great Plains Manufacturing, Inc. Operators Manual for PT1230 Pull-Type Folding Planter ("Great Plains 2002") (listing a publication or prior art date of Jun. 24, 2002 and a first named inventor /applicant / author of Great Plains), served Oct. 18, 2021, in 76 pages.

Ref. # 467 cited in Appendix A—Prior Art List to the Preliminary Invalidity Contentions filed on behalf of Kinze Manufacturing, Inc. and Ag Leader Technology, Inc.: Belt Conveyors and Belt Elevators ("Hetzel 1905") (listing a publication or prior art date of 1922 and a first named inventor / applicant / author of Hetzel), served Oct. 18, 2021, in 1 page.

Ref. # 468 cited in Appendix A—Prior Art List to the Preliminary Invalidity Contentions filed on behalf of Kinze Manufacturing, Inc. and Ag Leader Technology, Inc.: International Harvester_McCormick Corn Planters Brochure (CR-1038-L) ("International Harvester CR-1038-L") (listing a publication or prior art date of pre 2008 and a first named inventor /applicant / author of International Harvester), served Oct. 18, 2021, in 16 pages.

Ref. # 469 cited in Appendix A—Prior Art List to the Preliminary Invalidity Contentions filed on behalf of Kinze Manufacturing, Inc. and Ag Leader Technology, Inc.: International Harvester_McCormick Corn Planters Brochure (CR-1063-G) ("International Harvester CR-1063-G") (listing a publication or prior art date of pre 2008 and a first named inventor /applicant / author of International Harvester), served Oct. 18, 2021, in 16 pages.

Ref. # 470 cited in Appendix A—Prior Art List to the Preliminary Invalidity Contentions filed on behalf of Kinze Manufacturing, Inc. and Ag Leader Technology, Inc.: Alternative measures of accuracy in plant spacing for planters using single seed metering ASAE 38(2): 379-387 ("Kachman 1995") (listing a publication or prior art date of 1995 and a first named inventor/ applicant / author of Kachman), served Oct. 18, 2021, in 9 pages.

Ref. # 471 cited in Appendix A—Prior Art List to the Preliminary Invalidity Contentions filed on behalf of Kinze Manufacturing, Inc. and Ag Leader Technology, Inc.: Kinze 3000 Series Planters Brochure (PL-12-03) ("Kinze PL-12-03") (listing a publication or prior art date of Sep. 15, 2008 and a first named inventor / applicant / author of Kinze), served Oct. 18, 2021, in 40 pages.

Ref. # 472 cited in Appendix A—Prior Art List to the Preliminary Invalidity Contentions filed on behalf of Kinze Manufacturing, Inc. and Ag Leader Technology, Inc.: Kinze Model 3600 Twin-Line Planter—Operator and Parts Manual (M0195 Rev. 8/07) ("Kinze M0195") (listing a publication or prior art date of Aug. 2007 and a first named inventor / applicant / author of Kinze), served Oct. 18, 2021, in 394 pages.

Ref. # 473 cited in Appendix A—Prior Art List to the Preliminary Invalidity Contentions filed on behalf of Kinze Manufacturing, Inc. and Ag Leader Technology, Inc.: Kinze Model 3110 3 Point Mounted Planter Operator & Parts Manual (M0183 Rev. 3/08) ("Kinze M0183") (listing a publication or prior art date of Mar. 2008 and a first named inventor / applicant / author of Kinze), served Oct. 18, 2021, in 253 pages.

Ref. # 474 cited in Appendix A—Prior Art List to the Preliminary Invalidity Contentions filed on behalf of Kinze Manufacturing, Inc. and Ag Leader Technology, Inc.: Kinze Model 3600 Twin-Line Planter—Operator and Parts Manual (M0200Rev. 11/07) ("Kinze M0200") (listing a publication or prior art date of Nov. 2007 and a first named inventor / applicant /author of Kinze), served Oct. 18, 2021, in 428 pages.

Ref. # 475 cited in Appendix A—Prior Art List to the Preliminary Invalidity Contentions filed on behalf of Kinze Manufacturing, Inc. and Ag Leader Technology, Inc.: Monosem Pneumatic Planter Type NG "Plus" Operators Manual ("Monosem NG 'Plus'") (listing a publication or prior art date of 1989 and a first named inventor / applicant / author of Monosem), served Oct. 18, 2021, in 18 pages.

Ref. # 476 cited in Appendix A—Prior Art List to the Preliminary Invalidity Contentions filed on behalf of Kinze Manufacturing, Inc. and Ag Leader Technology, Inc.: Monosem Pneumatic Planter Operators Manual Pull Type Planter (listing a publication or prior art date of 1997 and a first named inventor / applicant / author of Monosem), served Oct. 18, 2021, in 56 pages.

Ref. # 477 cited in Appendix A—Prior Art List to the Preliminary Invalidity Contentions filed on behalf of Kinze Manufacturing, Inc. and Ag Leader Technology, Inc.: Monosem Pull Type Parts Replacement Parts Manual (listing a publication or prior art date of 1997 and a first named inventor / applicant / author of Monosem), served Oct. 18, 2021, in 54 pages.

Ref. # 478 cited in Appendix A—Prior Art List to the Preliminary Invalidity Contentions filed on behalf of Kinze Manufacturing, Inc. and Ag Leader Technology, Inc.: Monosem Pneumatic Planter—Operators Manual (NGPlus (1997)) (listing a publication or prior art date of 1997 and a first named inventor / applicant / author of Monosem), served Oct. 18, 2021, in 56 pages.

Ref. # 479 cited in Appendix A—Prior Art List to the Preliminary Invalidity Contentions filed on behalf of Kinze Manufacturing, Inc. and Ag Leader Technology, Inc.: Monosem Pneumatic Planter Operators Manual NG Plus Mounted Planter Operators Manual (listing a publication or prior art date of 2000 and a first named inventor / applicant / author of Monosem), served Oct. 18, 2021, in 51 pages.

(56) References Cited

OTHER PUBLICATIONS

Ref. # 480 cited in Appendix A—Prior Art List to the Preliminary Invalidity Contentions filed on behalf of Kinze Manufacturing, Inc. and Ag Leader Technology, Inc.: Monosem Notice Semoirs Planter Manual (NG et NG Plus 2) ("Monosem 90090") (listing a publication or prior art date of 2002 and a first named inventor / applicant / author of Monosem), served Oct. 18, 2021, in 60 pages.
Ref. # 481 cited in Appendix A—Prior Art List to the Preliminary Invalidity Contentions filed on behalf of Kinze Manufacturing, Inc. and Ag Leader Technology, Inc.: Monosem NC-2005 Assembly, Adjustment and Maintenance Instructions ("Monosem 2005") (listing a publication or prior art date of 2005 and a first named inventor / applicant / author of Monosem), served Oct. 18, 2021, in 60 pages.
Ref. # 482 cited in Appendix A—Prior Art List to the Preliminary Invalidity Contentions filed on behalf of Kinze Manufacturing, Inc. and Ag Leader Technology, Inc.: Monosem NC-2007 Assembly, Adjustment and Maintenance Instructions ("Monosem 2007") (listing a publication or prior art date of 2007 and a first named inventor / applicant / author of Monosem), served Oct. 18, 2021, in 68 pages.
Ref. # 483 cited in Appendix A—Prior Art List to the Preliminary Invalidity Contentions filed on behalf of Kinze Manufacturing, Inc. and Ag Leader Technology, Inc.: Monosem 7×7 Mounted Planter—Operator and Parts Manual (NGPlus3 (Pre 2008)) (listing a publication or prior art date of pre 2008 and a first named inventor / applicant / author of Monosem), served Oct. 18, 2021, in 83 pages.
Ref. # 484 cited in Appendix A—Prior Art List to the Preliminary Invalidity Contentions filed on behalf of Kinze Manufacturing, Inc. and Ag Leader Technology, Inc.: Monosem Twin-Row Mounted Planter—Operator and Parts Manual (NGPlus3 (2008)) (listing a publication or prior art date of pre 2008 and a first named inventor / applicant / author of Monosem), served Oct. 18, 2021, in 88 pages.
Ref. # 485 cited in Appendix A—Prior Art List to the Preliminary Invalidity Contentions filed on behalf of Kinze Manufacturing, Inc. and Ag Leader Technology, Inc.: Monosem 6 Row Unit Single Manual (listing a publication or prior art date of pre 2008 and a first named inventor / applicant / author of Monosem), served Oct. 18, 2021, in 19 pages.
Ref. # 486 cited in Appendix A—Prior Art List to the Preliminary Invalidity Contentions filed on behalf of Kinze Manufacturing, Inc. and Ag Leader Technology, Inc.: Monosem 6 Row Unit Twin Manual (listing a publication or prior art date of pre 2008 and a first named inventor / applicant / author of Monosem), served Oct. 18, 2021, in 23 pages.
Ref. # 487 cited in Appendix A—Prior Art List to the Preliminary Invalidity Contentions filed on behalf of Kinze Manufacturing, Inc. and Ag Leader Technology, Inc.: Monosem MS Mini Seed Vegetable Planter Brochure ("Monosem Jan. 2016.ms") (listing a publication or prior art date of pre 2008 and a first named inventor / applicant / author of Monosem), served Oct. 18, 2021, in 16 pages.
Ref. # 488 cited in Appendix A—Prior Art List to the Preliminary Invalidity Contentions filed on behalf of Kinze Manufacturing, Inc. and Ag Leader Technology, Inc.: Monosem 2001 -Not_Semoir-NGPlus2_FR-GB-DE-NL_2001 ("Monosem 79300") (listing a publication or prior art date of pre 2008 and a first named inventor / applicant / author of Monosem), served Oct. 18, 2021, in 60 pages.
Ref. # 489 cited in Appendix A—Prior Art List to the Preliminary Invalidity Contentions filed on behalf of Kinze Manufacturing, Inc. and Ag Leader Technology, Inc.: Planters and their Components—types, attributes, functional requirements, classification and description ("Murray 2006") (listing a publication or prior art date of 2006 and a first named inventor /applicant / author of Murray), served Oct. 18, 2021, in 178 pages.
Ref. # 490 cited in Appendix A—Prior Art List to the Preliminary Invalidity Contentions filed on behalf of Kinze Manufacturing, Inc. and Ag Leader Technology, Inc.: Aspects of Seed Transfer within a Direct Drilling Coulter (Opener) ("Ritchie 1982") (listing a publication or prior art date of 1982 and a first named inventor / applicant / author of Ritchie), served Oct. 18, 2021, in 162 pages.
Ref. # 491 cited in Appendix A—Prior Art List to the Preliminary Invalidity Contentions filed on behalf of Kinze Manufacturing, Inc. and Ag Leader Technology, Inc.: Field Slope Effects on Uniformity of Corn Seed Spacing for Three Precision Planter Metering Systems ("Searle 2008") (listing a publication or prior art date of 2008 and a first named inventor / applicant /author of Searle), served Oct. 18, 2021, in 7 pages.
Ref. # 492 cited in Appendix A—Prior Art List to the Preliminary Invalidity Contentions filed on behalf of Kinze Manufacturing, Inc. and Ag Leader Technology, Inc.: Evaluate Planter Meter and Seed Tube Systems for Seed Spacing Performance of Confection Sunflower Seed to Improve Plant Spacing in the Field ("Smith Pre 2008") (listing a publication or prior art date of pre 2008 and a first named inventor / applicant / author of smith), served Oct. 18, 2021, in 13 pages.
Ref. # 493 cited in Appendix A—Prior Art List to the Preliminary Invalidity Contentions filed on behalf of Kinze Manufacturing, Inc. and Ag Leader Technology, Inc.: Engineering Principles of Agricultural Machines ("Srivastava" or "Srivastava 2006") (listing a publication or prior art date of 2006 and a first named inventor / applicant / author of Srivastava), served Oct. 18, 2021, in 155 pages.
Ref. # 494 cited in Appendix A—Prior Art List to the Preliminary Invalidity Contentions filed on behalf of Kinze Manufacturing, Inc. and Ag Leader Technology, Inc.: A Seed Transport and Delivery Mechanism for the Revolving Spade Planter ("Yeon 2000") (listing a publication or prior art date of 2000 and a first named inventor / applicant / author of Yeon), served Oct. 18, 2021, in 127 pages.
Plaintiffs Deere & Company and John Deere Shared Services, Inc. and Defendants Kinze Manufacturing, Inc. and Ag Leader Technology, Inc.'s Joint Claim Construction Chart, filed Jan. 31, 2022 (Dkt. No. 161), in 5 pages.
Appendix 1 to Plaintiffs Deere & Company and John Deere Shared Services, Inc. and Defendants Kinze Manufacturing, Inc. and Ag Leader Technology, Inc.'s Joint Claim Construction Chart: Joint Chart of Proposed Constructions, filed Jan. 31, 2022 (Dkt. No. 161-1), in 20 pages.
Appendix 2 to Plaintiffs Deere & Company and John Deere Shared Services, Inc. and Defendants Kinze Manufacturing, Inc. and Ag Leader Technology, Inc.'s Joint Claim Construction Chart: Defendants' Chart of Asserted Invalid Terms (Mixing Apparatus and Method), filed Jan. 31, 2022 (Dkt. No. 161-2), in 7 pages.
Appendix 3 to Plaintiffs Deere & Company and John Deere Shared Services, Inc. and Defendants Kinze Manufacturing, Inc. and Ag Leader Technology, Inc.'s Joint Claim Construction Chart: Plaintiffs' Chart of Proposed Constructions and Supporting Evidence, filed Jan. 31, 2022 (Dkt. No. 161-3), in 88 pages.
Appendix 4 to Plaintiffs Deere & Company and John Deere Shared Services, Inc. and Defendants Kinze Manufacturing, Inc. and Ag Leader Technology, Inc.'s Joint Claim Construction Chart: Defendants' Chart of Proposed Constructions and Supporting Evidence, filed Jan. 31, 2022 (Dkt. No. 161-4), in 186 pages.
Defendants', Kinze Manufacturing, Inc. and Ag Leader Technology, Inc.'s, Opening Claim Construction Brief, filed Feb. 23, 2022 (Dkt. No. 165), in 47 pages.
Declaration of Mark A. Hagedorn in Support of Defendants', Kinze Manufacturing, Inc. and Ag Leader Technology, Inc.'s, Opening Claim Construction Brief, filed Feb. 23, 2022 (Dkt. No. 166), in 10 pages.
Exhibits 1-10 to Defendants', Kinze Manufacturing, Inc. and Ag Leader Technology, Inc.'s, Claim Construction Brief, filed Feb. 23, 2022 (Dkt. No. 166-1), in 571 pages.
Exhibits 11-21 to Defendants', Kinze Manufacturing, Inc. and Ag Leader Technology, Inc.'s, Claim Construction Brief, filed Feb. 23, 2022 (Dkt. No. 166-2), in 408 pages.
Exhibits 22-25 to Defendants', Kinze Manufacturing, Inc. and Ag Leader Technology, Inc.'s, Claim Construction Brief, filed Feb. 23, 2022 (Dkt. No. 166-3), in 486 pages.
Exhibits 26-33 to Defendants', Kinze Manufacturing, Inc. and Ag Leader Technology, Inc.'s, Claim Construction Brief, filed Feb. 23, 2022 (Dkt. No. 166-4), in 528 pages.
Exhibits 34-43 to Defendants', Kinze Manufacturing, Inc. and Ag Leader Technology, Inc.'s, Claim Construction Brief, filed Feb. 23, 2022 (Dkt. No. 166-5), in 681 pages.

(56) References Cited

OTHER PUBLICATIONS

Exhibits 44-48 to Defendants', Kinze Manufacturing, Inc. and Ag Leader Technology, Inc.'s, Claim Construction Brief, filed Feb. 23, 2022 (Dkt. No. 166-6), in 580 pages.
Exhibits 49-55 to Defendants', Kinze Manufacturing, Inc. and Ag Leader Technology, Inc.'s, Claim Construction Brief, filed Feb. 23, 2022 (Dkt. No. 166-7), in 944 pages.
Exhibits 56-60 to Defendants', Kinze Manufacturing, Inc. and Ag Leader Technology, Inc.'s, Claim Construction Brief, filed Feb. 23, 2022 (Dkt. No. 166-8), in 641 pages.
Exhibits 61-66 to Defendants', Kinze Manufacturing, Inc. and Ag Leader Technology, Inc.'s, Claim Construction Brief, filed Feb. 23, 2022 (Dkt. No. 166-9), in 920 pages.
Exhibits 67-81 to Defendants', Kinze Manufacturing, Inc. and Ag Leader Technology, Inc.'s, Claim Construction Brief, filed Feb. 23, 2022 (Dkt. No. 166-10), in 494 pages.
Plaintiffs', Deere & Company and John Deere Shared Services, Inc.'s, Opening Claim Construction Brief, filed Feb. 23, 2022 (Dkt. No. 167), in 42 pages.
Declaration of Nathan S. Mammen in Support of Plaintiffs', Deere & Company and John Deere Shared Services, Inc.'s, Opening Claim Construction Brief, filed Feb. 23, 2022 (Dkt. No. 167-1), in 3 pages.
Exhibit 1 to Plaintiffs', Deere & Company and John Deere Shared Services, Inc.'s, Opening Claim Construction Brief, filed Feb. 23, 2022 (Dkt. No. 167-2), in 17 pages.
Exhibit 2 to Plaintiffs', Deere & Company and John Deere Shared Services, Inc.'s, Opening Claim Construction Brief, filed Feb. 23, 2022 (Dkt. No. 167-3), in 17 pages.
Exhibit 3 to Plaintiffs', Deere & Company and John Deere Shared Services, Inc.'s, Opening Claim Construction Brief, filed Feb. 23, 2022 (Dkt. No. 167-4), in 18 pages.
Exhibit 4 to Plaintiffs', Deere & Company and John Deere Shared Services, Inc.'s, Opening Claim Construction Brief, filed Feb. 23, 2022 (Dkt. No. 167-5), in 17 pages.
Exhibit 5 to Plaintiffs', Deere & Company and John Deere Shared Services, Inc.'s, Opening Claim Construction Brief, filed Feb. 23, 2022 (Dkt. No. 167-6), in 18 pages.
Exhibit 6 to Plaintiffs', Deere & Company and John Deere Shared Services, Inc.'s, Opening Claim Construction Brief, filed Feb. 23, 2022 (Dkt. No. 167-7), in 18 pages.
Exhibit 7 to Plaintiffs', Deere & Company and John Deere Shared Services, Inc.'s, Opening Claim Construction Brief, filed Feb. 23, 2022 (Dkt. No. 167-8), in 18 pages.
Exhibit 8 to Plaintiffs', Deere & Company and John Deere Shared Services, Inc.'s, Opening Claim Construction Brief, filed Feb. 23, 2022 (Dkt. No. 167-9), in 23 pages.
Exhibit 9 to Plaintiffs', Deere & Company and John Deere Shared Services, Inc.'s, Opening Claim Construction Brief, filed Feb. 23, 2022 (Dkt. No. 167-10), in 23 pages.
Exhibit 10 to Plaintiffs', Deere & Company and John Deere Shared Services, Inc.'s, Opening Claim Construction Brief, filed Feb. 23, 2022 (Dkt. No. 167-11), in 29 pages.
Exhibit 11 to Plaintiffs', Deere & Company and John Deere Shared Services, Inc.'s, Opening Claim Construction Brief, filed Feb. 23, 2022 (Dkt. No. 167-12), in 44 pages.
Exhibit 12 to Plaintiffs', Deere & Company and John Deere Shared Services, Inc.'s, Opening Claim Construction Brief, filed Feb. 23, 2022 (Dkt. No. 167-13), in 114 pages.
Exhibit 13 to Plaintiffs', Deere & Company and John Deere Shared Services, Inc.'s, Opening Claim Construction Brief, filed Feb. 23, 2022 (Dkt. No. 167-14), in 6 pages.
Exhibit 14 to Plaintiffs', Deere & Company and John Deere Shared Services, Inc.'s, Opening Claim Construction Brief, filed Feb. 23, 2022 (Dkt. No. 167-15), in 144 pages.
Exhibit 15 to Plaintiffs', Deere & Company and John Deere Shared Services, Inc.'s, Opening Claim Construction Brief, filed Feb. 23, 2022 (Dkt. No. 167-16), in 128 pages.
Exhibit 16 to Plaintiffs', Deere & Company and John Deere Shared Services, Inc.'s, Opening Claim Construction Brief, filed Feb. 23, 2022 (Dkt. No. 167-17), in 17 pages.
Exhibit 17 to Plaintiffs', Deere & Company and John Deere Shared Services, Inc.'s, Opening Claim Construction Brief, filed Feb. 23, 2022 (Dkt. No. 167-18), in 9 pages.
Exhibit 18 to Plaintiffs', Deere & Company and John Deere Shared Services, Inc.'s, Opening Claim Construction Brief, filed Feb. 23, 2022 (Dkt. No. 167-19), in 5 pages.
Exhibit 19 to Plaintiffs', Deere & Company and John Deere Shared Services, Inc.'s, Opening Claim Construction Brief, filed Feb. 23, 2022 (Dkt. No. 167-20), in 4 pages.
Defendants', Kinze Manufacturing, Inc. and Ag Leader Technology, Inc.'s, Rebuttal Claim Construction Brief (Redacted Version), filed Mar. 22, 2022 (Dkt. No. 175), in 43 pages.
Rebuttal Declaration of Dr. John Long, Ph.D., P.E. in Support of Defendants', Kinze Manufacturing, Inc. and Ag Leader Technology, Inc.'s, Rebuttal Claim Construction Brief, filed Mar. 22, 2022 (Dkt. No. 175-1), in 25 pages.
Declaration of Mark A. Hagedorn in Support of Defendants', Kinze Manufacturing, Inc. and Ag Leader Technology, Inc.'s, Rebuttal Claim Construction Brief, filed Mar. 22, 2022 (Dkt. No. 175-2), in 4 pages.
Exhibits 83 to Defendants', Kinze Manufacturing, Inc. and Ag Leader Technology, Inc.'s, Claim Construction Brief, filed Mar. 22, 2022 (Dkt. No. 175-3), in 86 pages.
Exhibits 84 to Defendants', Kinze Manufacturing, Inc. and Ag Leader Technology, Inc.'s, Claim Construction Brief, filed Mar. 22, 2022 (Dkt. No. 175-4), in 27 pages.
Exhibits 86 to Defendants', Kinze Manufacturing, Inc. and Ag Leader Technology, Inc.'s, Claim Construction Brief, filed Mar. 22, 2022 (Dkt. No. 175-6), in 8 pages.
Exhibits 89 to Defendants', Kinze Manufacturing, Inc. and Ag Leader Technology, Inc.'s, Claim Construction Brief, filed Mar. 22, 2022 (Dkt. No. 175-9), in 22 pages.
Exhibits 92 to Defendants', Kinze Manufacturing, Inc. and Ag Leader Technology, Inc.'s, Claim Construction Brief, filed Mar. 22, 2022 (Dkt. No. 175-12), in 8 pages.
Plaintiffs', Deere & Company and John Deere Shared Services, Inc.'s, Reply Claim Construction Brief, filed Mar. 22, 2022 (Dkt. No. 176), in 43 pages.
Declaration of Nathan S. Mammen in Support of Plaintiffs', Deere & Company and John Deere Shared Services, Inc.'s, Reply Claim Construction Brief, filed Mar. 22, 2022 (Dkt. No. 176-1), in 3 pages.
Exhibit 20 to Plaintiffs', Deere & Company and John Deere Shared Services, Inc.'s, Reply Claim Construction Brief, filed Mar. 22, 2022 (Dkt. No. 176-2), in 10 pages.
Exhibit 21 to Plaintiffs', Deere & Company and John Deere Shared Services, Inc.'s, Reply Claim Construction Brief, filed Mar. 22, 2022 (Dkt. No. 176-3), in 20 pages.
Exhibit 22 to Plaintiffs', Deere & Company and John Deere Shared Services, Inc.'s, Reply Claim Construction Brief, filed Mar. 22, 2022 (Dkt. No. 176-4), in 71 pages.
Exhibit 23 to Plaintiffs', Deere & Company and John Deere Shared Services, Inc.'s, Reply Claim Construction Brief, filed Mar. 22, 2022 (Dkt. No. 176-5), in 46 pages.
Exhibit 24 to Plaintiffs', Deere & Company and John Deere Shared Services, Inc.'s, Reply Claim Construction Brief, filed Mar. 22, 2022 (Dkt. No. 176-6), in 27 pages.
Exhibit 25 to Plaintiffs', Deere & Company and John Deere Shared Services, Inc.'s, Reply Claim Construction Brief, filed Mar. 22, 2022 (Dkt. No. 176-7), in 26 pages.
Exhibit 26 to Plaintiffs', Deere & Company and John Deere Shared Services, Inc.'s, Reply Claim Construction Brief, filed Mar. 22, 2022 (Dkt. No. 176-8), in 6 pages.
Exhibit 27 to Plaintiffs', Deere & Company and John Deere Shared Services, Inc.'s, Reply Claim Construction Brief, filed Mar. 22, 2022 (Dkt. No. 176-9), in 53 pages.
Exhibit 28 to Plaintiffs', Deere & Company and John Deere Shared Services, Inc.'s, Reply Claim Construction Brief, filed Mar. 22, 2022 (Dkt. No. 176-10), in 15 pages.
Exhibit 29 to Plaintiffs', Deere & Company and John Deere Shared Services, Inc.'s, Reply Claim Construction Brief, filed Mar. 22, 2022 (Dkt. No. 176-11), in 15 pages.

(56) References Cited

OTHER PUBLICATIONS

Exhibit 30 to Plaintiffs', Deere & Company and John Deere Shared Services, Inc.'s, Reply Claim Construction Brief, filed Mar. 22, 2022 (Dkt. No. 176-12), in 50 pages.

Exhibit 31 to Plaintiffs', Deere & Company and John Deere Shared Services, Inc.'s, Reply Claim Construction Brief, filed Mar. 22, 2022 (Dkt. No. 176-13), in 40 pages.

Exhibit 32 to Plaintiffs', Deere & Company and John Deere Shared Services, Inc.'s, Reply Claim Construction Brief, filed Mar. 22, 2022 (Dkt. No. 176-14), in 50 pages.

Transcript of Markman Hearing in *Deere & Company et al.* v. *Kinze Manufacturing, Inc., et al.*, held on Monday, Mar. 28, 2022 (Dkt. No. 193), in 242 pages.

Kinze Manufacturing, Inc. and Ag Leader Technology, Inc.'s Supplemental Preliminary Invalidity Contentions, served Jun. 10, 2022, in 39 pages.

Supplemental Appendix B to Kinze Manufacturing, Inc. and Ag Leader Technology, Inc.'s Supplemental Preliminary Invalidity Contentions, Exemplary Motivations to Combine, served Jun. 10, 2022, in 123 pages.

Supplemental Appendix C to Kinze Manufacturing, Inc. and Ag Leader Technology, Inc.'s Supplemental Preliminary Invalidity Contentions, Prior Art Grouped to Claimed Prior Art Concepts, served Jun. 10, 2022, in 339 pages.

Exhibit 99 to Kinze Manufacturing, Inc. and Ag Leader Technology, Inc.'s Preliminary Invalidity Contentions relating to a Claim Chart—U.S. Pat. No. 9,686,906 & Russian Patent No. RU 2 137 337 ("RU 337"), served Jun. 10, 2022, in 15 pages.

Exhibit 100 to Kinze Manufacturing, Inc. and Ag Leader Technology, Inc.'s Preliminary Invalidity Contentions relating to a Claim Chart—U.S. Pat. No. Re. 48,572 & Russian Patent No. RU 2 137 337 ("RU 337"), served Jun. 10, 2022, in 116 pages.

Exhibit 101 to Kinze Manufacturing, Inc. and Ag Leader Technology, Inc.'s Preliminary Invalidity Contentions relating to a Claim Chart—U.S. Pat. No. 9,807,924 & Russian Patent No. RU 2 137 337 ("RU 337"), served Jun. 10, 2022, in 9 pages.

Exhibit 102 to Kinze Manufacturing, Inc. and Ag Leader Technology, Inc.'s Preliminary Invalidity Contentions relating to a Claim Chart—U.S. Pat. No. 9,861,031 & Russian Patent No. RU 2 137 337 ("RU 337"), served Jun. 10, 2022, in 15 pages.

Exhibit 103 to Kinze Manufacturing, Inc. and Ag Leader Technology, Inc.'s Preliminary Invalidity Contentions relating to a Claim Chart—U.S. Pat. No. 10,004,173 & Russian Patent No. 2137337 (RU 337), served Jun. 10, 2022, in 24 pages.

Exhibit 104 to Kinze Manufacturing, Inc. and Ag Leader Technology, Inc.'s Preliminary Invalidity Contentions relating to a Claim Chart—U.S. Pat. No. 8,813,663 & Russian Patent No. RU 2 137 337 ("RU 337"), served Jun. 10, 2022, in 29 pages.

Exhibit 105 to Kinze Manufacturing, Inc. and Ag Leader Technology, Inc.'s Preliminary Invalidity Contentions relating to a Claim Chart—U.S. Pat. No. 9,699,955 & Russian Patent No. RU 2 137 337 ("RU 337"), served Jun. 10, 2022, in 12 pages.

Exhibit 106 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Russian Patent No. RU 2 137 337 ("RU 337"), served Jun. 10, 2022, in 53 pages.

Exhibit 107 to Kinze Manufacturing, Inc. and Ag Leader Technology, Inc.'s Preliminary Invalidity Contentions relating to a Claim Chart—U.S. Pat. No. 9,480,199 & Russian Patent No. RU 2 137 337 ("RU 337"), served Jun. 10, 2022, in 19 pages.

Exhibit 108 to Kinze Manufacturing, Inc. and Ag Leader Technology, Inc.'s Preliminary Invalidity Contentions relating to a Claim Chart—U.S. Pat. No. 8,850,998 & Russian Patent No. RU 2 137 337 ("RU 337"), served Jun. 10, 2022, in 10 pages.

Exhibit 109 to Kinze Manufacturing, Inc. and Ag Leader Technology, Inc.'s Preliminary Invalidity Contentions relating to a Claim Chart—U.S. Pat. No. Re. 48,572 & Soviet Union Inventor's Certificate No. 281928 ("SU 928"), served Jun. 10, 2022, in 114 pages.

Exhibit 110 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 281928 ("SU 928"), served Jun. 10, 2022, in 13 pages.

Exhibit 111 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 281928 ("SU 928"), served Jun. 10, 2022, in 15 pages.

Exhibit 112 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 281928 ("SU 928"), served Jun. 10, 2022, in 23 pages.

Exhibit 113 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 281928 ("SU 928"), served Jun. 10, 2022, in 24 pages.

Exhibit 114 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Soviet Union Inventor's Certificate No. 281928 ("SU 928"), served Jun. 10, 2022, in 86 pages.

Exhibit 115 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 281928 ("SU 928"), served Jun. 10, 2022, in 11 pages.

Exhibit 116 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 281928 ("SU 928"), served Jun. 10, 2022, in 11 pages.

Exhibit 117 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 281928 ("SU 928"), served Jun. 10, 2022, in 18 pages.

Exhibit 118 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 281928 ("SU 928"), served Jun. 10, 2022, in 27 pages.

Exhibit 119 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 445391 ("SU 391"), served Jun. 10, 2022, in 16 pages.

Exhibit 120 to Kinze Manufacturing, Inc. and Ag Leader Technology, Inc.'s Preliminary Invalidity Contentions relating to a Claim Chart—U.S. Pat. No. Re. 48,572 & Soviet Union Inventor's Certificate No. 445391 ("SU 391"), served Jun. 10, 2022, in 110 pages.

Exhibit 121 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 445391 ("SU 391"), served Jun. 10, 2022, in 13 pages.

Exhibit 122 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 445391 ("SU 391"), served Jun. 10, 2022, in 19 pages.

Exhibit 123 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 445391 ("SU 391"), served Jun. 10, 2022, in 24 pages.

Exhibit 124 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 445391 ("SU 391"), served Jun. 10, 2022, in 13 pages.

Exhibit 125 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 445391 ("SU 391"), served Jun. 10, 2022, in 9 pages.

Exhibit 126 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 445391 ("SU 391"), served Jun. 10, 2022, in 9 pages.

Exhibit 127 to Kinze Manufacturing, Inc. and Ag Leader Technology, Inc.'s Preliminary Invalidity Contentions relating to a Claim

(56) References Cited

OTHER PUBLICATIONS

Chart—U.S. Pat. No. 10,729,063 (Claims 1-8 and 10-19) & Soviet Union Inventor's Certificate No. 445391 ("SU 391"), served Jun. 10, 2022, in 85 pages.
Exhibit 128 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 445391 ("SU 391"), served Jun. 10, 2022, in 23 pages.
Exhibit 129 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 264033 ("SU 033"), served Jun. 10, 2022, in 32 pages.
Exhibit 130 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 264033 ("SU 033"), served Jun. 10, 2022, in 25 pages.
Exhibit 131 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Soviet Union Inventor's Certificate No. 264033 ("SU 033"), served Jun. 10, 2022, in 92 pages.
Exhibit 132 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 264033 ("SU 033"), served Jun. 10, 2022, in 19 pages.
Exhibit 133 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 264033 ("SU 033"), served Jun. 10, 2022, in 17 pages.
Exhibit 134 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 264033 ("SU 033"), served Jun. 10, 2022, in 14 pages.
Exhibit 135 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 264033 ("SU 033"), served Jun. 10, 2022, in 40 pages.
Exhibit 136 to Kinze Manufacturing, Inc. and Ag Leader Technology, Inc.'s Preliminary Invalidity Contentions relating to a Claim Chart—U.S. Pat. No. Re. 48,572 & Soviet Union Inventor's Certificate No. 264033 ("SU 033"), served Jun. 10, 2022, in 80 pages.
Exhibit 137 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 264033 ("SU 033"), served Jun. 10, 2022, in 16 pages.
Exhibit 138 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 264033 ("SU 033"), served Jun. 10, 2022, in 22 pages.
Ref. # 581 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Plant-to-Stand Field Performance of Sugar Beet Planters" (Smyrillis 2002) (listing a publication or prior art date of 2002 and a first named inventor /applicant / author of Smyrillis), served Jun. 10, 2022, in 122 pages.
Ref. # 582 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Comparison of Two Planters for Sweet Corn (Fla. State Hort. Soc., 77:152-155 (1964) (listing a publication or prior art date of 1964 and a first named inventor / applicant / author of Guzman), served Jun. 10, 2022, in 4 pages.
Ref. # 583 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Twose Mounted Seed Drill Brochure (listing a publication or prior art date of pre 2008 and a first named inventor / applicant / author of Twose), served Jun. 10, 2022, in 4 pages.

Ref. # 584 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 33 Vegetable Planter—Operators Manual (OMA25188 E3) (listing a publication or prior art date of pre 2008 and a first named inventor / applicant / author of Deere), served Jun. 10, 2022, in 20 pages.
Ref. # 585 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 33 Vegetable Planter—Parts Catalog (PC-1045) (listing a publication or prior art date of pre 2008 and a first named inventor / applicant /author of Deere), served Jun. 10, 2022, in 10 pages.
Ref. # 586 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Here's the greatest news in Corn Planter History—John Deere's New Plateless Corn Planters" (B822 68-6 Litho in U.S.A.) (listing a publication or prior art date of pre 2008 and a first named inventor / applicant / author of Deere), served Jun. 10, 2022, in 8 pages.
Ref. # 587 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "The Planter With the Magic Fingers," The Farm Quarterly/Fall 1968 (reprint) (B-848-69-1 Litho in U.S.A.) ("The Farm Quarterly—Fall 1968") (listing a publication or prior art date of pre 2008 and a first named inventor / applicant /author of Deere), served Jun. 10, 2022, in 8 pages.
Ref. # 588 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 1240 Plateless Planter—Predelivery Instructions (PDI-B25436) (listing a publication or prior art date of pre 2008 and a first named inventor /applicant / author of Deere), served Jun. 10, 2022, in 24 pages.
Ref. # 589 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 1240 Plateless Planter—Parts Catalog (PC-1143) (listing a publication or prior art date of pre 2008 and a first named inventor / applicant /author of Deere), served Jun. 10, 2022, in 41 pages.
Ref. # 590 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: New 80 Plateless Unit Planters (A-16T-1-71-1 Litho in U.S.A.) (listing a publication or prior art date of pre 2008 and a first named inventor /applicant / author of Deere), served Jun. 10, 2022, in 6 pages.
Ref. # 591 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: International Harvester—Sales Know-how Bulletin (No. 61-3 (listing a publication or prior art date of 1961and a first named inventor / applicant /author of Int'l Harvester), served Jun. 10, 2022, in 4 pages.
Ref. # 592 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "The Operation Care and Repair of Farm Machinery" (listing a publication or prior art date of 1957 and a first named inventor / applicant / author of Deere), served Jun. 10, 2022, in 31 pages.
Ref. # 593 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Farm Machinery and Equipment," (5th ed., McGraw-Hill) (listing a publication or prior art date of 1965 and a first named inventor / applicant / author of Smith), served Jun. 10, 2022, in 87 pages.

(56) References Cited

OTHER PUBLICATIONS

Ref. # 594 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Principles of Farm Machinery," (2nd ed., AVI Publishing Co., Inc.) (listing a publication or prior art date of 1972 and a first named inventor /applicant / author of Kepner), served Jun. 10, 2022, in 104 pages.

Ref. # 595 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Machines For Power Farming," (3rd ed., John Wiley and Sons) (listing a publication or prior art date of 1977 and a first named inventor / applicant /author of Stone), served Jun. 10, 2022, in 69 pages.

Ref. # 596 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Farm Power and Machinery Management," (6th ed., Iowa State University Press) (listing a publication or prior art date of 1973 and a first named inventor / applicant / author of Hunt), served Jun. 10, 2022, in 16 pages.

Ref. # 597 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Dealer Service Shop Copy—John Deere Operator's Manual—1250 OM-B25528—Planter Issue FO (listing a publication or prior art date of pre 2008 and a first named inventor / applicant / author of Deere), served Jun. 10, 2022, in 92 pages.

Ref. # 598 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Fundamentals of Machine Operation Planting (1981) (COLOR) (listing a publication or prior art date of 1981 and a first named inventor /applicant / author of Deere), served Jun. 10, 2022, in 194 pages.

Defendants', Kinze Manufacturing, Inc. and Ag Leader Technology, Inc.'s, Motion to Amend Their Counterclaims to Include (1) Inequitable Conduct Claims and (2) a Claim of Abuse of Process (Redacted), filed Apr. 29, 2022 (Dkt. No. 190), in 15 pages.

Exhibit A to Defendants', Kinze Manufacturing, Inc. and Ag Leader Technology, Inc.'s, Motion to Amend Their Counterclaims to Include (1) Inequitable Conduct Claims and (2) a Claim of Abuse of Process: Kinze Manufacturing, Inc. and Ag Leader Technology, Inc.'s Counterclaims, Answer and Affirmative Defenses to Plaintiffs' Second Amended and Supplemental Complaint (Redacted), filed Apr. 29, 2022 (Dkt. No. 190-1), in 343 pages.

Exhibit B to Defendants', Kinze Manufacturing, Inc. and Ag Leader Technology, Inc.'s, Motion to Amend Their Counterclaims to Include (1) Inequitable Conduct Claims and (2) a Claim of Abuse of Process: Kinze Manufacturing, Inc. and Ag Leader Technology, Inc.'s Alternative Counterclaims, Answer and Affirmative Defenses to Plaintiffs' Second Amended and Supplemental Complaint (Redacted), filed Apr. 29, 2022 (Dkt. No. 190-2), in 348 pages.

Defendants', Kinze Manufacturing, Inc. and Ag Leader Technology, Inc.'s, Combined (1) Resistance to Motion to Dismiss Counterclaims for Inequitable Conduct and (2) Reply in Support of Motion for Leave to File a Counterclaim for Abuse of Process (Redacted), filed Jul. 8, 2022 (Dkt. No. 201), in 43 pages.

Defendants', Kinze Manufacturing, Inc. and Ag Leader Technology, Inc.'s, Sur-Reply on Motion to Dismiss Counterclaims for Inequitable Conduct (Redacted), filed Jul. 29, 2022 (Dkt. No. 211), in 10 pages.

Defendants', Kinze Manufacturing, Inc. and Ag Leader Technology, Inc.'s, Motion to Amend Counterclaim for Inequitable Conduct (Redacted), filed Oct. 21, 2022 (Dkt. No. 226), in 5 pages.

Defendants', Kinze Manufacturing, Inc. and Ag Leader Technology, Inc.'s, Second Amended Counterclaims, Answer, and Affirmative Defenses to Plaintiffs' Second Amended and Supplemental Complaint (Redacted), filed Oct. 21, 2022 (Dkt. No. 226-1), in 340 pages.

Defendants', Kinze Manufacturing, Inc. and Ag Leader Technology, Inc.'s, Brief in Support of Their Motion to Amend Their Inequitable Conduct Counterclaim (Redacted), filed Oct. 21, 2022 (Dkt. No. 226-3), in 11 pages.

Defendants', Kinze Manufacturing, Inc. and Ag Leader Technology, Inc.'s, Reply in Support of Motion to Amend Their Inequitable Conduct Counterclaim (Redacted), filed Dec. 5, 2022 (Dkt. No. 242), in 16 pages.

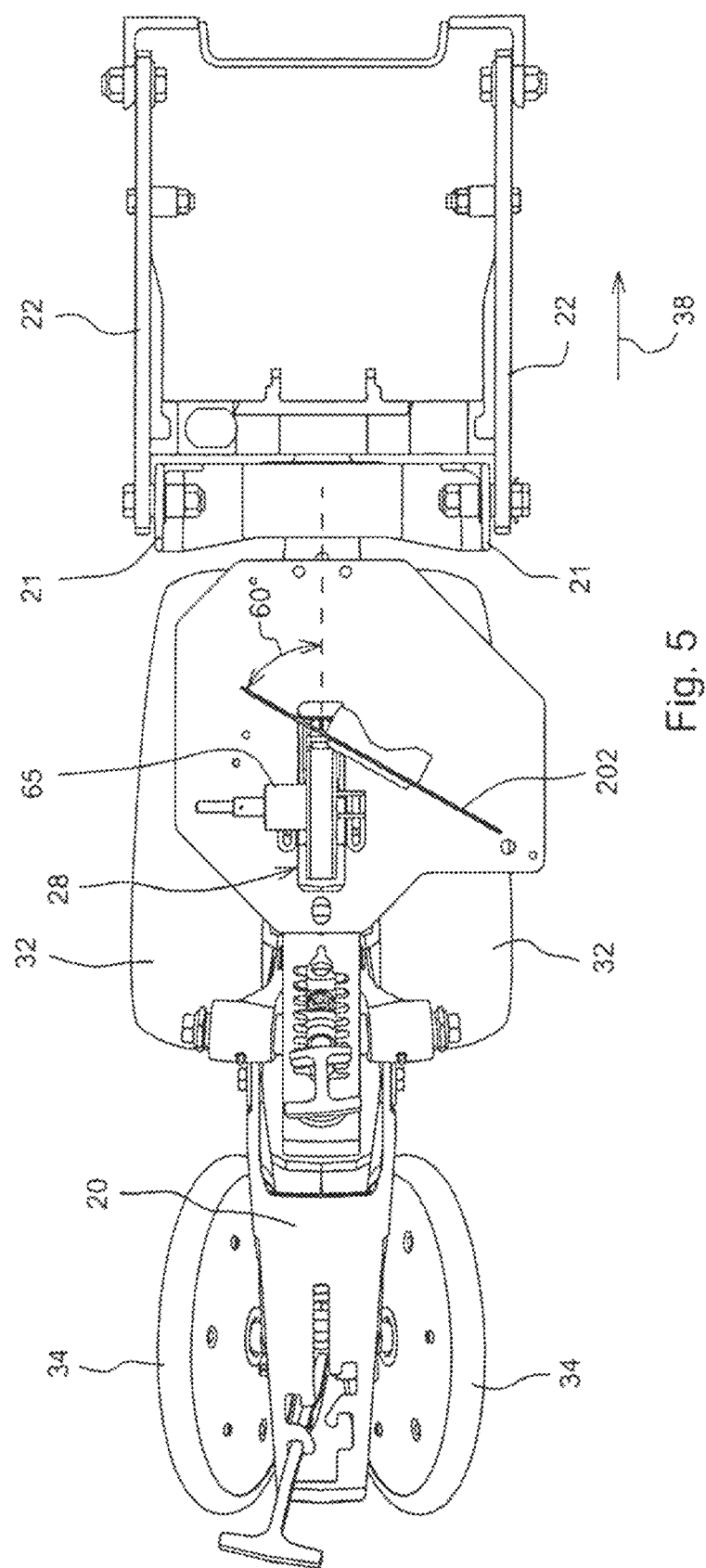

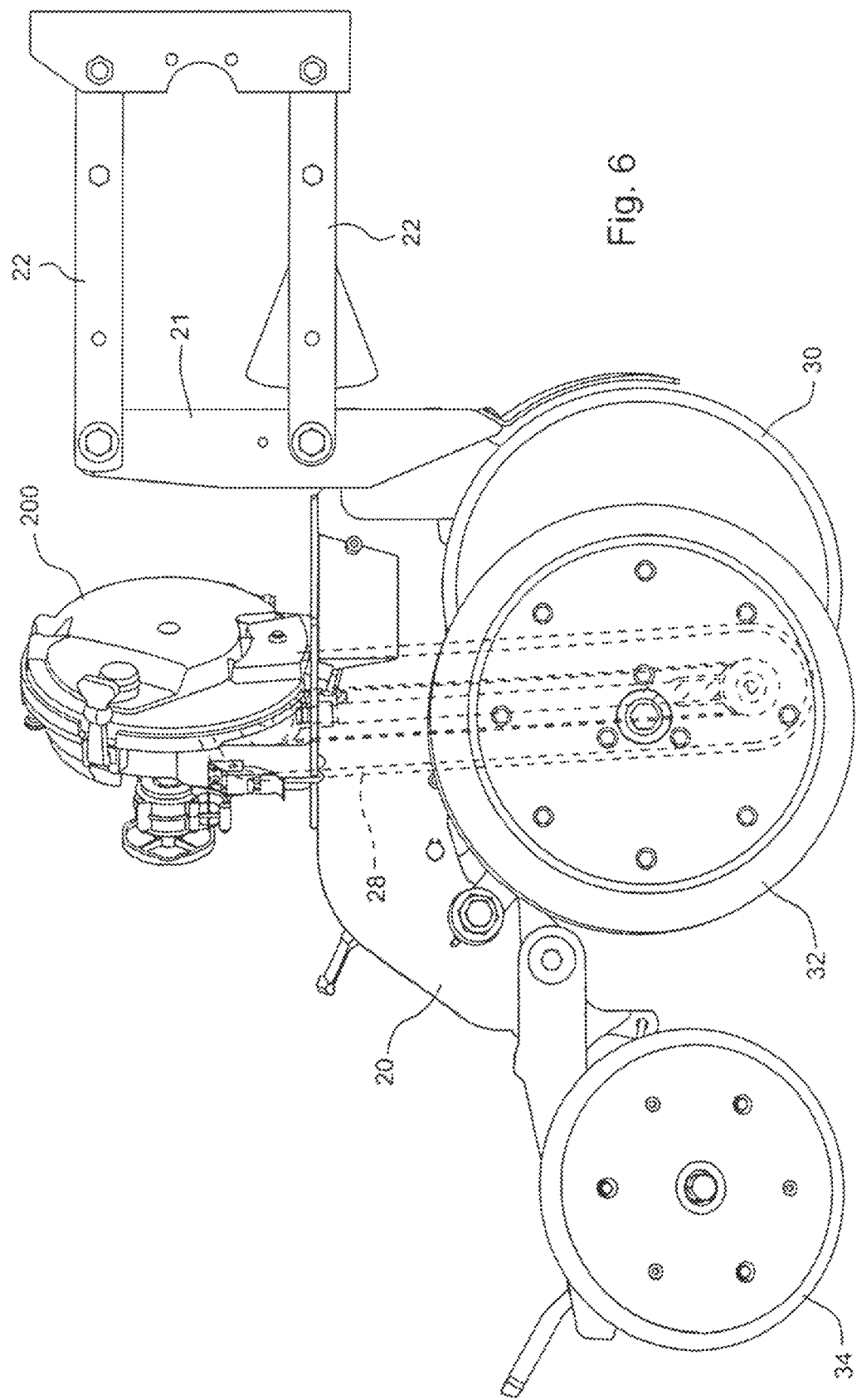

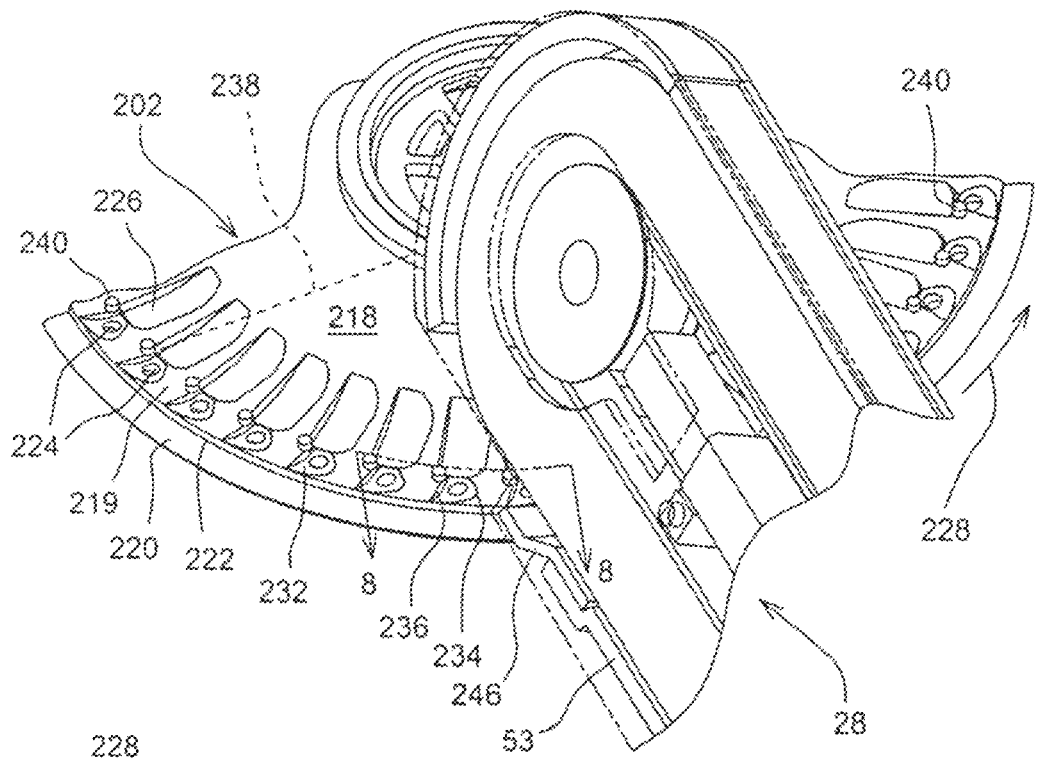
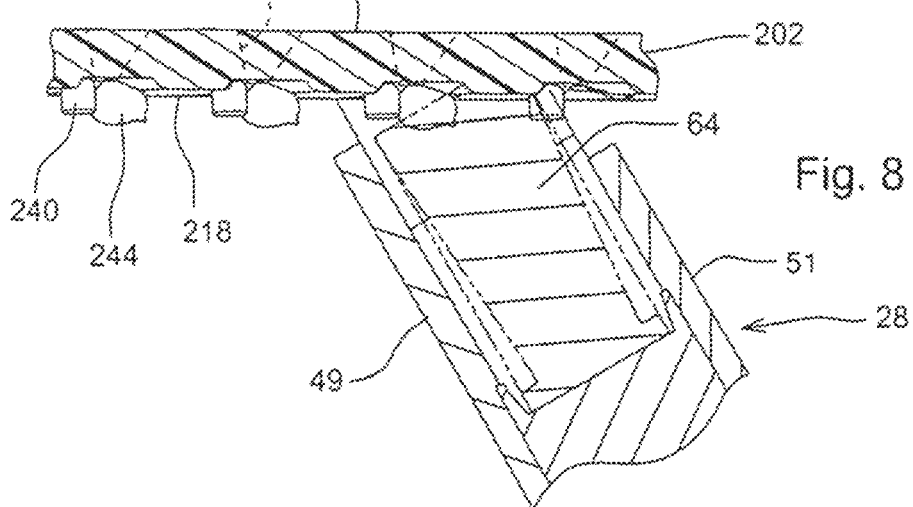

SEEDING MACHINE WITH SEED DELIVERY SYSTEM

INCORPORATION BY REFERENCE TO ANY PRIORITY APPLICATIONS

This application is a continuation of U.S. patent application Ser. No. 17/033,224, filed Sep. 25, 2020, which is a continuation of U.S. patent application Ser. No. 15/799,279, filed Oct. 31, 2017, now U.S. Pat. No. 10,806,070, which is a continuation of U.S. patent application Ser. No. 14/616, 877, filed Feb. 9, 2015, now U.S. Pat. No. 9,861,031, which is a continuation of U.S. patent application Ser. No. 14/504, 801, filed Oct. 2, 2014, now U.S. Pat. No. 9,686,905, which is a continuation of U.S. patent application Ser. No. 12/364, 010, filed Feb. 2, 2009, now U.S. Pat. No. 8,850,995. All of the above applications are incorporated by reference herein and are to be considered a part of this specification. Any and all applications for which a foreign or domestic priority claim is identified in the Application Data Sheet as filed with the present application are hereby incorporated by reference under 37 CFR 1.57.

FIELD OF THE INVENTION

The invention relates to a seeding machine having a seed metering system and a seed delivery system for delivering seed from the meter to the ground.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like or powered by electric or hydraulic motors. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the planter frame or by the row unit. Different types of seed metering systems may be used, such as seed plates, finger plates, seed disks, etc. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive air pressure differential may be used in conjunction with the seed disk to assist in movement of the seeds into the seed cell. The seeds are singulated and discharged at a predetermined rate to the seed placement or delivery system.

The most common seed delivery system may be categorized as a gravity drop system. In the case of the gravity drop system, a seed tube has an inlet end which is positioned below the seed metering system. The singulated seeds from the seed metering system merely drop into the seed tube and fall via gravitational force from a discharge end thereof into the seed trench. The seed tube may have a rearward curvature to reduce bouncing of the seed as it strikes the bottom of the seed trench and to impart a horizontal velocity to the seed in order to reduce the relative velocity between the seed and the ground. Undesirable variation in resultant in-ground seed spacing can be attributed to differences in how individual seeds exit the metering system and drop through the seed tube. The spacing variation is exacerbated by higher travel speeds through the field which amplifies the dynamic field conditions. Further seed spacing variations are caused by the inherent relative velocity difference between the seeds and the soil as the seeding machine travels through a field. This relative velocity difference causes individual seeds to bounce and tumble in somewhat random patterns as each seed comes to rest in the trench.

Various attempts have been made to reduce the variation in seed spacing resulting from the gravity drop. U.S. Pat. No. 6,681,706 shows two approaches. One approach uses a belt with flights to transport the seeds from the meter to the ground while the other approach uses two belts to grip the seed and transport it from the meter to the ground. While these approaches control the seed path and reduce variability due to dynamic events, neither approach seeks to deliver the seed with as small as possible horizontal velocity difference relative to the ground. U.S. Pat. Nos. 6,651,57, 7,185,596 and 7,343,868 show a seed delivery system using a brush wheel near the ground to regulate the horizontal velocity and direction of the seed as it exits the seeding machine. However, there is still a gravity drop between the seed meter and the brush wheel which produces variation in seed spacing.

SUMMARY OF THE INVENTION

The present invention provides a seed delivery system that removes the seed from the seed meter by capturing the seed. The delivery system then moves the seed down to a lower discharge point and accelerates the seed rearward to a horizontal velocity approximately equal to the forward travel speed of the seeding machine such that the seed, when discharged, has a low or zero horizontal velocity relative to the ground. Rolling of the seed in the trench is reduced as a result of the near zero horizontal velocity relative to the ground. Furthermore, as the seed experiences a controlled descent from the point at which it is removed from the meter to a point very near the bottom of the trench, the system becomes a nearly impervious to the field dynamics experienced by the row unit. The combination of controlled descent and discharge at a substantially zero horizontal speed relative to the ground reduces seed spacing variability.

BRIEF DESCRIPTION OF THE DRAWINGS

FIG. 5 is a top view similar to FIG. 4 illustrating the delivery system with the meter housing removed;

FIG. 6 is a side view of the row unit of FIG. 4;

FIG. 7 is a perspective view of the seed disk used in the seed meter shown in FIGS. 4-6;

FIG. 8 is a sectional view along the line 8-8 of FIG. 7 illustrating the orientation of the seed disk and brush or the seed delivery system of the present invention;

DESCRIPTION OF THE PREFERRED EMBODIMENT

Figure 1:
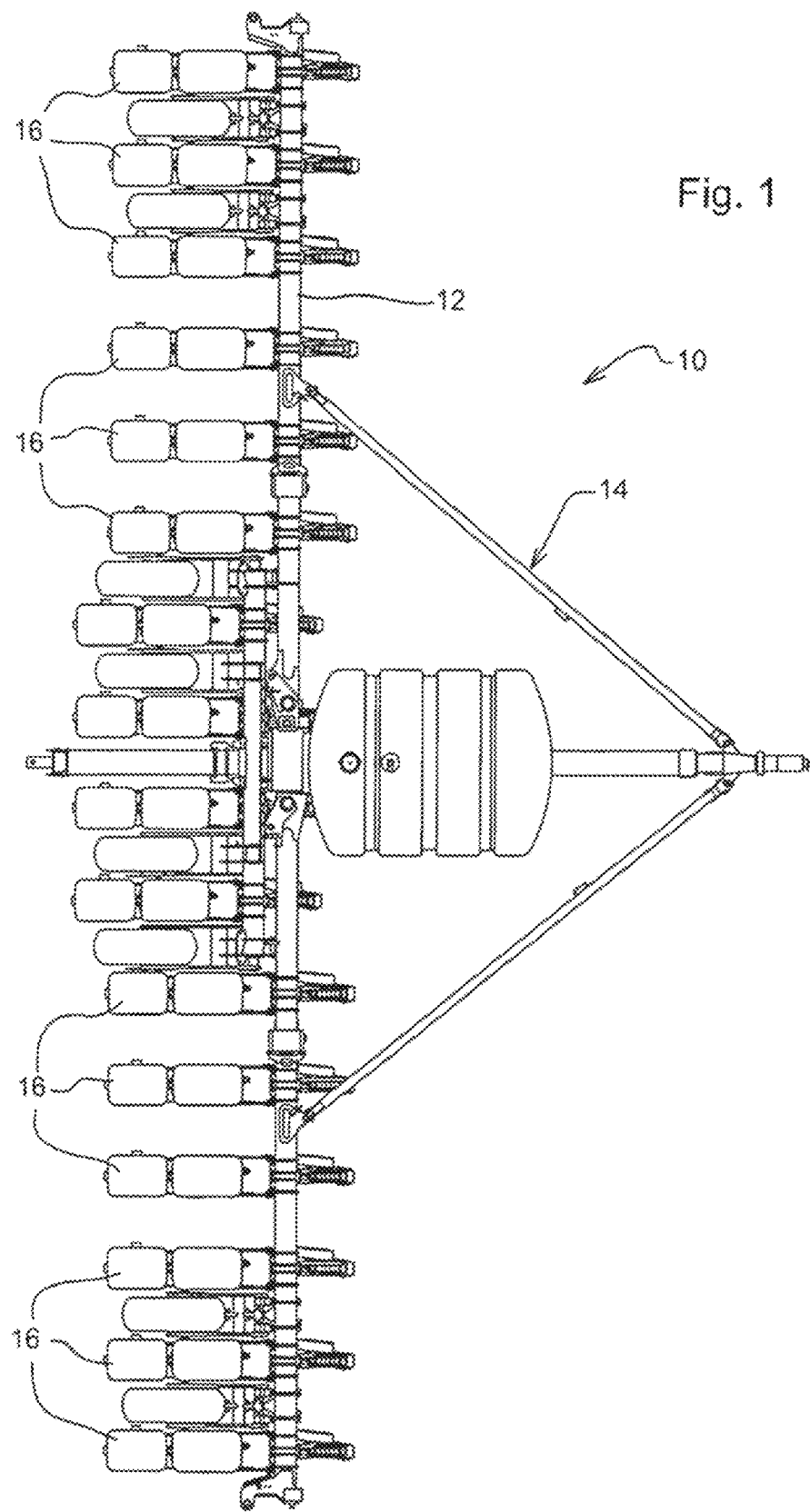
FIG. 1 is a plan view of a planter having the seed delivery system of the present invention.
Figure 2:
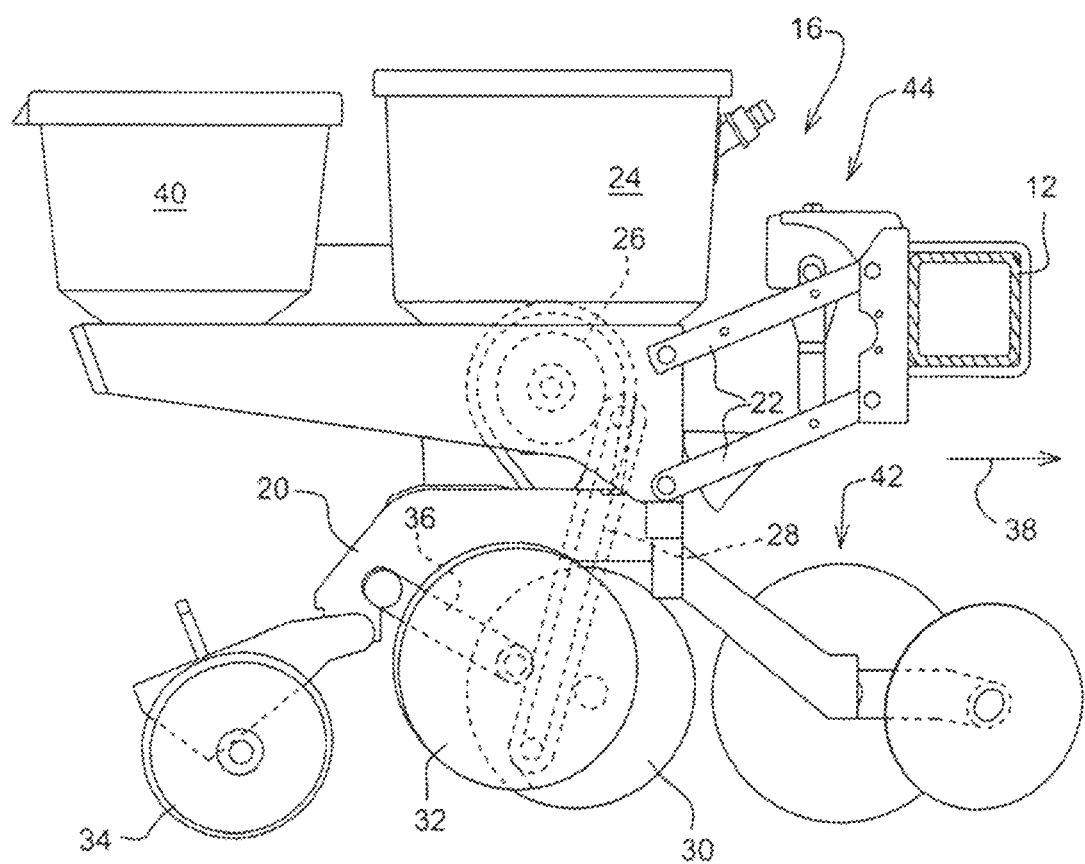
FIG. 2 is a side view of a row unit of the planter of FIG. 1.

With reference to FIG. 1 an example planter or seeding machine 10 is shown containing the seed delivery system of the present invention. Planter 10 includes a tool bar 12 as part of a planter frame 14. Mounted to the tool bar are multiple planting row units 16. Row units 16 are typically identical for a given planter but there may be differences. A row unit 16 is shown in greater detail in FIG. 2. The row unit 16 is provided with a central frame member 20 having a pair of upwardly extending arms 21 (FIG. 4) at the forward end thereof. The arms 21 connect to a parallelogram linkage 22 for mounting the row unit 16 to the tool bar 12 for up and down relative movement between the unit 16 and toolbar 12 in a known manner. Seed is stored in seed hopper 24 and provided to a seed meter 26. Seed meter 26 is of the type that uses a vacuum disk as are well known to meter the seed. Other types of meters can be used as well. From the seed meter 26 the seed is carried by a delivery system 28 into a planting furrow, or trench, formed in the soil by furrow openers 30. Gauge wheels 32 control the depth of the furrow. Closing wheels 34 close the furrow over the seed. The gauge wheels 32 are mounted to the frame member 20 by arms 36. The toolbar and row unit are designed to be move over the ground in a forward working direction identified by the arrow 38.

The row unit 16 further includes a chemical hopper 40, a row cleaner attachment 42 and a down force generator 44. The row unit 16 is shown as an example of the environment in which the delivery system of the present invention is used. The present invention can be used in any of a variety of planting machine types such as, but not limited to, row crop planters, grain drills, air seeders, etc.

Figure 3:
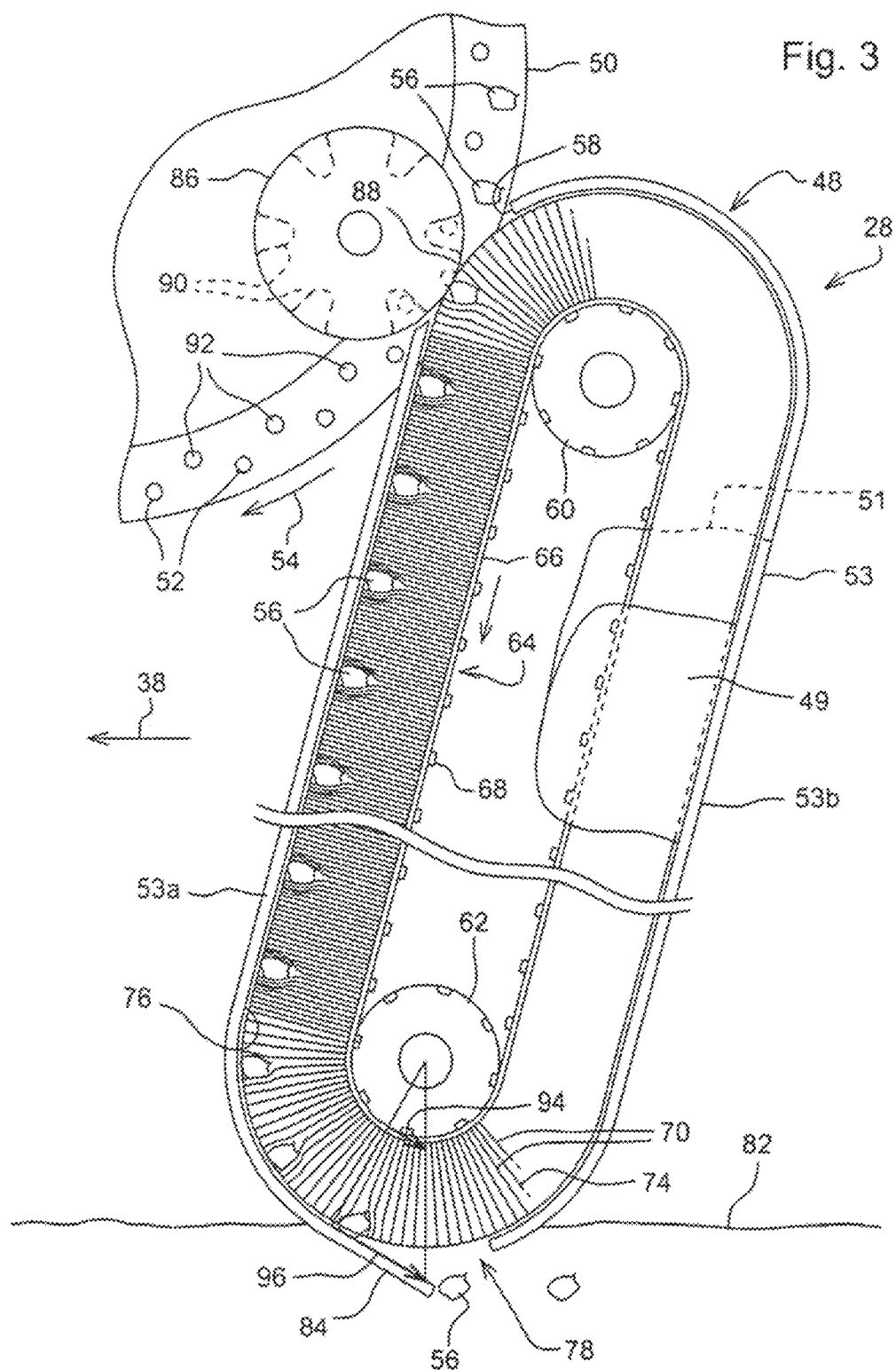
FIG. 3 is an enlarged side view of the seed delivery system of the present invention.

With reference to FIG. 3, the seed delivery system 28 is shown in greater detail. Delivery system 28 includes a housing 48 positioned adjacent the seed disk 50 of the seed meter. The seed disk 50 is a generally flat disk with a plurality of apertures 52 adjacent the periphery of the disk. Seeds 56 are collected on the apertures from a seed pool and adhere to the disk by air pressure differential on the opposite sides of the disk 50 in a known manner. The disk may have a flat surface at the apertures 52 or have seed cells surrounding the apertures 52. The disk rotates clockwise as viewed in FIG. 3 as shown by the arrow 54. At the top of FIG. 3, seeds 56 are shown adhered to the disk.

The seed delivery system housing 48 has spaced apart front and rear walls 49 and 51 and a side wall 53 therebetween. An upper opening 58 in the housing side wall 53 admits the seed from the metering disk 50 into the housing. A pair of pulleys 60, 62 are mounted inside the housing 48. The pulleys support a belt 64 for rotation within the housing.

One of the pulleys is a drive pulley while the other is an idler pulley. The belt has a base member 66 to engage the pulleys and elongated bristles 70 extending therefrom, The bristles are joined to the base member at proximal, or radially inner, ends of the bristles. Distal, or radially outer, ends 74 of the bristles touch, or are close to touching, the inner surface 76 of the housing side wall 53. A lower housing opening 78 is formed in the side wall 53 and is positioned as close to the bottom 80 of the seed trench as possible. As shown, the lower opening 78 is near or below the soil surface 82 adjacent the trench. The housing side wall forms an exit ramp 84 at the lower opening 78.

Returning attention to the upper portion of FIG. 3, a loading wheel 86 is provided adjacent the upper opening 58. The loading wheel is positioned on the opposite side of the seeds 56 from the brush 64 such that the path of the seeds on the disk brings the seeds into a nip 88 formed between the loading wheel and the distal ends 74 of the bristles 70. At the location of the nip 88, the air pressure differential across the seed disk 50 is terminated, freeing the seed from the apertures 52 in the disk. The bottom surface of the loading wheel, facing the seed disk 50, has recesses 90 formed therein. The recesses 90 receive seed agitators 92 projecting from the seed disk 50. The moving agitators, by engagement with the recesses in the loading wheel, drive the loading wheel in a clockwise rotation.

In operation, the belt 64 is rotated in a counterclockwise direction. As the belt curves around the pulleys, the bristles will naturally open, that is, separate from one another as the distal ends of the bristles travel a larger circumferential distance around the pulleys than the inner ends of the bristle at the belt base member. This produces two beneficial effects as described below. The seeds are transferred from the seed meter to the delivery system as the seeds are brought by the disk into the nip 88. There the seeds are pinched off the seed disk between the loading wheel and the bristles 70 to remove the seed from the seed disk and seed meter. The seeds are captured or entrapped in the bristles by insertion of the seed into the bristles in a radial direction, that is from the ends of the bristles in a direction parallel to the bristle length. This occurs just as the belt path around the pulley 60 ends, when the bristle ends are closing back together upon themselves, allowing the bristles to close upon, and capture the seeds therein. As the belt continues to move, the bristles move or convey the seeds downward to the housing lower opening. The side wall 53 of the housing cooperates with the bristles 70 to hold the seed in the brush bristles as the seed is moved to the lower opening.

The lower opening 78 and the ramp 84 are positioned along the curved belt path around the pulley 62. The bristle distal ends thus cause the linear speed of the seeds to accelerate relative to the speed of the belt base member 66 and the housing as shown by the two arrows 94 and 96. The seeds are then propelled by the bristles over the ramp 84 and discharged through the lower opening 78 into the seed trench. The angle of the ramp 84 can be selected to produce the desired relationship between the seed vertical and horizontal speeds at discharge. The forward travel direction of the row unit is to the left in FIG. 3 as shown by the arrow 38. At the discharge, the horizontal speed of the seed relative to the ground is minimized to reduce roll of the seed in the trench.

The belt shown in FIG. 3 has relatively long bristles. As a result of the long bristles and the seed loading point being at the end of the curved path of the brush around the pulley 60 results in the seeds being loaded into the belt while the bristles have slowed down in speed. The bristle speed at loading is thus slower than the bristle speed at the discharge opening as the belt travels around the pulley 62. This allows the seed to be loaded into the belt at a relatively lower speed while the seed is discharged at the lower end at a desired higher speed. As described above, it is preferred that the horizontal velocity of the seed at the discharge be equal to the forward travel speed of the planter but in the rearward direction such that the horizontal velocity of the seed relative to the ground is close to or equal to zero. The long bristles can be used to increase the speed of the seed as it travels around the pulley. However, a short bristle brush can be used as well. With a short bristle brush, there will be little acceleration in the speed of the seed as the seed travels around the pulleys. The belt will have to be driven at a speed to produce the desired horizontal velocity of the seed at the discharge. Even with a short bristle brush, the seed is still accelerated in the horizontal direction. As the belt travels around the pulley, the direction of travel of the seed changes from the predominantly vertical direction, when the seed is moved downward from the seed meter, to a predominantly horizontal direction at the discharge. This produces an acceleration of the seed velocity in the horizontal direction.

With the delivery system 28, the seed is captured by the delivery system to remove the seed from the seed meter. The seed is then moved by the delivery system to the seed discharge point where the seed is accelerated in a rearward horizontal direction relative to the housing. From the seed meter to the discharge, the seed travel is controlled by the delivery system, thus maintaining the seed spacing relative to one another.

In the embodiment shown in FIG. 3, the seed disk and the front and rear walls 49, 51 of the housing 48 lie in planes that are generally parallel one another. As shown, the plane of the delivery system is generally parallel to the direction of travel of the row unit. Other relationships between the seed meter and delivery system are shown and described below.

As shown in FIG. 3, the side wall 53 is divided by the upper and lower openings 58, 78 into two segments, 53a and 53b. Segment 53a is between the upper and lower openings in the direction of belt travel while the segment 53b is between the lower and upper openings in the direction of belt travel. It is the gaps in the side wall 53 that form the upper and lower openings. It should be understood, however, that the delivery system will function without the segment 53b of the side wall. It is only the segment 53a that functions together with the belt bristles to deliver the seed from the meter to the seed trench. Thus, the term "upper opening" shall be construed to mean a open area before the side wall segment 53a in the direction of belt travel and the term "lower opening" shall mean an open area after the side wall segment 53a in the direction of belt travel.

Figure 4:
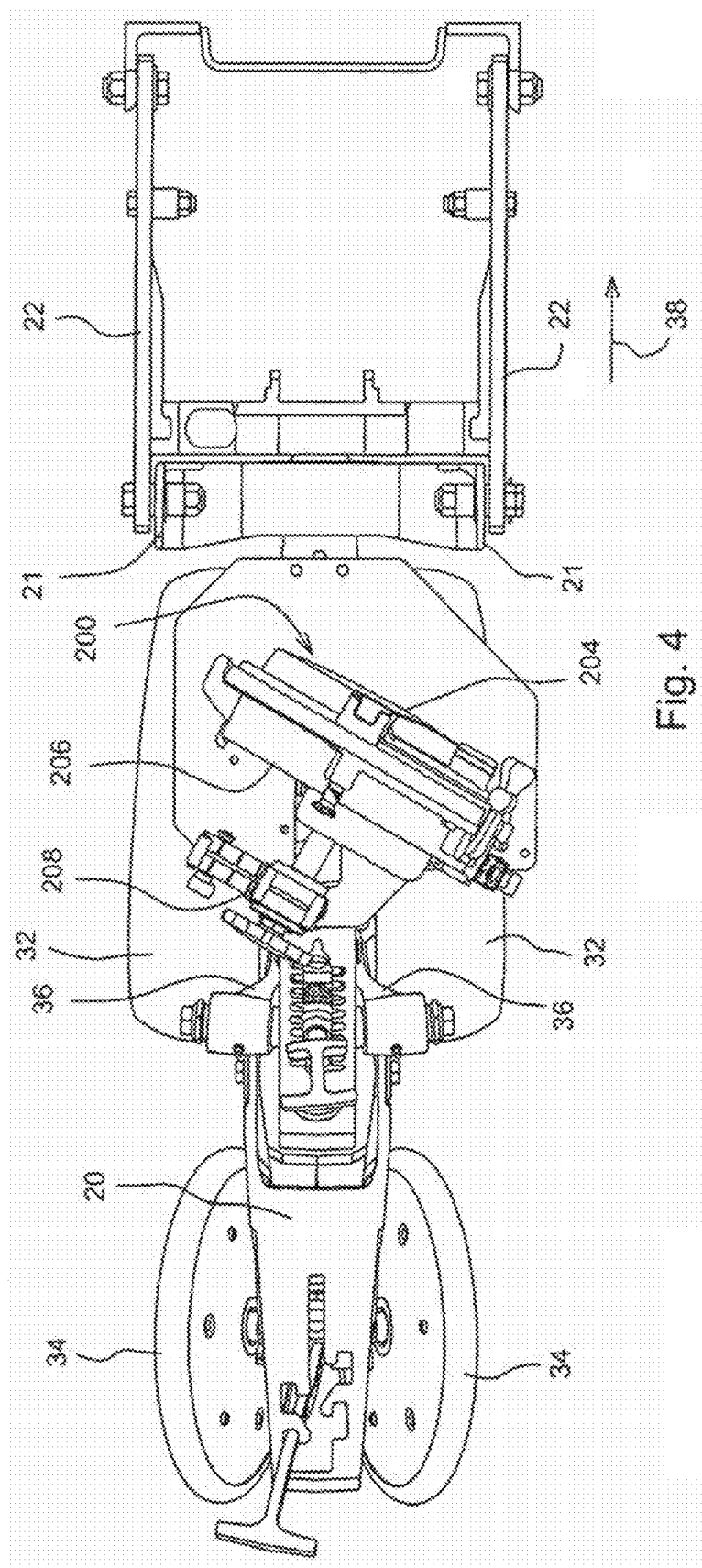
FIG. 4 is a top view of a planter row unit showing the metering system orientation in one alternative arrangement of the metering system and delivery system of the present invention.
Figure 9:
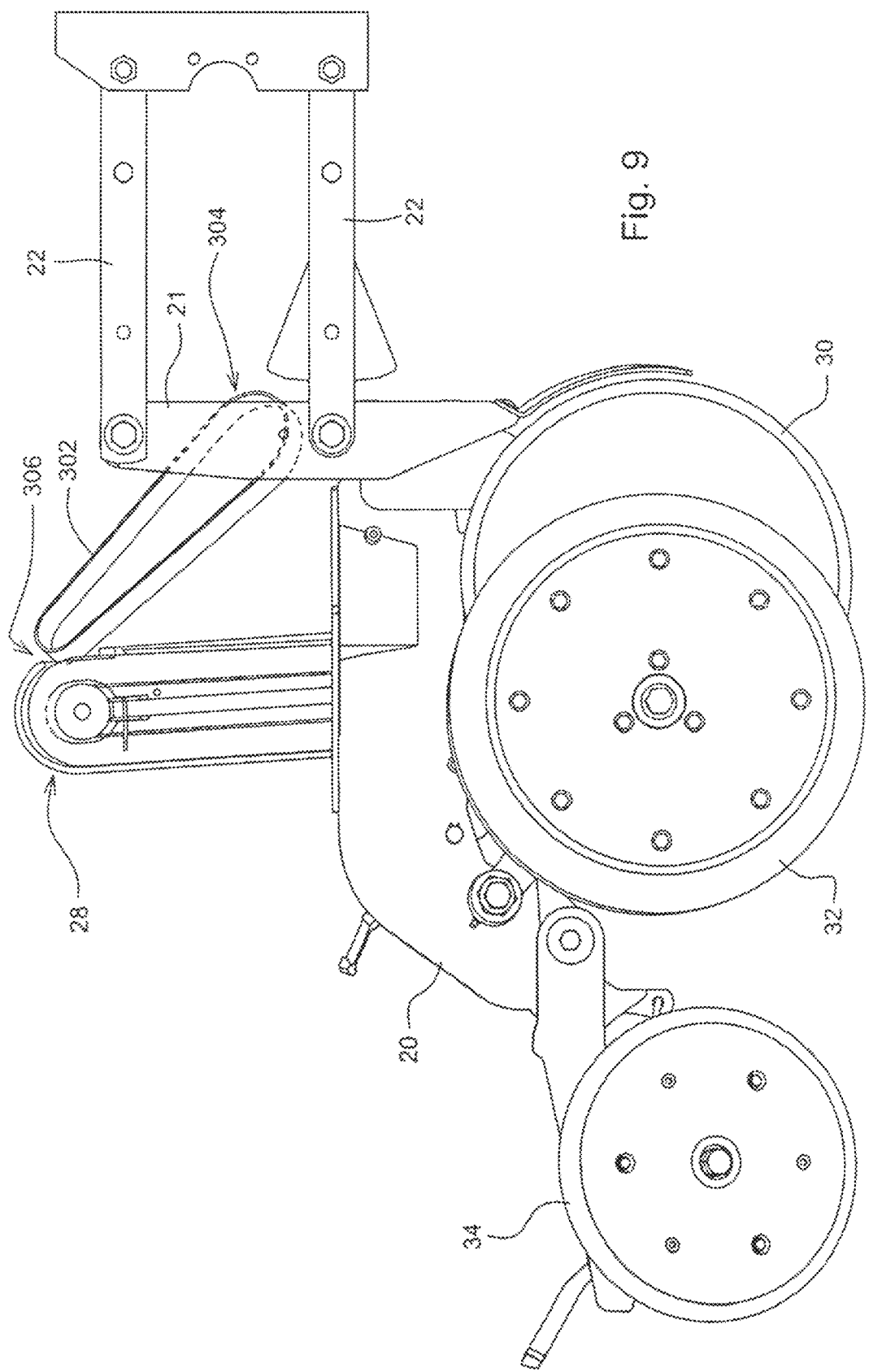
FIG. 9 is a side view of a row unit showing the orientation of the delivery system of the present invention and a vacuum belt seed meter.

With reference to FIGS. 4-7, the delivery system 28 is shown in combination with the seed meter and row unit structure in an alternative arrangement of the seed meter and delivery system 28. The seed meter 200 is shown mounted to the row unit with the seed disk 202 in a vertical orientation but at an angle to the forward travel direction shown by the arrow 38. FIG. 4 shows of the seed meter orientation in the row unit without the delivery system 28. The seed meter includes a housing having two halves 204 and 206 releasable joined together in a known manner. The seed meter is driven through a transmission 208 coupled to a drive cable, not shown.

In FIG. 5 only the seed disk 202 of the meter is shown with the seed delivery system 28. As previously mentioned, the seed disk 202 is in a vertical orientation but it does not lie in a plane parallel to the forward direction 38. Instead, the meter is oriented such that the disk is at a 60° angle relative to the forward direction when viewed from above. The seed of delivery system 28 is generally identical to that shown in FIG. 3 and is driven by a motor 65. The delivery system, including of the brush belt 64, is generally vertical and aligned with the fore and aft direction of the planter such that the angle between the brush and the seed disk is approximately 60°. The angle between the delivery system and a seed disk produces a partial "cross feed" of the seed into the brush. That is, the seed is fed into the brush at an angle to the lengthwise direction of the bristles. This is in contrast to FIG. 3 where the seed enters the brush in a direction substantially parallel to the lengthwise direction of the brush bristles. If the brush and seed disk were oriented at 90° to one another, a total cross feed would be produced with seed entering the brush perpendicular to the bristles.

The seed disk 202 is shown enlarged in FIGS. 7 and 8. The disk 202 has opposite sides, a vacuum side 216 and seed side 218. The seed side 218 has a surface 219 near the periphery that defines a reference plane. The reference plane will be used to describe the features of the disk near the disk periphery. An outer peripheral lip 220 is recessed from the reference plane. The peripheral lip 220 creates a radially outward edge face 222. A circumferential row of spaced apart apertures 224 is arranged around a circular path radially inward of the edge face 222. Each aperture extends through the disk between the vacuum side 216 and the seed side 218. Radially inward of each aperture 224, there is a radially elongated recess 226. The recess 226 is recessed axially into the disk from the reference plane. In operation, the disk rotates in a counterclockwise direction as indicated by the arrow 228. During rotation, the recesses 226 agitate the seed in the seed pool.

Surrounding each aperture 224 is a tapered recess, or shallow seed cell, 232 that extends axially into the disk from the reference plane. Seed cell 232 begins at a leading edge 234 in the direction of rotation of the disk and is progressively deeper into the seed side 218 to a trailing edge formed by an axially projecting wall 236. The tapered recess or seed cell 232 reduces the vacuum needed to pick-up and retain seed in the apertures 224. The seed cell also enables the seed to sit lower relative to the seed side 218 of the disk, allowing the seed to be retained while the seed singulator removes doubles or multiples of seed from the apertures 224. In addition, the recess wall 236 agitates seed in the seed pool, further aiding in seed pick-up. The wall 236 extends lengthwise in a predominately radial direction as shown by the dashed line 238. The walls 236, while predominately radial, are inclined to the radial direction such that the inner end of the wall 236 is leading the outer end of the wall in the direction of rotation. Immediately following each wall 236, as the disk rotates, is a projection, or upstanding peg, 240 extending axially from the disk seed side. The pegs engage seed in the seed pool for agitation to aide in seed pick-up. The pegs 240 are located slightly radially inward of the circular path of apertures 224 to avoid interference with the seed singulator.

With reference to FIG. 8, the disk 202 is shown in operation and in position relative to the belt 64 in the delivery system 28. As seeds 244 are carried by the disk 202 into the bristles of the brush 64, the wall 236 and the pegs 240 act to push the seed 244 into the bristles of the brush 64 and assist in keeping the seed from being knocked off the disk upon the seed's initial contact with the brush bristles. Once the seed is inserted into the brush bristles, the vacuum from the opposite side of the disk is cut-off, allowing the brush to sweep the seed off the disk in a predominately radial direction relative to the disk. An insert 246 overlies the lip 220 at the point of seed release to hold the seed in the brush bristles in the transition between the disk and the side wall 53 (FIG. 3) of the delivery system housing. The disk 202 is inclined to the length of the brush bristles at approximately a 60 degree angle. This produces the partial cross-feed of the seed into the brush bristles.

The vaccum belt meter is fully described in U.S. Pat. Appl. Ser. No. 12/636,968, filed Feb. 2, 2009, now U.S. Pat. No. 7,918,168, incorporated herein by reference. The belt 302 picks-up seed at a pick-up region 304 at a lower, front location of the belt's path and transports it to the delivery system at an release region 306 at an upper, rear location of the belt's path. In this arrangement of the belt meter and the brush delivery system, the delivery system is again partially cross fed with seeds from the meter.

Figure 10:
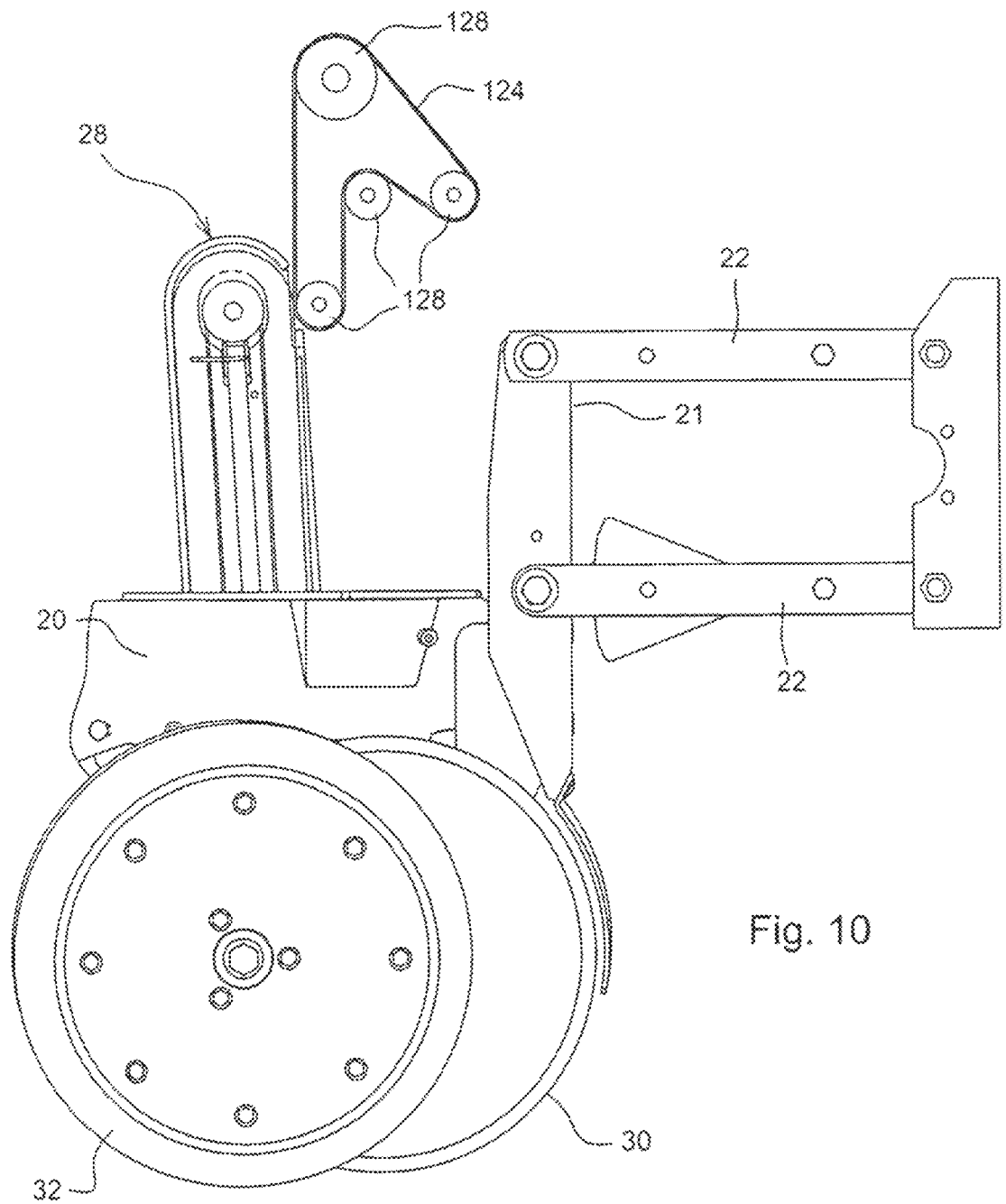
FIG. 10 is a side view of another orientation of the seed delivery system of the invention with a vacuum belt seed meter.

Another arrangement of the delivery system together with a vacuum meter belt is shown in FIG. 10. The delivery system 28 is in-line with the belt meter 124. This allows the distal ends of the brush bristles to sweep over the surface of the metering belt 126 to capture the seed therefrom. The meter belt 126 is wrapped around pulleys 128. The metering belt 124 is similar and functions as the belt 302 mentioned above.

Figure 11:
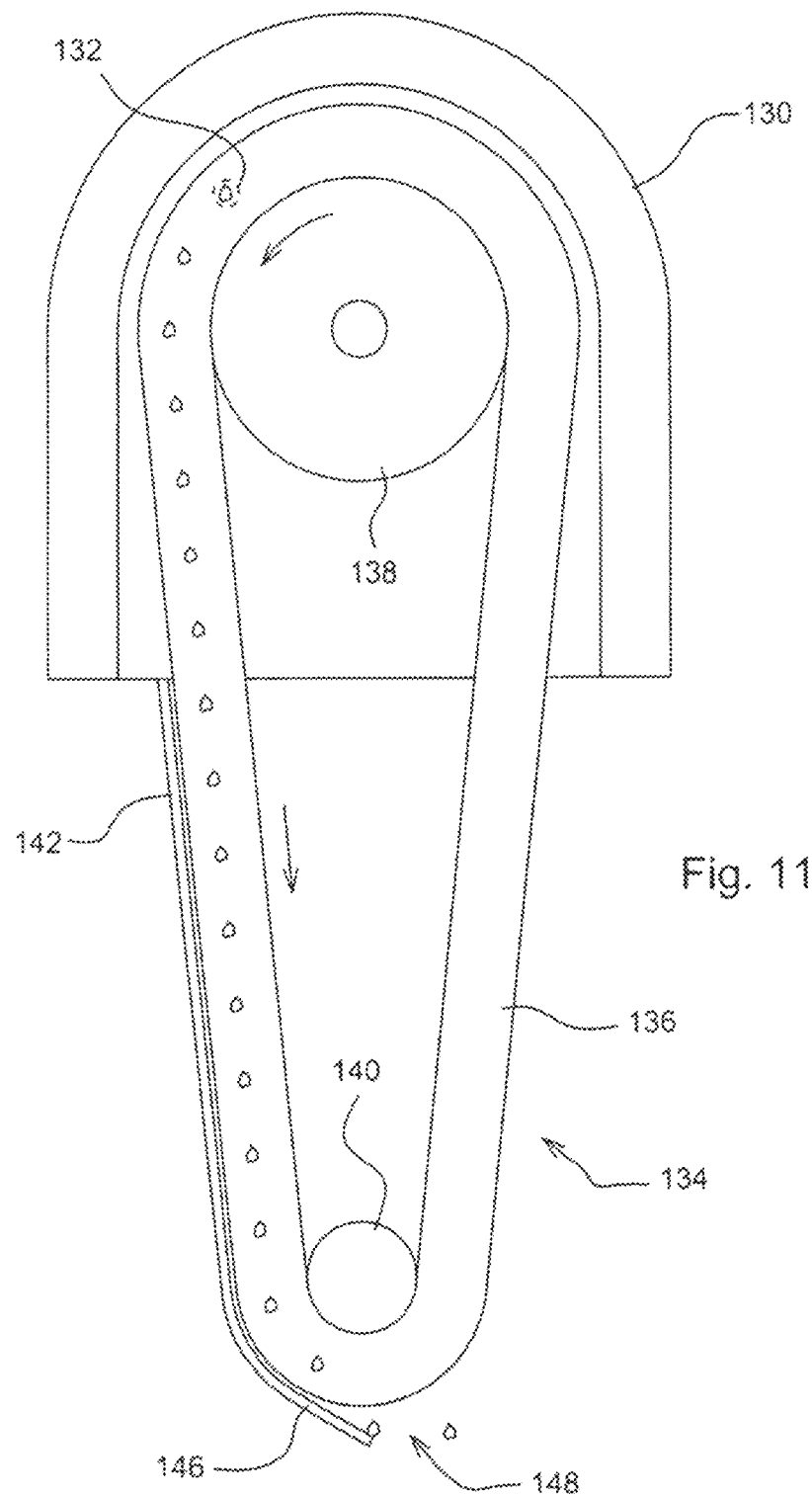
FIG. 11 is a side view illustrating the orientation of the seed delivery system of the invention with a finger pick-up meter.

The delivery system of the present invention can also be used with seed meters other than air pressure differential meters. For example, with reference to FIG. 11, a finger pick-up meter 130 is shown, such as that described in U.S. Pat. No. 3,552,601 and incorporated herein by reference. Seed is ejected from the meter through an opening 132. The delivery system 134 has a brush belt 136 wrapped about pulleys 138 and 140. As shown, the belt pulley 138 shares a common drive shaft with finger pick-up meter 130. A hub transmission such as a spherical continuously variable transmission or a three speed hub can be used to drive the belt 136 at a different speed from the meter 130. The delivery system housing includes a side wall 142. A ramp 146 is formed at the lower end of the wall 142 adjacent the lower opening 148. At the upper end of the delivery system, the upper opening is formed in the housing rear wall adjacent the opening 132 through which seeds are ejected from the seed meter. The seeds are inserted laterally into the brush bristles in a complete cross-feed. As in the other embodiments, the seed is captured in the brush bristles, moved downward to the lower opening, accelerated rearward and discharged through the lower opening 148.

The endless member of the delivery system has been described as being a brush belt with bristles. In a broad sense, the bristles form an outer periphery of contiguous disjoint surfaces that engage and grip the seed. While brush bristles are the preferred embodiment, and may be natural or synthetic, other material types can be used to grip the seed such as a foam pad, expanded foam pad, mesh pad or fiber pad.

Having described the preferred embodiment, it will become apparent that various modifications can be made without departing from the scope of the invention as defined in the accompanying claims.

The invention claimed is:

1. A seed metering and delivery apparatus for use on a row unit of a planting implement for metering seed and delivering the seed to a seed trench in soil during a seeding operation, the seed metering and delivery apparatus comprising:
    a seed meter comprising a seed disk rotatable about a seed disk axis, wherein the seed disk comprises:
        a front face and a rear face; and
        a plurality of apertures arranged in a circular pattern, spaced inwardly from an outer edge of the seed disk, and forming a seed path, wherein each aperture of the plurality of apertures extends through the seed disk between the front face and the rear face and is configured to retain the seed in place on the front face of the seed disk by a pressure differential across the plurality of apertures,
        wherein the seed meter is configured to move the seed along the seed path to a removal location, and wherein the seed meter is configured to be mounted to the row unit such that the seed disk is held in a substantially vertical orientation and at an angle to a forward travel direction of the row unit;
    a delivery system comprising:
        an elongated housing comprising an upper end, a lower end, a first side wall, a second side wall, a front wall, and a rear wall, wherein the elongated housing further comprises an upper opening through which the seed is received into the elongated housing and a lower opening through which the seed is discharged from the elongated housing, wherein the elongated housing of the delivery system is configured to move in a seeding direction at a first seeding speed;
        an upper roller rotatable about a first roller axis and a lower roller rotatable about a second roller axis;
        a delivery belt comprising a base member and a plurality of projections having proximal ends extending from the base member and distal ends opposite the proximate ends, wherein the delivery belt is rotatably held within the elongated housing and around the upper roller and the lower roller such that the distal ends of the plurality of projections are disposed proximate at least a portion of an inner surface of the first side wall between the upper opening and the lower opening;
        wherein the delivery belt is configured to move the seed along a delivery path comprising a substantially straight portion, and wherein the delivery belt is configured to discharge the seed from the lower opening of the elongated housing with a discharge velocity having a rearward velocity component in a direction opposite the seeding direction; and
    a loading wheel rotatable about a loading wheel axis, wherein the loading wheel is positioned adjacent the front face of the seed disk and at least partially overlapping the seed path at the removal location, wherein the loading wheel is configured to engage the seed retained on the front face of the seed disk and redirect the seed from the seed path into the upper opening of the elongated housing.

2. The seed metering and delivery apparatus of claim 1, wherein the seed disk is held in the substantially vertical orientation and at a non-zero angle to the forward travel direction of the row unit.

3. The seed metering and delivery apparatus of claim 2, wherein the seed disk is held in the substantially vertical orientation and at a sixty degree angle to the forward travel direction of the row unit.

4. The seed metering and delivery apparatus of claim 2, wherein the seed disk is held in the substantially vertical orientation and perpendicular to the forward travel direction of the row unit.

5. The seed metering and delivery apparatus of claim 1, wherein the seed disk further comprises a pocket at least partially surrounding each aperture of the plurality of apertures.

6. The seed metering and delivery apparatus of claim 1, wherein the seed disk further comprises a plurality of seed channels at least partially inset into the front face of the seed disk, wherein the plurality of seed channels is configured to agitate the seed in the seed meter.

7. The seed metering and delivery apparatus of claim 6, wherein each seed channel of the plurality of seed channels corresponds to one aperture of the plurality of apertures.

8. The seed metering and delivery apparatus of claim 6, wherein the plurality of seed channels is disposed radially inward of the plurality of apertures.

9. The seed metering and delivery apparatus of claim 6, wherein each seed channel of the plurality of seed channels is angled with respect to a radius of the seed disk such that an internal end wall of a seed channel trails an outer end wall of the seed channel in a direction of rotation of the seed disk.

10. The seed metering and delivery apparatus of claim 6, wherein each seed channel of the plurality of seed channels comprises an angled front wall, an internal end wall, a rear wall that is substantially perpendicular to the front face of the seed disk, and an outer end wall.

11. The seed metering and delivery apparatus of claim 10, wherein each seed channel of the plurality of seed channels is configured such that the rear wall of a seed channel trails the angled front wall in a direction of rotation of the seed disk.

12. The seed metering and delivery apparatus of claim 10, wherein each seed channel of the plurality of seed channels corresponds to one aperture of the plurality of apertures, and wherein the outer end wall of each seed channel terminates at its corresponding aperture of the plurality of apertures.

13. The seed metering and delivery apparatus of claim 1, wherein the seed disk further comprises a plurality of axially projecting walls, each axially projecting wall of the plurality of axially projecting walls being disposed between adjacent apertures of the plurality of apertures and at least partially on the seed path.

14. The seed metering and delivery apparatus of claim 13, wherein each axially projecting wall of the plurality of axially projecting walls extends lengthwise in a predominantly radial direction.

15. The seed metering and delivery apparatus of claim 14, wherein each axially projecting wall of the plurality of axially projecting walls extends lengthwise in a direction inclined to a radial direction such that an outer end of an axially projecting wall trails an inner end of the axially projecting wall in a direction of rotation of the seed disk.

16. The seed metering and delivery apparatus of claim 13, wherein the seed disk further comprises a plurality of projections extending axially from the front face of the seed disk, wherein each projection of the plurality of projections is disposed between one aperture of the plurality of apertures and an adjacent axially projecting wall of the plurality of axially projecting walls.

17. The seed metering and delivery apparatus of claim 16, wherein each axially projecting wall of the plurality of axially projecting walls trails an aperture of the plurality of apertures in a direction of rotation of the seed disk and each projection of the plurality of projections trails an axially projecting wall of the plurality of axially projecting walls in the direction of rotation of the seed disk.

18. The seed metering and delivery apparatus of claim 1, wherein the seed disk further comprises a peripheral lip at least partially recessed from the front face of the seed disk and extending circumferentially around an outer periphery of the seed disk.

19. The seed metering and delivery apparatus of claim 18, wherein the peripheral lip is flat from a radial innermost edge of the peripheral lip to a radial outermost edge of the peripheral lip.

20. The seed metering and delivery apparatus of claim 18, wherein the seed disk further comprises a radially outward edge face extending axially inwardly with respect to the front face of the seed disk and disposed radially between the peripheral lip and the plurality of apertures.

21. The seed metering and delivery apparatus of claim 1, wherein the seed meter further comprises a singulator configured to remove an extra seed from the plurality of apertures as the seed meter moves the seed along the seed path before the seed reaches the removal location.

22. The seed metering and delivery apparatus of claim 1, wherein the elongated housing of the delivery system is inclined in a vertical direction.

23. The seed metering and delivery apparatus of claim 22, wherein the elongated housing of the delivery system is inclined in the vertical direction such that the lower end of the elongated housing trails the upper end of the elongated housing in the forward travel direction of the row unit.

24. The seed metering and delivery apparatus of claim 22, wherein the elongated housing of the delivery system is inclined in the vertical direction such that the upper end of the elongated housing trails the lower end of the elongated housing in the forward travel direction of the row unit.

25. The seed metering and delivery apparatus of claim 1, wherein the elongated housing of the delivery system is oriented in a direction parallel to the forward travel direction of the row unit such that the front wall and the rear wall are parallel to the forward travel direction and the second side wall trails the first side wall in the forward travel direction.

26. The seed metering and delivery apparatus of claim 1, wherein the first side wall comprises a substantially straight portion, wherein an inner surface of the substantially straight portion of the first side wall at least partially defines the substantially straight portion of the delivery path, wherein the first side wall further comprises a lower curved portion extending at least partially around the lower roller, wherein an inner surface of the lower curved portion of the first side wall at least partially defines a curved portion of the delivery path.

27. The seed metering and delivery apparatus of claim 26, wherein the inner surface of the lower curved portion of the first side wall extends around the lower roller by about 80 degrees.

28. The seed metering and delivery apparatus of claim 26, wherein the delivery system is configured such that the distal ends of the plurality of projections are disposed proximate the inner surface of the substantially straight portion of the first side wall in the substantially straight portion of the delivery path and wherein the delivery system is configured such that the distal ends of the plurality of projections are disposed proximate the inner surface of the lower curved portion of the first side wall in the curved portion of the delivery path.

29. The seed metering and delivery apparatus of claim 26, wherein the elongated housing of the delivery system further comprises a ramp at a lower end of the lower curved portion of the first side wall and adjacent the lower opening of the elongated housing.

30. The seed metering and delivery apparatus of claim 29, wherein the ramp at the lower end of the lower curved portion of the first side wall is substantially straight.

31. The seed metering and delivery apparatus of claim 26, wherein the delivery belt is configured to move the seed along the substantially straight portion of the delivery path at a descent velocity and to move the seed along the curved portion of the delivery path at a curved portion angular velocity, wherein a linear speed of the curved portion angular velocity is greater than a linear speed of the descent velocity.

32. The seed metering and delivery apparatus of claim 31, wherein the seed is accelerated from the descent velocity to the curved portion angular velocity by rotating the plurality of projections around the lower roller and through the curved portion of the delivery path such that a linear speed of the distal ends of the plurality of projections within the curved portion of the delivery path is greater than a linear speed of the base member of the delivery belt within the curved portion of the delivery path.

33. The seed metering and delivery apparatus of claim 31, wherein the linear speed of the curved portion angular velocity is approximately equal to a linear speed of the discharge velocity.

34. The seed metering and delivery apparatus of claim 1, wherein the delivery belt comprises a brush belt.

35. The seed metering and delivery apparatus of claim 1, wherein each projection of the plurality of projections extends normally from a surface of the base member.

36. The seed metering and delivery apparatus of claim 1, wherein the delivery belt defines a plurality of receptacles configured to contain the seed as the delivery belt moves the seed along at least a portion of the delivery path, and wherein the seed meter and the delivery belt are configured to cooperate such that a single seed is contained within any receptacle of the plurality of receptacles.

37. The seed metering and delivery apparatus of claim 1, wherein an inner surface of the elongated housing and at least two projections of the plurality of projections at least partially define a receptacle configured to contain the seed as the delivery belt moves the seed along at least a portion of the delivery path.

38. The seed metering and delivery apparatus of claim 37, wherein the at least two projections of the plurality of projections and at least one of i) the inner surface of the first side wall, ii) an inner surface of the second side wall, iii) an inner surface of the front wall, and iv) an inner surface of the rear wall at least partially define a receptacle configured to contain the seed as the delivery belt moves the seed along at least a portion of the delivery path.

39. The seed metering and delivery apparatus of claim 38, wherein the at least two projections of the plurality of projections and the inner surface of the first side wall, the inner surface of the front wall, and the inner surface of the rear wall at least partially define a receptacle configured to contain the seed as the delivery belt moves the seed along at least a portion of the delivery path.

40. The seed metering and delivery apparatus of claim 39, wherein the at least two projections of the plurality of projections, the base member, and the inner surface of the first side wall, the inner surface of the front wall, and the inner surface of the rear wall are configured to cooperate to move the seed along the delivery path.

41. The seed metering and delivery apparatus of claim 37, wherein the at least two projections of the plurality of projections are configured to grip an individual seed of the seed such that the receptacle is substantially equal to a volume of the individual seed.

42. The seed metering and delivery apparatus of claim 1, wherein the delivery belt is configured to discharge the seed from the lower opening of the elongated housing such that the rearward velocity component in the direction opposite the seeding direction has a speed that is substantially equal to the first seeding speed such that the rearward velocity component in the direction opposite the seeding direction is substantially zero relative to the ground.

43. The seed metering and delivery apparatus of claim 42, wherein the elongated housing of the delivery system is configured to move in the seeding direction at a second seeding speed different than the first seeding speed during the seeding operation, and wherein the delivery belt is configured to discharge the seed from the lower opening of the elongated housing such that the rearward velocity component in the direction opposite the seeding direction has a speed that is substantially equal to the second seeding speed such that the rearward velocity component in the direction opposite the seeding direction is substantially zero relative to the ground.

44. The seed metering and delivery apparatus of claim 1, wherein the delivery belt is configured to move the seed along the substantially straight portion of the delivery path at a descent velocity.

45. The seed metering and delivery apparatus of claim 44, wherein the delivery belt is configured accelerate the seed from the descent velocity to the discharge velocity.

46. The seed metering and delivery apparatus of claim 1, wherein the loading wheel axis is parallel to at least one of the first roller axis and the second roller axis.

47. The seed metering and delivery apparatus of claim 46, wherein the loading wheel rotates about the loading wheel axis in a first rotational direction and the delivery belt rotates around the upper roller and the lower roller in a second rotational direction, wherein the second rotational direction is opposite the first rotational direction.

48. The seed metering and delivery apparatus of claim 1, wherein the loading wheel axis is parallel to the seed disk axis.

49. The seed metering and delivery apparatus of claim 1, wherein the loading wheel is configured to remove the seed retained on the front face of the seed disk at the removal location.

50. The seed metering and delivery apparatus of claim 1, wherein the loading wheel is configured to sweep across the seed path and the plurality of apertures at the removal location.

51. The seed metering and delivery apparatus of claim 1, wherein the loading wheel is adjacent the upper opening of the elongated housing of the delivery system.

* * * * *